(12) United States Patent
Trout

(10) Patent No.: US 8,602,427 B2
(45) Date of Patent: Dec. 10, 2013

(54) VEHICLE STABILIZATION APPARATUS AND VEHICLE FORMED THEREWITH

(71) Applicant: William G. Trout, Elgin, IL (US)

(72) Inventor: William G. Trout, Elgin, IL (US)

( * ) Notice: Subject to any disclaimer, the term of this patent is extended or adjusted under 35 U.S.C. 154(b) by 0 days.

(21) Appl. No.: 13/716,387

(22) Filed: Dec. 17, 2012

(65) Prior Publication Data

US 2013/0106072 A1 May 2, 2013

Related U.S. Application Data

(63) Continuation-in-part of application No. 13/548,942, filed on Jul. 13, 2012, which is a continuation-in-part of application No. 13/411,705, filed on Mar. 5, 2012, now Pat. No. 8,333,397, which is a continuation of application No. 13/087,893, filed on Apr. 15, 2011, now Pat. No. 8,128,114, which is a continuation of application No. 12/694,904, filed on Jan. 27, 2010, now Pat. No. 7,938,426, which is a continuation-in-part of application No. 12/543,892, filed on Aug. 19, 2009, now abandoned.

(60) Provisional application No. 61/189,553, filed on Aug. 20, 2008.

(51) Int. Cl.
*B62K 19/00* (2006.01)

(52) U.S. Cl.
USPC ............................................ 280/63; 280/293

(58) Field of Classification Search
USPC ......... 180/209; 280/63, 293, 209, 288.4, 294, 280/295, 298, 300, 301, 302, 303, 304
See application file for complete search history.

(56) References Cited

U.S. PATENT DOCUMENTS

| | | |
|---|---|---|
| 476,297 A | 6/1892 | Overs |
| 617,136 A | 1/1899 | Wilkins et al. |
| 625,574 A | 5/1899 | Locke |
| 708,809 A | 9/1902 | Hayes |
| 720,860 A | 2/1903 | Trutzschler |
| 1,576,133 A | 3/1926 | Chisar |
| 2,301,036 A | 11/1942 | Gray |
| 2,535,283 A | 12/1950 | Groom |
| 4,203,500 A | 5/1980 | Kamiya |
| 4,815,756 A | 3/1989 | Kitner |
| 5,064,213 A | 11/1991 | Storch |
| 5,169,165 A | 12/1992 | Oates |
| 6,113,122 A | 9/2000 | Plana |
| 6,286,849 B1 | 9/2001 | Slattery |
| 6,296,266 B1 | 10/2001 | Martin |
| 6,318,745 B1 | 11/2001 | Sharp, III |

(Continued)

*Primary Examiner* — Tony Winner
*Assistant Examiner* — Jacob Knutson
(74) *Attorney, Agent, or Firm* — Parsons & Goltry; Michael W. Goltry; Robert A. Parsons

(57) ABSTRACT

A two-wheeled vehicle includes a front wheel mounted for rotation to a front end of a frame and an opposed rear wheel mounted for rotation to a rear end of the frame. A framework assembly is carried by the frame of the vehicle between the front and rear wheels and has end portions disposed adjacent to respective sides of the frame. A stabilizer is carried by each of the end portions of the framework assembly to interact with the ground over which the vehicle is driven along the sides of the frame proximate to the front and rear wheels of the vehicle. A frangible area is formed in the framework assembly providing a point at which the framework assembly will break so as to break away one of the stabilizers from the framework assembly.

7 Claims, 30 Drawing Sheets

(56) References Cited

U.S. PATENT DOCUMENTS

| | | |
|---|---|---|
| 6,974,145 B1 | 12/2005 | Peters |
| 6,994,368 B2 * | 2/2006 | Brown ........................ 280/293 |
| 7,032,916 B2 | 4/2006 | Plana |
| 2008/0023415 A1 * | 1/2008 | Zuckerman .................... 211/20 |
| 2008/0029994 A1 | 2/2008 | Lytle |
| 2008/0164676 A1 | 7/2008 | Bell |

* cited by examiner

FIG. 10
FIG. 5
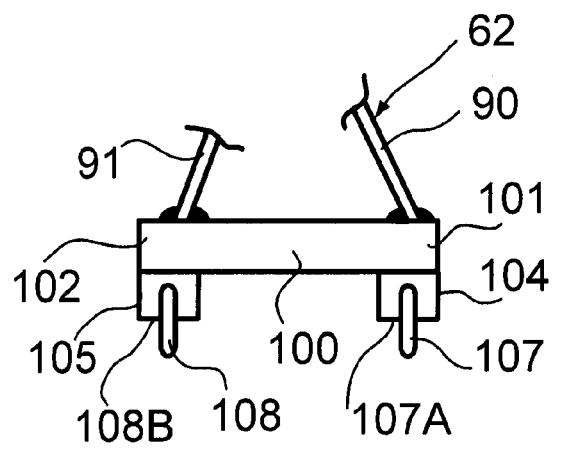
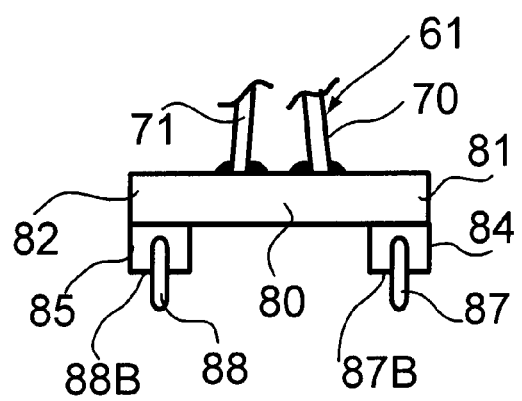
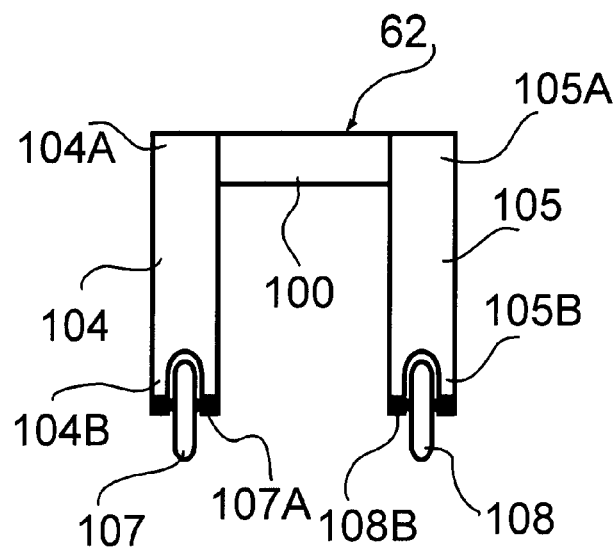
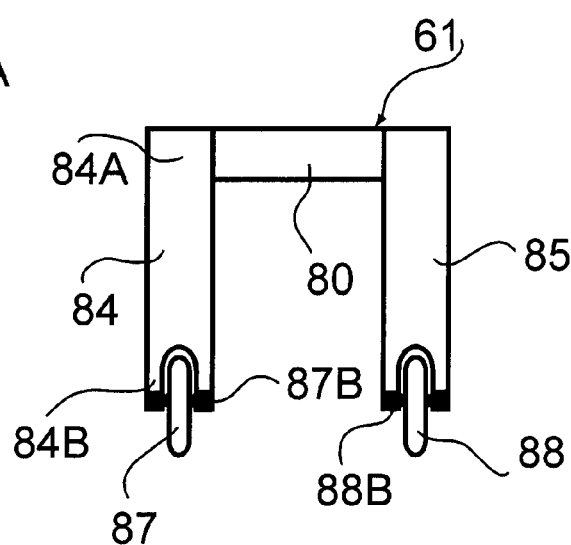
FIG. 11
FIG. 6

FIG. 12
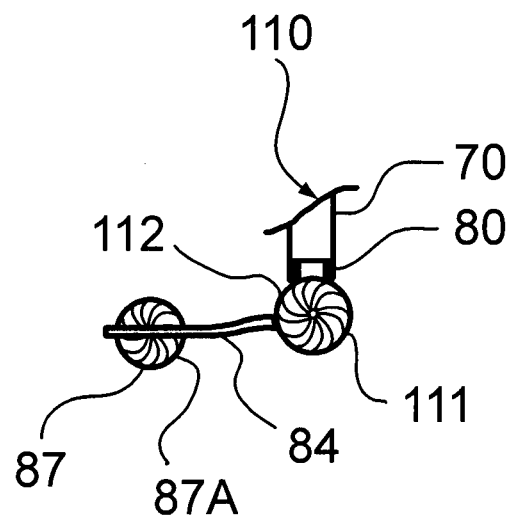
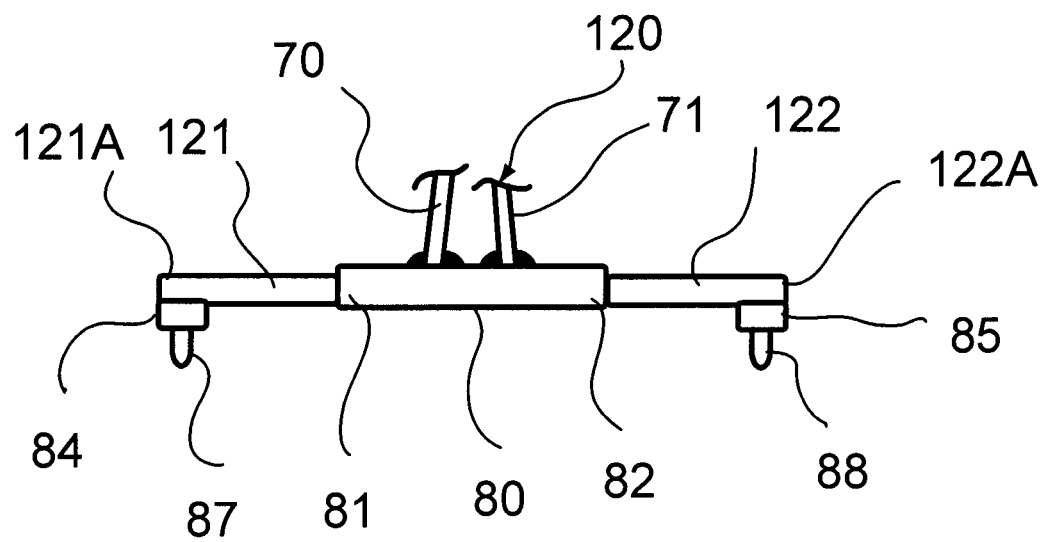
FIG. 13

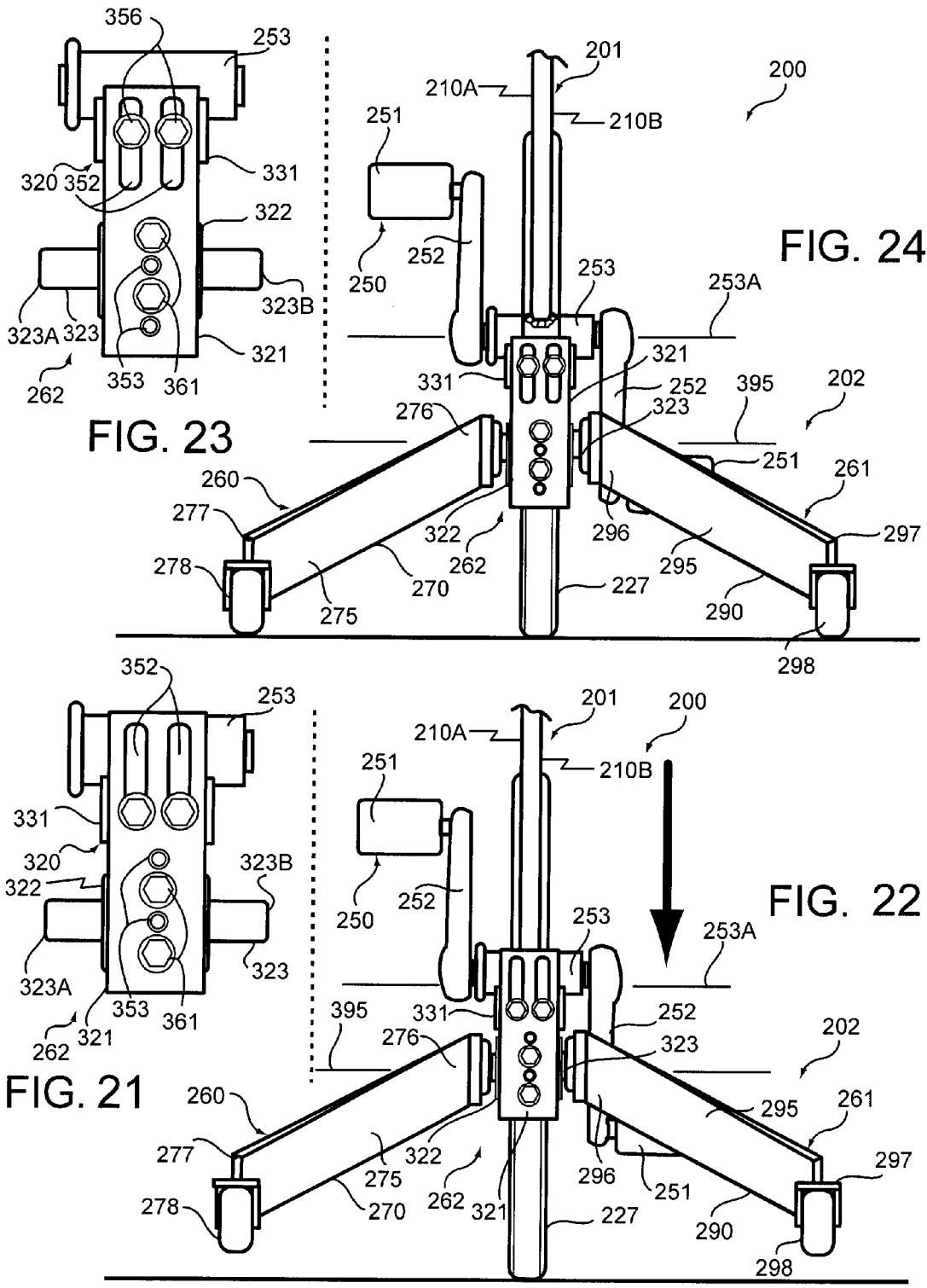

VEHICLE STABILIZATION APPARATUS AND VEHICLE FORMED THEREWITH

FIELD OF THE INVENTION

The present invention relates to two-wheeled vehicles, such as bicycles and scooters and, more particularly, to a stabilization apparatus attached to the frame of a two-wheeled vehicle that stabilizes such vehicle during use.

BACKGROUND OF THE INVENTION

A bicycle is as pedal-driven vehicle with two wheels attached to a frame, one behind and in-line with respect to the other. A person who rides a bicycle is a cyclist or bicyclist. Bicycles were introduced in the early $19^{th}$ century, and are useful not only as simple transportation but also for recreation and fitness purposes. Scooters also have two wheels. However, unlike bicycles, scooters are motor-driven.

Because vehicles such as bicycles and scooters have two wheels, a bit of training and practice is required in order to ride such two-wheeled vehicles safely and efficiently. However, for uncoordinated people and people that suffer from balance problems or disorders riding bicycles and scooters is particularly dangerous and generally not recommended regardless of how much practice or training they have. In order to allow uncoordinated people and people with balance disorders to use two-wheeled vehicles, what is therefore needed is an improved stabilization apparatus useful in conjunction with a two-wheeled vehicle, such as bicycle and even a scooter, to provide such two-wheeled vehicle with improved stabilization during use to allow such two-wheeled vehicle to be safely, easily, and efficiently used by uncoordinated people and people challenged with balance disorders.

SUMMARY OF THE INVENTION

According to the principle of the invention, a vehicle assembly includes a two-wheeled vehicle having a front wheel positioned in front of an opposed rear wheel that is in-line with respect to the front wheel, and a stabilization apparatus including a front stabilizer assembly attached to the vehicle proximate to the front wheel, and a rear stabilizer assembly attached to the vehicle proximate to the rear wheel. The front stabilizer assembly includes a first pair of opposed wheels resiliently mounted to a first framework secured to the vehicle to resiliently interact with the ground on either side of the vehicle proximate to the front wheel over which the vehicle is ridden to stabilize the vehicle, and the rear stabilizer assembly includes a second pair of opposed wheels resiliently mounted to a second framework secured to the vehicle to resiliently interact with the ground on either side of the vehicle proximate to the rear wheel over which the vehicle is ridden to stabilize the vehicle. The two-wheeled vehicle is a bicycle in a preferred embodiment.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A first forward stabilizer wheel and a first rearward stabilizer wheel are each mounted to a first support assembly secured to the frame between the front and rear wheels. The first support assembly supports the first forward stabilizer wheel along the first side of the frame proximate to, and outboard of, the front wheel of the vehicle, and supports the first rearward stabilizer wheel along the first side of the frame proximate to, and outboard of, the rear wheel of the vehicle. A second forward stabilizer wheel and a second rearward stabilizer wheel are each mounted to a second support assembly secured to the frame between the front and rear wheels. The second support assembly supports the second forward stabilizer wheel along the second side of the frame proximate to, and outboard of, the front wheel of the vehicle so as to oppose the first forward stabilizer wheel, and supports the second rearward stabilizer wheel along the second side of the frame proximate to, and outboard of, the rear wheel of the vehicle so as to oppose the first rearward stabilizer wheel. The first and second forward stabilizer wheels are positioned to interact with the ground over which the vehicle is driven along the first and second sides of the frame proximate to the front wheel of the vehicle to stabilize the vehicle proximate to the front end of the frame of the vehicle. The first and second rearward stabilizer wheels are positioned to interact with the ground over which the vehicle is driven along the first and second sides of the frame proximate to the rear wheel of the vehicle to stabilize the vehicle proximate to the rear end of the frame of the vehicle. The front wheel rotates about a first axis of rotation, the rear wheel rotates about a second axis of rotation, the first and second forward stabilizer wheels are positioned proximate to the first axis of rotation of the front wheel, and the first and second rearward stabilizer wheels are positioned proximate to the second axis of rotation of the rear wheel. The first forward stabilizer wheel is substantially in-line with respect to the first rearward stabilizer wheel. The second forward stabilizer wheel is substantially in-line with respect to the second rearward stabilizer wheel. In a particular embodiment, the vehicle assembly is fashioned with an axle, having a first end portion positioned proximate to the first side of the frame of the vehicle and an opposed second end portion positioned proximate to the second side of the frame of the vehicle, which is mounted to a connector assembly affixed to the frame of the vehicle between the front and rear wheels. The first support assembly is mounted to the first end portion of the axle, and the second support assembly mounted to the second end portion of the axle. The first support assembly is further mounted to the first end portion of the axle for pivotal movement, and the second support assembly is further mounted to the second end portion of the axle for pivotal movement. The axle is mounted to the connector assembly for movement between a raised position toward the frame of the vehicle away from the ground over which the vehicle is driven, and a lowered position away from the frame of the vehicle toward the ground over which the vehicle is driven. The first forward and rearward stabilizer wheels are each mounted to the first support assembly for swiveling movement, and the second forward and rearward stabilizer wheels are each mounted to the second support assembly for swiveling movement.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A member is carried by the frame of the vehicle between the front and rear wheels and has first and second end portions disposed adjacent to the respective first and second sides of the frame. A wheeled stabilizer assembly is carried by each of the first and second end portions of the member to wheelingly interact with the ground over which the vehicle is driven along the first and second sides of the frame proximate to the front and rear wheels of the vehicle to stabilize the vehicle as the vehicle is driven over the ground. The member is mounted to the frame of the vehicle for movement between a raised position of the first and second end portions toward the frame of the vehicle away from the ground over which the vehicle is driven, and a lowered position of the first and second end portions away from the frame of the vehicle toward the ground over which the vehicle is driven. The wheeled stabilizer assemblies each include a framework having an attached forward stabilizer wheel disposed proximate the front wheel of the vehicle and an attached rearward stabilizer wheel disposed proximate to the rear wheel of the vehicle. The forward stabilizer wheel is substantially in-line with respect to rearward stabilizer wheel in each of the wheeled stabilizer assemblies. The wheeled stabilizer assemblies are each mounted for pivotal movement to the respective first and second end portions of the member.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A member is carried by the frame of the vehicle between the front and rear wheels and has first and second end portions disposed adjacent to the respective first and second sides of the frame. First and second wheeled stabilizer assemblies are carried by the first and second end portions, respectively, of the member to wheelingly interact with the ground over which the vehicle is driven along the first and second sides of the frame proximate to the front and rear wheels of the vehicle to stabilize the vehicle as the vehicle is driven over the ground. The first wheeled stabilizer assembly includes a first elongate support member disposed proximate to and extending along the first side of the frame of the vehicle, the first elongate support member including a first leading end directed toward the front wheel of the vehicle and a first trailing end directed toward the rear wheel of the vehicle, a first front arm attached to the first leading end of the first elongate support member and extending outwardly therefrom with respect to the first elongate support member and the first side of the frame of the vehicle to a first forward wheeled end disposed proximate to and outboard of the front wheel of the vehicle, and a first rear arm attached to the first trailing end of the first elongate support member and extending outwardly therefrom with respect to the first elongate support member and the first side of the frame of the vehicle to a first rearward wheeled end disposed proximate to and outboard of the rear wheel of the vehicle. The second wheeled stabilizer assembly includes a second elongate support member disposed proximate to and extending along the second side of the frame of the vehicle, the second elongate support member including a second leading end directed toward the front wheel of the vehicle and a second trailing end directed toward the rear wheel of the vehicle, a second front arm attached to the second leading end of the second elongate support member and extending outwardly therefrom with respect to the second elongate support member and the second side of the frame of the vehicle to a second forward wheeled end disposed proximate to and outboard of the front wheel of the vehicle, and a second rear arm attached to the second trailing end of the second elongate support member and extending outwardly therefrom with respect to the second elongate support member and the second side of the frame of the vehicle to a second rearward wheeled end disposed proximate to and outboard of the rear wheel of the vehicle. The first elongate support member is substantially parallel with respect to the second elongate support member. The member is mounted to the frame of the vehicle for movement between a raised position of the first and second end portions toward the frame of the vehicle away from the ground over which the vehicle is driven, and a lowered position of the first and second end portions away from the frame of the vehicle toward the ground over which the vehicle is driven. The first forward wheeled end of the first wheeled stabilizer assembly is substantially in-line with respect to the first rearward wheeled end of the first wheeled stabilizer assembly, and the second forward wheeled end of the second wheeled stabilizer assembly is substantially in-line with respect to the second rearward wheeled end of the second wheeled stabilizer assembly.

According to the principle of the invention, a vehicle assembly includes a vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A first forward stabilizer and a second forward stabilizer are each mounted to a fixture mounted to the frame. The fixture supports the first forward stabilizer along the first side of the frame proximate to, and outboard of, the front wheel of the vehicle. The fixture supports the second forward stabilizer along the second side of the frame proximate to, and outboard of, the front wheel of the vehicle so as to oppose the first forward stabilizer. The fixture is movable between a raised position toward the frame of the vehicle away from the ground over which the vehicle is driven, and a lowered position away from the frame of the vehicle toward the ground over which the vehicle is driven. A lock assembly is coupled between the frame and the fixture, and in the lowered position of the fixture the lock assembly is adjustable between a locked position locking the fixture in the lowered position preventing the fixture from moving from the lowered position to the raised position, and an unlocked position releasing the fixture in the lowered position allowing the fixture to move from the lowered position to the raised position. The first and second forward stabilizers are positioned to interact with the ground over which the vehicle is driven, along the first and second sides of the frame proximate to the front wheel of the vehicle, to stabilize the vehicle proximate to the front end of the frame of the vehicle. A first rearward stabilizer is mounted to a first support member mounted to the frame. A second rearward stabilizer mounted to a second support member mounted to the frame. The first support member supports the first rearward stabilizer along the first side of the frame proximate to, and outboard of, the rear wheel of the vehicle. The second support member supports the second rearward stabilizer along the second side of the frame proximate to, and outboard of, the rear wheel of the vehicle so as to oppose the first rearward stabilizer. The first and second rearward stabilizers are positioned to interact with the ground over which the vehicle is driven, along the first and second sides of the frame proximate to the rear wheel of the vehicle, to stabilize the vehicle proximate to the rear end of the frame of the vehicle. In a particular embodiment, the first support member is independently movable between a raised position toward the frame of the vehicle away from the ground over which the vehicle is driven, and a lowered position away from the frame of the vehicle toward the ground over which the vehicle is driven. The second support member is also independently movable between a raised position toward the frame of the vehicle away from the ground over which the vehicle is driven, and a lowered position away from the frame of the vehicle toward the ground over which the vehicle is driven. The front wheel rotates about a first axis of rotation, the rear wheel rotates about a second axis of rotation, the first and second forward stabilizers are positioned proximate to the first axis of rotation of the front wheel, and the first and second rearward stabilizers are positioned proximate to the second axis of rotation of the rear wheel. The first forward stabilizer is substantially in-line with respect to the first rearward stabilizer. The second forward stabilizer is substantially in-line with respect to the second rearward stabilizer. A shifter is mounted to the frame, and the shifter is operatively coupled to the lock mechanism for adjusting the lock mechanism between the locked and unlocked positions in response to operation of the shifter. The shifter is further operatively coupled to the fixture in the unlocked position of the lock assembly for moving the fixture between the lowered and raised positions in response to operation of the shifter.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. First and second stabilizer assemblies are positioned along the first and second sides, respectively, of the frame to interact with the ground over which the vehicle is driven. The first and second stabilizer assemblies extend along the first and second sides of the frame proximate to the front and rear wheels of the vehicle, to stabilize the vehicle as the vehicle is driven over the ground. The first and second stabilizer assemblies each include a forward stabilizer disposed proximate to the front wheel of the vehicle and attached to a forward support member mounted to the frame for movement between a lowered position of the forward stabilizer and a raised position of the forward stabilizer, a rearward stabilizer disposed proximate to the rear wheel of the vehicle and attached to a rearward support member mounted to the frame, and a lock assembly coupled between the frame and the forward support member, and in the lowered position of the fixture the lock assembly is adjustable between a locked position locking the fixture in the lowered position of the forward stabilizer preventing the fixture from moving from the lowered position of the forward stabilizer to the raised position of the forward stabilizer, and an unlocked position releasing the fixture in the lowered position of the forward stabilizer allowing the fixture to move from the lowered position of the forward stabilizer to the raised position of the forward stabilizer. The rearward support member is movable between a raised position toward the frame of the vehicle away from the ground over which the vehicle is driven, and a lowered position away from the frame of the vehicle toward the ground over which the vehicle is driven. The forward stabilizer is substantially in-line with respect to the rearward stabilizer. A shifter mounted to the frame. The shifter is operatively coupled to the lock mechanism for adjusting the lock mechanism between the locked and unlocked positions. The shifter is further operatively coupled to the forward stabilizer in the unlocked position of the lock assembly for moving the forward support member between the lowered and raised positions of the forward stabilizer.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. First and second stabilizer assemblies are positioned along the first and second sides, respectively, of the frame to interact with the ground over which the vehicle is driven, and the first and second stabilizer assemblies extend along the first and second sides of the frame proximate to the front and rear wheels of the vehicle, to stabilize the vehicle as the vehicle is driven over the ground, wherein the first and second stabilizer assemblies each include an elongate framework assembly mounted to the frame, and having an attached forward stabilizer disposed proximate to, and outboard of, the front wheel of the vehicle and an attached rearward stabilizer disposed proximate to, and outboard of, the rear wheel of the vehicle. There is a frangible area formed in the elongate framework assembly that provides a point at which the elongate framework assembly will break so as to break away one of the forward and rearward stabilizers from the elongate framework assembly. A sacrificial skid is attached to the elongate framework assembly between the vehicle and the frangible area to interact with the ground over which the vehicle is driven so as to prevent a remainder of the elongate framework assembly from interacting with the ground over which the vehicle is driven in response to the one of the forward and rearward stabilizers being broken away from the elongate framework assembly at the frangible area. In a preferred embodiment, the skid is formed of hard rubber and is further releasably attached to the elongate framework assembly.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. First and second stabilizer assemblies are positioned along the first and second sides, respectively, of the frame to interact with the ground over which the vehicle is driven, the first and second stabilizer assemblies extending along the first and second sides of the frame proximate to the front and rear wheels of the vehicle, to stabilize the vehicle as the vehicle is driven over the ground, wherein the first and second stabilizer assemblies each include an elongate framework assembly mounted to the frame, and having an attached forward stabilizer disposed proximate to, and outboard of, the front wheel of the vehicle and an attached rearward stabilizer disposed proximate to, and outboard of, the rear wheel of the vehicle. There is a frangible coupling formed in the elongate framework assembly between the vehicle and one of the forward and rearward stabilizers, which break-away couples the one of the forward and rearward stabilizers to the elongate framework assembly. The coupling includes a first end of a first part of the elongate framework assembly to the vehicle, a second end of a second part of the elongate framework assembly to the one of the forward and rearward stabilizers, and a fastener coupled between the first end of the first part and the second end of the second part releasably connecting the first end of the first part to the second end of the second part. According to the principle of the invention, a frangible area is formed in the fastener along an intersection between the first and second ends of the first and second parts of the elongate framework assembly that provides a point at which the fastener will break so as to break away the second end of the second part from first end of the first part. A sacrificial skid is attached to the first part of the elongate framework assembly to interact with the ground over which the vehicle is driven in response to the one of the forward and rearward stabilizers being broken away from the elongate framework assembly at the frangible area of the fastener so as to prevent the first part of the elongate framework from interacting with the ground over which the vehicle is driven. In a preferred embodiment, the skid is formed of hard rubber and is further releasably attached to the first part. There is an axis about which the fastener is symmetrical, and the second part is restrained from rotation relative to the first part about the axis of the fastener.

BRIEF DESCRIPTION OF THE DRAWINGS

Referring to the drawings:

FIG. 5 is a fragmented, rear elevation view of the front stabilizer assembly of FIG. 2;

FIG. 6 is a fragmented, bottom plan view of the front stabilizer assembly of FIG. 2;

FIG. 10 is a fragmented, rear elevation view of the rear stabilizer assembly of FIG. 7;

FIG. 11 is a fragmented, bottom plan view of the rear stabilizer assembly of FIG. 7;

FIG. 12 is a fragmented, side elevation view of an alternate embodiment of a stabilizer assembly constructed and arranged in accordance with the principle of the invention;

FIG. 13 is a fragmented, front elevation view of yet another alternate embodiment of a stabilizer assembly constructed and arranged in accordance with the principle of the invention;

FIG. 21 is a front plan view of a connector assembly of the stabilization apparatus of the vehicle assembly of FIG. 15 shown as it would appear adjusted into a first position;

FIG. 22 is a fragmented, front elevation view of the vehicle assembly of FIG. 15 illustrating the connector assembly of the stabilization apparatus shown adjusted into the first position illustrated in FIG. 21;

FIG. 23 is a front plan view of the connector assembly similar to that of FIG. 21 illustrating the connector assembly as it would appear adjusted into a second position different from the first position illustrated in FIGS. 21 and 22;

FIG. 24 is a fragmented, front elevation view of the vehicle assembly of FIG. 22 illustrating the connector assembly of the stabilization apparatus shown adjusted into the second position illustrated in FIG. 23;

DETAILED DESCRIPTION

Figure 1:
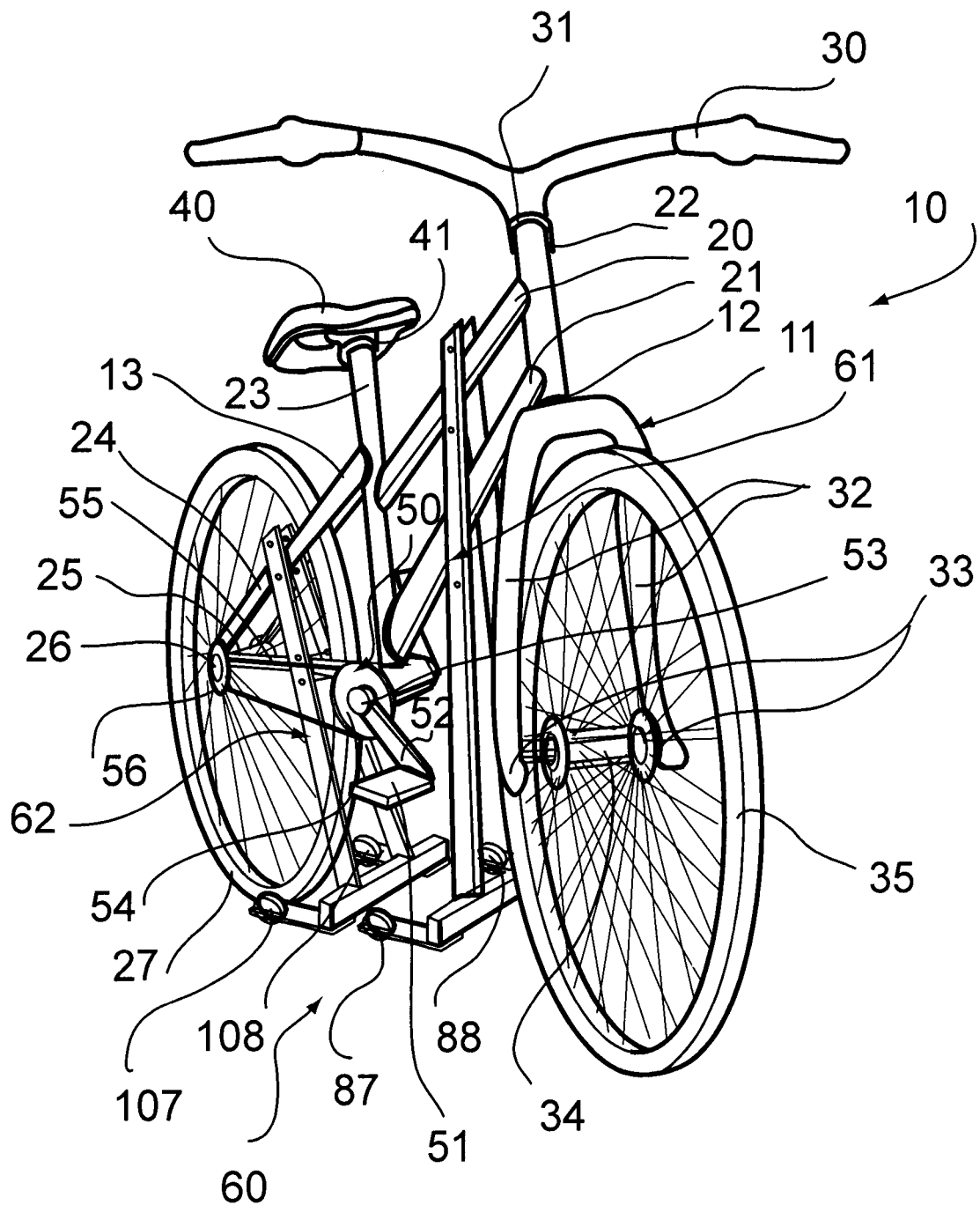
FIG. 1 is a perspective view of a vehicle assembly consisting of a bicycle fitted with a stabilization apparatus constructed and arranged in accordance with the principle of the invention to provide the bicycle with improved stability during use, the stabilization apparatus including a front stabilizer assembly formed at a front end of the bicycle and a rear stabilizer assembly formed at a rear end of the bicycle.

Turning now to the drawings, in which like reference characters indicate corresponding elements throughout the several views, attention is first directed to FIG. 1 in which there is seen a bicycle 10 including a frame 11 having a front or forward end denoted generally at 12, and an opposed rear or rearward end denoted generally at 13. Front end 12 of frame 11 may be considered the front end of bicycle 10, and rear end 13 of frame 11 may be considered the rear end of bicycle 10. Frame 11 consists of a top tube 20 and an opposed down tube 21 that extend between front 12 and rear 13. Top and bottom tubes 20 and 21 are connected at front 12 with a head tube 22, and are connected at rear 13 with an upright seat tube 23. Opposed seat stays 24 (only one shown) are connected to top tube 20 and seat tube 23 proximate to rear 13 of frame 11, and opposed chain stays 25 (only one shown) are connected to bottom tube 21 and seat tube 23 at rear 13 of frame 11. Seat stays 24 extend downwardly and rearwardly from top tube 20 and seat tube 23, chain stays 25 extend rearwardly of bottom tube 21 and seat tube 23, and seat stays 24 and chain stays 25 meet and connect at rear 13 of frame 11 and are coupled to a rear hub 26 of a rear wheel 27.

At front 12 of frame 11, handlebars 30 are connected to head tube 22 with a headset 31 that is connected to the upper end of a fork stem (not shown) that extends downwardly through head tube 22 to front forks 32, which extend downwardly and terminate with free ends 33 connected to a front hub 34 of a front wheel 35. Front wheel 35 is positioned in front of rear wheel 27, and rear wheel 27 is in-line with respect to front wheel 35. A seat 40 is mounted to a seat post 41 that extends into and is rigidly connected to seat tube 23.

Bicycle 10 is pedal-driven, and includes a pedal-driven drive train 50 consisting of pedals 51 (only one shown) attached to crank arms 52 (only one shown) rigidly connected to a bottom bracket 53 that is, in turn, rigidly connected to a chainring 54. An endless chain 55 concurrently encircles and operatively couples chainring 54 to cassette 56 formed in rear hub 26 to impart rotation to rear wheel 27 in response to rotation of chainring 54 made through a pedaling action applied to pedals 51, such as by a user seated on seat 40. Drive train 50 is a conventional form of a pedaled drive train commonly found among conventional bicycles.

Bicycle 10 is exemplary of a non-motorized two-wheeled vehicle, is entirely conventional and is generally representative of any one of a variety of commercially available bicycles. Accordingly, further details of bicycle not herein specifically disclosed will readily occur to those having ordinary skill and are not discussed in further detail.

In accordance with the principle of the invention, bicycle 10 is formed with a stabilization apparatus denoted generally at 60. The combination of bicycle 10 and stabilization apparatus 60 forms a vehicle or bicycle assembly according to the principle of the invention. Apparatus 60 consists of a main or front stabilizer assembly denoted at 61, and an opposed trailing or rear stabilizer assembly denoted at 62. Assemblies 61 and 62 are wheeled assemblies which are attached to bicycle 10 and, more particularly, to frame 11 of bicycle 10. Assemblies 61 and 62 interact with the ground and cooperate together to stabilize bicycle 10 during use to assist a user using bicycle 10 in the normal manner in balancing bicycle, and this is particularly useful for users that suffer from balance disorders or who are uncoordinated. Front assembly 61 is attached to bicycle 10 proximate to front 12 of bicycle 10 forwardly of bottom bracket 53, and rear assembly 62 is attached to bicycle 10 proximate to rear 13 of bicycle 10 rearwardly of bottom bracket 53.

Figure 2:
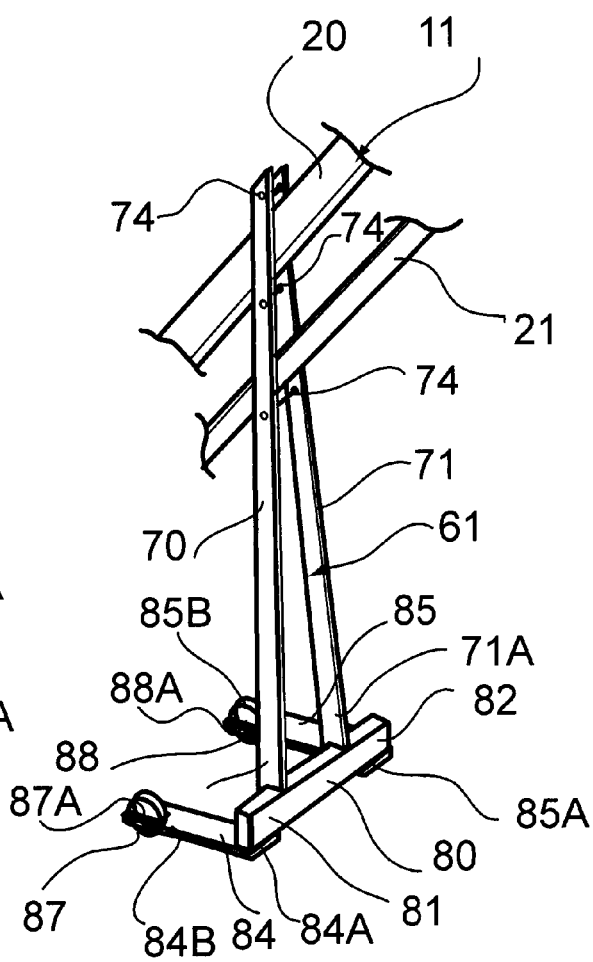
FIG. 2 is a fragmented perspective view of the bicycle of FIG. 1 illustrating the front stabilizer assembly of the stabilization apparatus.

Referencing FIG. 2, assembly 61 consists of framework formed by opposed front stays 70 and 71 rigidly affixed to frame 11. In the present embodiment, the framework formed by front stays 70 and 71 is secured to top and bottom tubes 20 and 21 of frame 11. Stays 70 and 71 are fashioned of strong, rigid material, such as steel, aluminum, carbon fiber, or the like, are located on either side of top and bottom tubes 20 and 21 of frame 11, and are clamped together to clamp onto and embrace top and bottom tubes 20 and 21 with fasteners 74, which may be rivets, nut-and-bolt assemblies, or the like. Stays 70 and 71 extend downwardly with respect to top and bottom tubes 20 and 21 of frame 11, and terminate with free ends 70A and 71A rigidly affixed, with welding or with fasteners such as rivets or screws or nut-and-bolt assemblies or the like, to a support 80, which, as seen in FIG. 1, is located just rearwardly of front wheel 35 of bicycle 10 and forwardly of bottom bracket 53.

Figure 4:
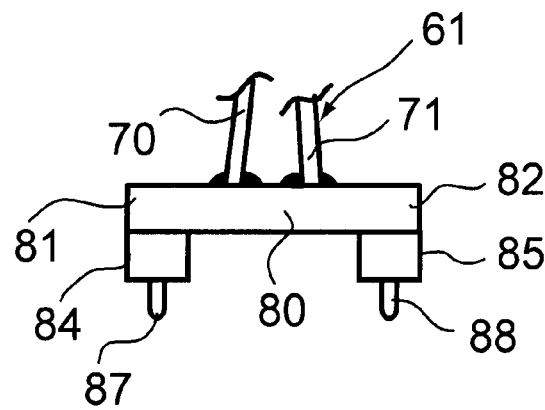
FIG. 4 is a fragmented, front elevation view of the front stabilizer assembly of FIG. 2.

Support 80 is elongate, substantially horizontal, has opposed ends 81 and 82, and, like stays 70 and 71, is preferably fashioned of strong, rigid material, such as steel, aluminum, carbon fiber, or the like. Elongate flexible arms 84 and 85 are attached at either end of support 80. Arm 84 has a proximal end 84A affixed, with welding or with fasteners such as rivets or screws or nut-and-bolt assemblies or the like, to support 80 proximate to end 81 of support 80, and extends rearwardly of support 80, and front wheel 35 of bicycle 10 as shown in FIG. 1, to a distal end 84B journaled to a wheel 87. Arm 85 has a proximal end 85A affixed, with welding or with fasteners such as rivets or screws or nut-and-bolt assemblies or the like, to support 80 proximate to end 82 of support 80, and extends rearwardly of support 80, and front wheel 35 of bicycle 10 as shown in FIG. 1, to a distal end 85B journaled to a wheel 88. Wheels 87 and 88 are located at either end of support 80, and this is best illustrated in FIG. 4, which is a fragmented, front elevation view of assembly 62, FIG. 5, which is a fragmented, rear elevation view of assembly 62, and FIG. 6, which is a fragmented, bottom plan view of assembly 62. Wheels 87 and 88 are also located on either side of frame 11 of bicycle 10 as shown in FIG. 1.

Figure 3:
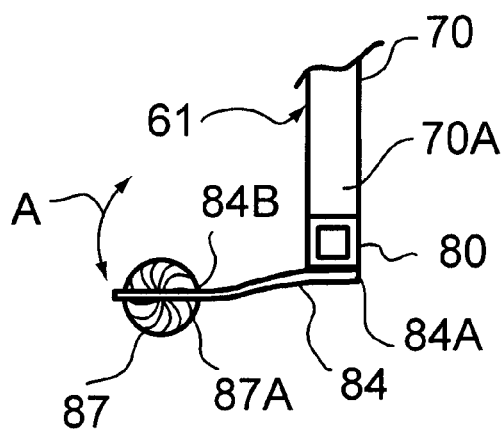
FIG. 3 is a fragmented, side elevation view of the front stabilizer assembly of FIG. 2.

Wheels 87 and 88 are conventional caster wheels or other like or similar wheel form, and conventional hubs 87A and 88A are used to journal wheels 87 and 88 to distal ends 84B and 85B of arms 84 and 85, respectively, as best illustrated in FIG. 6. Arms 84 and 85 are preferably formed of flat strips of spring steel, or other flexible and resilient material or combination of materials. The flexible, resilient character of arms 84 and 85 biases wheels 87 and 88 into engagement against the ground over which bicycle 10 is ridden and permits wheels 87 and 88 to interact with the ground over which bicycle 10 is ridden and reciprocally displace with respect to the ground and bicycle 10 as bicycle 10 is used in the normal manner. As a matter of illustration and reference, FIG. 3 is a side elevation view of assembly 61 illustrating arm 84 attached between wheel 87 and support 80, whereby the double, arcuate arrowed line A is indicative of the reciprocal movement of wheel 87 provided by arm 84.

Figure 7:
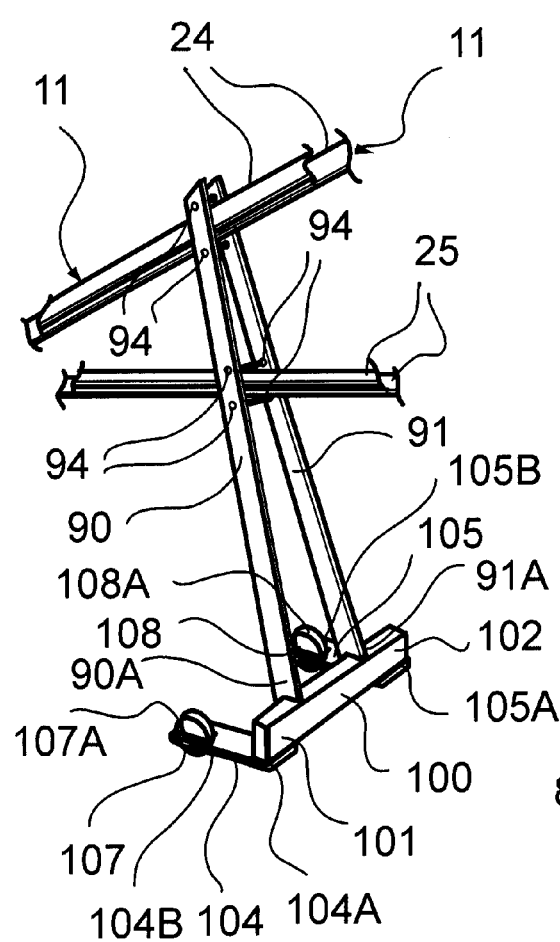
FIG. 7 is a fragmented perspective view of the bicycle of FIG. 1 illustrating the rear stabilizer assembly of the stabilization apparatus.

Referencing FIG. 7, assembly 62 consists of framework formed by opposed rear stays 90 and 91 rigidly affixed to frame 11. In the present embodiment, the framework formed by rear stays 90 and 91 is attached to seat stays 24 and chain stains 25 of frame 11. Stays 90 and 91 are fashioned of strong, rigid material, such as steel, aluminum, carbon fiber, or the like, are located on either side of the respective seat stays 24 and chain stays 25 of frame 11, and are clamped together to clamp onto and embrace seat stays 24 and chain stays 25 with fasteners 94, which may be rivets, nut-and-bolt assemblies, or the like. Stays 90 and 91 extend downwardly with respect to seat stays 24 and chain stays 25 of frame 11, and terminate with free ends 90A and 91A rigidly affixed, with welding or with fasteners such as rivets or screws or nut-and-bolt assemblies or the like, to a support 100, which, as shown in FIG. 1, is located just forwardly of rear wheel 27 under and opposing bottom bracket 53.

Figure 9:
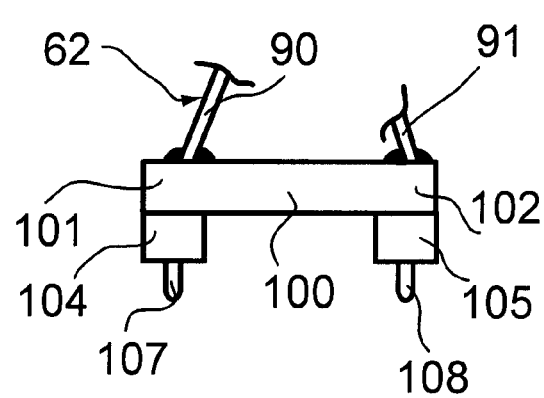
FIG. 9 is a fragmented, front elevation view of the rear stabilizer assembly of FIG. 7.

Support 100 is elongate, substantially horizontal, has opposed ends 101 and 102, and, like stays 90 and 91, is preferably fashioned of strong, rigid material, such as steel, aluminum, carbon fiber, or the like. Elongate flexible arms 104 and 105 are attached at either end of support 100. Arm 104 has a proximal end 104A affixed, with welding or with fasteners such as rivets or screws or nut-and-bolt assemblies or the like, to support 100 proximate to end 101 of support 100, and extends rearwardly of support 100, and toward rear wheel 27 as shown in FIG. 1, to a distal end 104B journaled to a wheel 107. Arm 105 has a proximal end 105A affixed, with welding or with fasteners such as rivets or screws or nut-and-bolt assemblies or the like, to support 100 proximate to end 102 of support 100, and extends rearwardly of support 100, and toward rear wheel 27 as shown in FIG. 1, to a distal end 105B journaled to a wheel 108. Wheels 107 and 108 are located at either end of support 100, and this is best illustrated in FIG. 9, which is a fragmented, front elevation view of assembly 62, FIG. 10, which is a fragmented, rear elevation view of assembly 62, and FIG. 11, which is a fragmented, bottom plan view of assembly 62. Wheels 107 and 108 are also located on either side of frame 11 of bicycle 10 as shown in FIG. 1.

Figure 8:
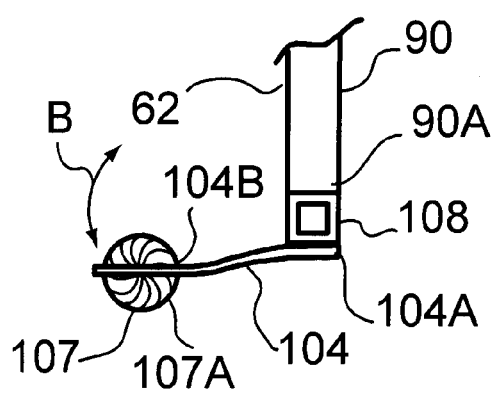
FIG. 8 is a fragmented, side elevation view of the rear stabilizer assembly of FIG. 7.

Wheels 107 and 108 are conventional caster wheels or other like or similar wheel form, and conventional hubs 107A and 108A are used to journal wheels 107 and 108 to distal ends 104B and 105B of arms 104 and 105, respectively, as best illustrated in FIG. 11. Arms 104 and 105 are preferably formed of flat strips of spring steel, or other flexible and resilient material or combination of materials. The flexible, resilient character of arms 104 and 105 biases wheels 107 and 108 into engagement with the ground over which bicycle 10 is ridden and permits wheels 107 and 108 to interact with the ground over which bicycle 10 is ridden and to reciprocally displace with respect to the ground and bicycle 10 as bicycle 10 is used in the normal manner. As a matter of illustration and reference, FIG. 8 is a side elevation view of assembly 62 illustrating arm 104 attached between wheel 107 and support 100, whereby the double, arcuate arrowed line B is indicative of the reciprocal movement of wheel 107 provided by arm 104.

Wheels 87 and 88 of assembly 61 define two wheeled contact points of stabilization apparatus 60 proximate to front end 12 of bicycle 10 on either side of frame 11 and front wheel 35 of bicycle 10, and wheels 107 and 108 of assembly 62 define two wheeled contact points of stabilization apparatus 60 proximate to rear end 13 of bicycle 10 on either side of frame 11 and rear wheel 27 of bicycle 10. As such, wheels 87, 88, 107, and 108 of stabilization apparatus 60 form four wheeled contact points, two on either side of bicycle 10, to stabilize bicycle 10 during the normal use thereof as bicycle is ridden over the ground. Wheels 87 and 107 on one side of bicycle 10 and wheels 88 and 108 on the opposing side of bicycle 10 form a four-point wheeled footprint, whereby wheels 87, 88, 107, and 108 engage against and wheelingly interact with the ground over which bicycle 10 is ridden stabilizing bicycle 10 during the normal use thereof to assist users that are uncoordinated or may suffer from a balance disorder in safely riding bicycle 10. As previously explained, the flexible, resilient character of arms 84 and 85 biases wheels 87 and 88 into engagement against the ground over which bicycle 10 is ridden and permits wheels 87 and 88 to interact with the ground over which bicycle 10 is ridden and reciprocally displace with respect to the ground and bicycle 10 as bicycle 10 is used in the normal manner, the flexible, resilient character of arms 104 and 105 biases wheels 107 and 108 into engagement with the ground over which bicycle 10 is ridden and permits wheels 107 and 108 to interact with the ground over which bicycle 10 is ridden and to reciprocally displace with respect to the ground and bicycle 10 as bicycle 10 is used in the normal manner. Moreover, the flexible, resilient character of arms 84 and 85 not only biases wheels 87 and 88 into engagement against the ground over which bicycle 10 is ridden but also permit wheels 87 and 88 to reciprocate with respect to bicycle 10 and the ground over which bicycle 10 is ridden to allow bicycle 10 to be leaned somewhat to each side to allow bicycle 10 to be easily turned to the left and to the right with ease while ensuring wheels 87 and 88 remain in contact with the ground to provide the required stabilization, in accordance with the principle of the invention. Similarly, the flexible, resilient character of arms 104 and 105 not only biases wheels 107 and 108 into engagement against the ground over which bicycle 10 is ridden but also permit wheels 107 and 108 to reciprocate with respect to bicycle 10 and the ground over which bicycle 10 is ridden to allow bicycle 10 to be leaned somewhat to each side to allow bicycle 10 to be easily turned to the left and to the right with ease while ensuring wheels 107 and 108 remain in contact with the ground to provide the required stabilization, in accordance with the principle of the invention.

The frameworks of the front and rear stabilizer assemblies 61 and 62 can be secured to frame 11 at any suitable location and in any way suitable to rigidly secure them in place so as to operate in accordance with the teachings provided by this specification. Also, FIG. 12 is a side elevation view of an alternate embodiment of a stabilizer assembly 110 for use with a stabilization apparatus constructed and arranged in accordance with the principle of the invention. In common with stabilizer assembly 61, stabilizer assembly 110 shares the front stays (only stay 70 is depicted), support 80, and the wheels attached to support 80 with the arms (only wheel 87 and arm 84 are depicted). In assembly 110, a wheel 111, such as conventional caster wheel or other wheel form like that of wheel 87, is journaled with a conventional hub 112 to support 80. In this embodiment, wheel 111 is available to make wheeled contact with the ground over which the bicycle to which assembly 110 is attached to is ridden when the bicycle is turned too far to the left or to the right, and this provides additional stabilization. Assembly 110 in FIG. 12 has one wheel 111 journaled to support 80, and more can be journaled to support 80 as may be desired. Stabilizer assembly 62 of stabilization apparatus 60 may be similarly modified according to the assembly depicted in FIG. 12.

FIG. 13 is a front elevation view of an alternate embodiment of a stabilizer assembly 120 for use with a stabilization apparatus constructed and arranged in accordance with the principle of the invention. In common with stabilizer assembly 61, stabilizer assembly 110 shares the front stays 70 and 71 and attached arm support 80. In this embodiment an elongate rigid extension 121 is affixed to end 81 of arm support 80, and an elongate rigid extension 122 is affixed to end 82 of arm support 80. Extensions 121 and 122 extend outwardly with respect to ends 81 and 82, respectively, of arm support 80, and terminate with outer ends 121A and 122A, respectively. Arm 84 and wheel 87 are attached at end 121A of extension 121, and arm 85 and wheel 88 are attached at end 122A of extension 122. In this embodiment, extensions 121 and 122 provide a broader footprint of wheels 87 and 88 for even further increased stabilization as compared to the narrower footprint of wheels 87 and 88 in assembly 61. Stabilizer assembly 62 of stabilization apparatus 60 may be similarly modified according to the assembly depicted in FIG. 12.

Figure 14:
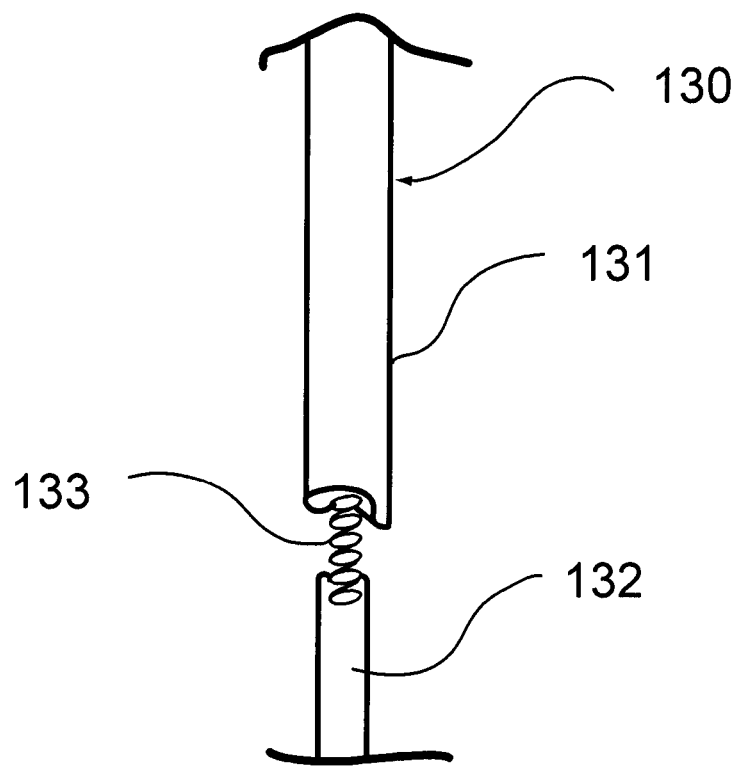
FIG. 14 is a fragmented, side elevation view of a stay for use with a stabilizer assembly of a stabilization apparatus constructed and arranged in accordance with the principle of the invention, in which portions of the stay are cutaway from illustrative purposes.

FIG. 14 is a fragmented, side elevation view of a stay 130 for use with a stabilizer assembly of a stabilization apparatus constructed and arranged in accordance with the principle of the invention, in which portions of stay 130 are cutaway from illustrative purposes. Stay 130 can be used in place each front stay of assembly 61, and/or each rear stay of assembly 62. In this embodiment, stay 130 is formed by a pair of reciprocally mounted elongate stay members 131 and 132 including a spring 133 formed there between that acts against stay members 131 and 132 biasing them apart. Stay members 131 and 132 reciprocate with respect to each other allowing stay 130 to assume shortened and lengthened conditions or positions as the bicycle having a stabilizer assembly incorporating stay 130 is turned to the left and to the right, and spring 133 functions to urge stay 130 into its lengthened condition or position to ensure the stabilization wheels associated with stay 130 remain in contact with the ground over which a bicycle is ridden. The embodiment in FIG. 14 is exemplary of a reciprocating stay assembly, and other reciprocating mechanisms can be used in other embodiments, such as pneumatic reciprocating stay members, hydraulic reciprocating stay members, etc.

Stabilization apparatus 60 is disclosed in connection with bicycle 10, which is exemplary of a non-motorized two-wheeled vehicle incorporating a front wheel positioned in front of an opposed rear wheel that is in-line with respect to the front wheel. It is to be understood that a stabilization apparatus constructed and arranged in accordance with the principle of the invention is not only particularly useful with bicycles, but may also be utilized with equally-exemplary results with scooters and other like or similar motorized two-wheeled vehicles.

Figure 15:
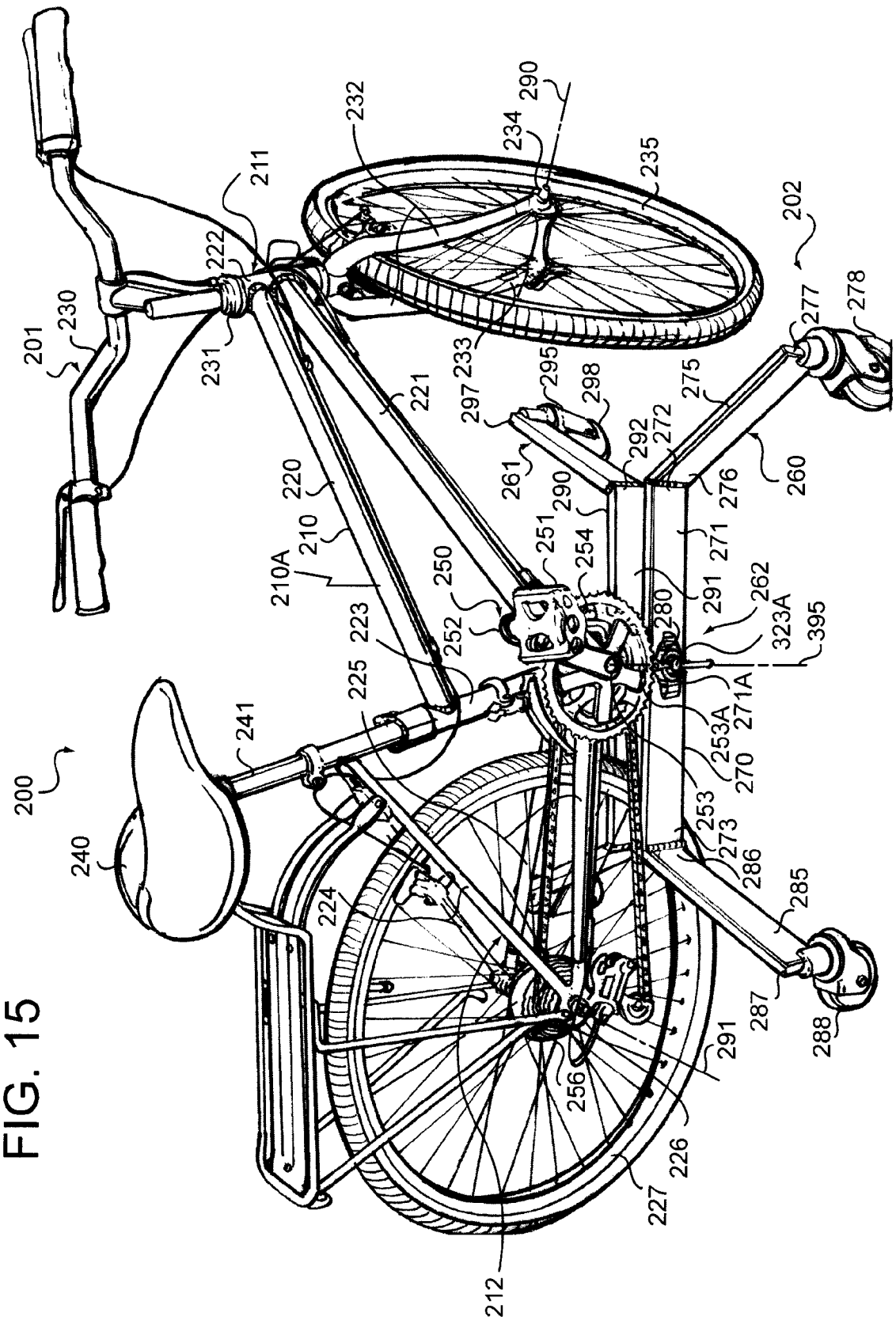
FIG. 15 is a vehicle assembly constructed and arranged in accordance with an alternate embodiment of the invention, the vehicle assembly including a vehicle in the form of a bicycle fitted with a stabilization apparatus constructed and arranged in accordance with the principle of the invention.

Reference is now made to FIG. 15 illustrating a vehicle assembly 200 constructed and arranged in accordance with an alternate embodiment of the invention, which includes a vehicle in the form of a bicycle 201 fitted with a stabilization apparatus 202 constructed and arranged in accordance with the principle of the invention. Bicycle 201 includes a frame 210 having a front or forward end denoted generally at 211, an opposed rear or rearward end denoted generally at 212, and opposed sides including side 210A denoted in FIG. 1 and opposed side 210B denoted in FIG. 2. Side 210A is considered the right side of bicycle 201 and opposed side 210B is considered the left side of bicycle 201. Front end 212 of frame 210 is considered the front end of bicycle 201, and rear end 212 of frame 210 is considered the rear end of bicycle 201. Frame 210 consists of a top tube 220 and an opposed bottom or down tube 221 that extend between front 211 and rear 212. Top and bottom tubes 220 and 221 are connected at front 211 with a head tube 222, and are connected at rear 212 with an upright seat tube 223. Opposed seat stays 224 are connected to seat tube 223 proximate to rear 212 of frame 210, and opposed chain stays 225 are connected to down tube 221 and seat tube 223 proximate to rear 212 of frame 210. Seat stays 224 extend downwardly and rearwardly from seat tube 223, chain stays 225 extend rearwardly of bottom tube 221 and seat tube 223, and seat stays 224 and chain stays 225 meet and connect at rear 212 of frame 210 and are coupled to a rear hub 226 of a rear wheel 227.

At front 222 of frame 210, handlebars 230 are connected to head tube 222 with a headset 231 that is connected to the upper end of a fork stem (not shown) that extends downwardly through head tube 222 to front forks 232, which extend downwardly and terminate with free ends 233 connected to a front hub 234 of a front wheel 235. Front wheel 235 is positioned in front of rear wheel 227, and rear wheel 227 is substantially in-line with respect to front wheel 235 as is typical and well-known with a conventional bicycle. A seat 240 is mounted to a seat post 241 that extends into and is rigidly connected to seat tube 223.

Figure 16:
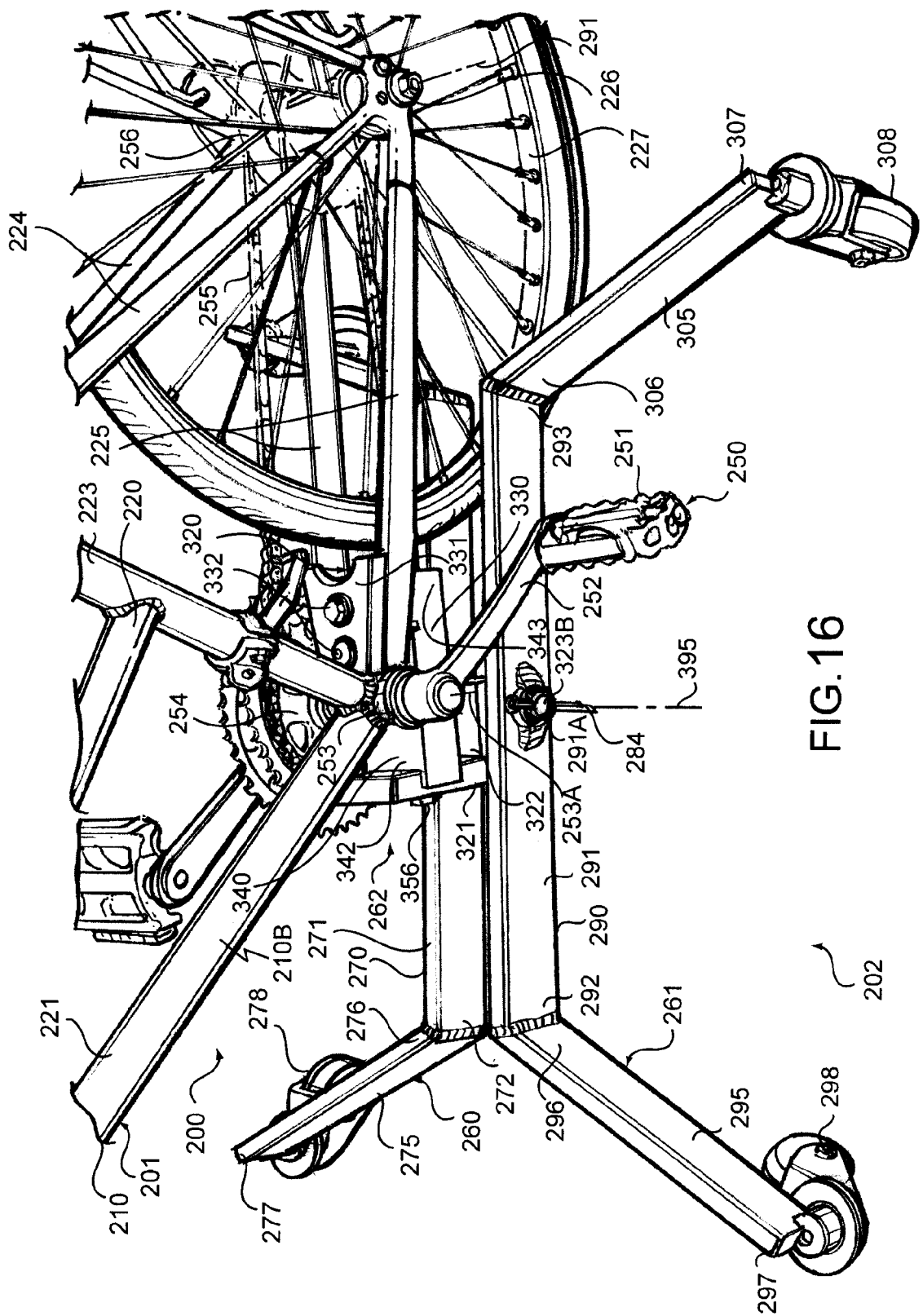
FIG. 16 is an enlarged, fragmented perspective view of the vehicle assembly of FIG. 15 showing an enlarged view of the stabilization apparatus.

Referencing FIGS. 15 and 16 in relevant part, bicycle 201 is pedal-driven, and includes a pedal-driven drive train 250 consisting of pedals 251 attached to crank arms 252 rigidly connected to a bottom bracket 253 shown in FIG. 16 that is, in turn, rigidly connected to a chainring 254. Bottom bracket 253 forms part of frame 210, and is located between front and rear wheels 235 and 227 attached to frame 210. An endless chain 255 concurrently encircles and operatively couples chainring 254 to cassette 256 formed in rear hub 226 to impart rotation to rear wheel 227 in response to rotation of chainring 254 made through a pedaling action applied to pedals 251, such as by a user seated on seat 240 referenced in FIG. 15. Pedals 251 and crank arms 252 rotate about axis 253A of bottom bracket 253. Drive train 250 is a conventional form of a pedaled drive train commonly found among conventional bicycles, further details of which will readily occur to those having ordinary skill in the art.

Bicycle 201 is a form of a vehicle. Moreover, bicycle 201 is exemplary of a non-motorized two-wheeled vehicle, is entirely conventional and is generally representative of any one of a variety of commercially available bicycles, which, in the present example, is a variety of bicycle commonly referred to as a mountain bike. Accordingly, further details of bicycle 201 not herein specifically disclosed will readily occur to those having ordinary skill and are not discussed in further detail.

In accordance with the principle of the invention, bicycle 201 is formed with stabilization apparatus denoted generally at 202. The combination of bicycle 201 and stabilization apparatus 202 forms a vehicle, a bicycle assembly, or a vehicle assembly according to the principle of the invention. Apparatus 202 includes opposed stabilizer assemblies 260 and 261, and a connector assembly 262 shown in FIG. 16. Assemblies 260 and 261 are elongate framework assemblies and are wheeled or wheel assemblies which are attached to bicycle 201 with connector assembly 262 as shown in FIG. 16, and the connecting point of connector assembly 262 to frame 210 is at point between the opposed front and rear wheels 235 and 227 of bicycle 201. More particularly, assemblies 260 and 261 are attached to frame 210 of bicycle 201 at a location between opposed front and rear wheels 235 and 227 of bicycle 201 with connector assembly 262. Assemblies 260 and 261 interact with the ground and cooperate together to stabilize bicycle 201 during use to assist a user using bicycle 201 in the normal manner in balancing bicycle, and this is particularly useful for users that suffer from balance disorders or who are uncoordinated. Assembly 260 is located at and extends along the side 210A of frame 210 of bicycle 201, and assembly 261 is located at and extends along the side 210B of bicycle 201.

Figure 17:
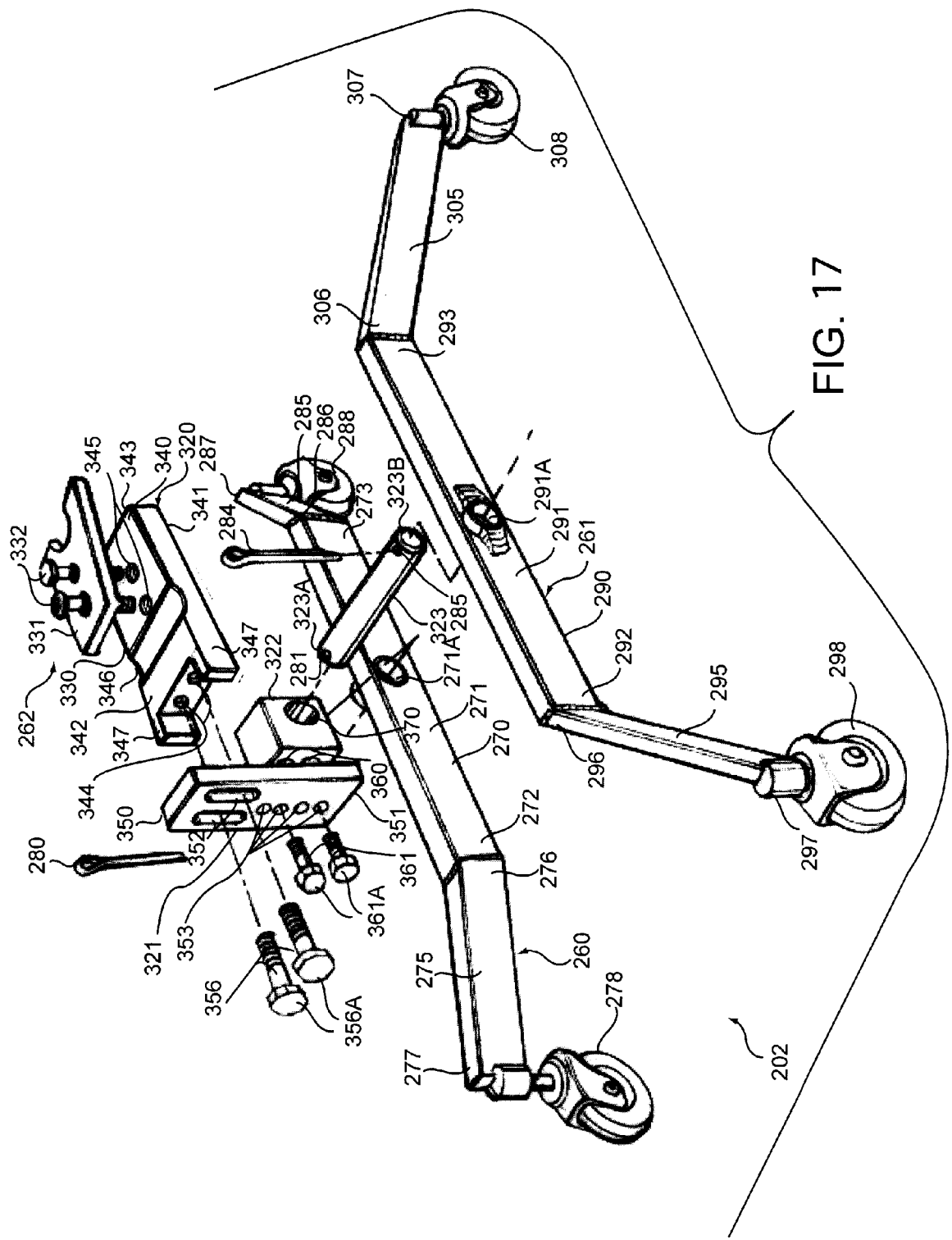
FIG. 17 is an exploded perspective view of the stabilization apparatus of FIG. 15.

Looking now to FIG. 17, which is an exploded perspective view of apparatus 202, assembly 260 consists of a support assembly 270, which is fashioned of aluminum, carbon fiber, steel, or other like or similar substantially rigid material or combination of materials, and which may be integrally formed or formed from a plurality of attached parts attached by way of welding or other form of competent joinery. Assembly 260 includes an elongate support member 271 having opposed leading and trailing ends 272 and 273. A front arm 275 has an inner or proximal extremity or end 276 attached to leading end 272 of elongate support member 271 and extends angularly outwardly therefrom with respect to elongate support member 271 to an outer or distal extremity or end 277 formed with an attached stabilizer wheel 278 that extends downwardly from outer end 277. With outer end 277 formed with stabilizer wheel 278, outer end 277 is considered a wheeled end. A rear arm 285 has an inner or proximal extremity or end 286 attached to leading end 282 of elongate support member 281 and extends angularly outwardly therefrom with respect to elongate support member 281 to an outer or distal extremity or end 287 formed with an attached stabilizer wheel 288 that extends downwardly from outer end 287. With outer end 287 formed with stabilizer wheel 288, outer end 287 is considered a wheeled end. Wheel 278 is substantially in-line with respect to wheel 288, in which case the wheeled end defined at end 277 is substantially in-line with respect to the wheeled end defined at end 287. Stabilizer wheels 278 and 288 are each conventional caster wheels, which swivel and rotate.

Assembly 261 is substantially coextensive with respect to assembly 261, is the mirror image of assembly 260 and consists of a support assembly 290 that, like support assembly 270, is fashioned of aluminum, carbon fiber, steel, or other like or similar substantially rigid material or combination of materials, and which may be integrally formed or formed from a plurality of attached parts attached by way of welding or other form of competent joinery. Assembly 290 includes an elongate support member 291 having opposed leading and trailing ends 292 and 293. A front arm 295 has an inner or proximal extremity or end 296 attached to leading end 292 of elongate support member 291 and extends angularly outwardly therefrom with respect to elongate support member 291 to an outer or distal extremity or end 297 formed with an attached stabilizer wheel 298 that extends downwardly from outer end 297. With outer end 297 formed with stabilizer wheel 298, outer end 297 is considered a wheeled end. A rear arm 305 has an inner or proximal extremity or end 306 attached to leading end 302 of elongate support member 301 and extends angularly outwardly therefrom with respect to elongate support member 301 to an outer or distal extremity or end 307 formed with an attached stabilizer wheel 308 that extends downwardly from outer end 307. With outer end 307 formed with stabilizer wheel 308, outer end 307 is considered a wheeled end. Wheel 298 is substantially in-line with respect to wheel 308, in which case the wheeled end defined at end 297 is substantially in-line with respect to the wheeled end defined at end 307. Stabilizer wheels 298 and 308 are each conventional caster wheels, which swivel and rotate.

Connector assembly 262 is formed by a bracket assembly 320, a support fixture 321, a block 322, and an elongate member or axle 323 having opposed end portions 323A and 323B, each of which is formed of aluminum, steel, or other like or similar substantially rigid material or combination of materials. Bracket assembly 320 attaches to frame 210 of bicycle 201 between front and rear wheels 235 and 227 of bicycle 201, support fixture 321 attaches to bracket assembly 320, block 322 attaches to support fixture 321, axle 323 is held by block 322, stabilizer assembly 260 attaches to, and is supported by, end portion 323A of axle 323 along the side 210A of bicycle 201 as seen in FIG. 15, and stabilizer assembly 261 attaches to, and is supported by, end portion 323B of axle 323 along the side 210B of bicycle 201 as seen in FIG. 16.

Bracket assembly 320 includes a base 330, a plate 331, and threaded fasteners 332, which, in this example, are threaded bolts. Base 330 has opposed upper and lower surfaces 340 and 341, opposed front and rear ends 342 and 343, threaded openings 344 formed in front end 342, threaded openings 345 formed into base 330 through upper surface 340 between front and rear ends 342 and 343, and a generally concave transverse recess 346 positioned between threaded openings 345 and front end 342 that extends between the opposed sides of base 330. Front end 342 is formed with a pair of opposed, substantially parallel extensions 347 formed on either side of threaded openings 344, which project forwardly of front end 342.

Figure 18:
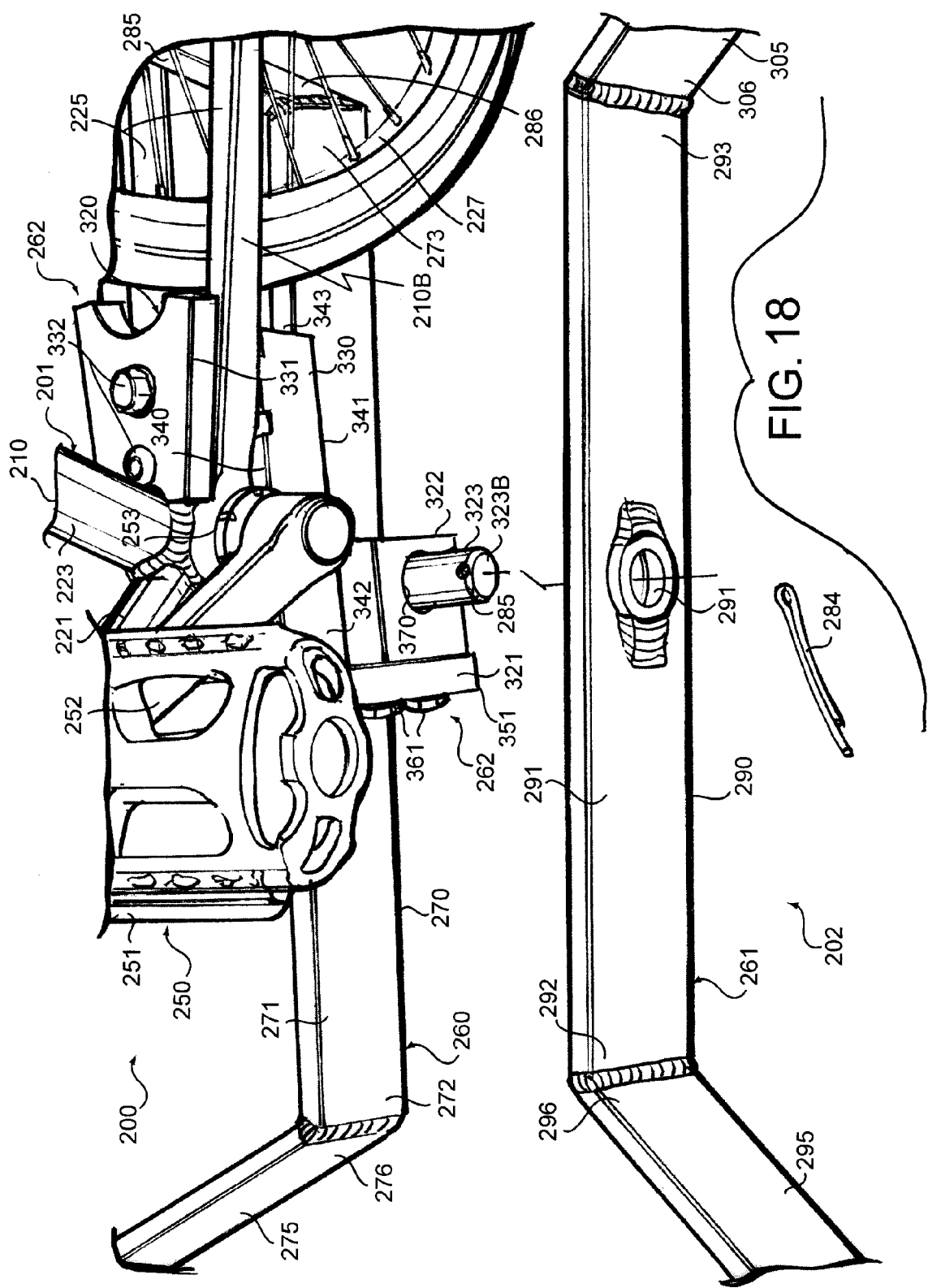
FIG. 18 is an enlarged, fragmented perspective view of the stabilization apparatus of FIG. 15 illustrating an elongate support member of the stabilization apparatus as it would appear detached from an end portion of an axle of the stabilization apparatus.
Figure 20:
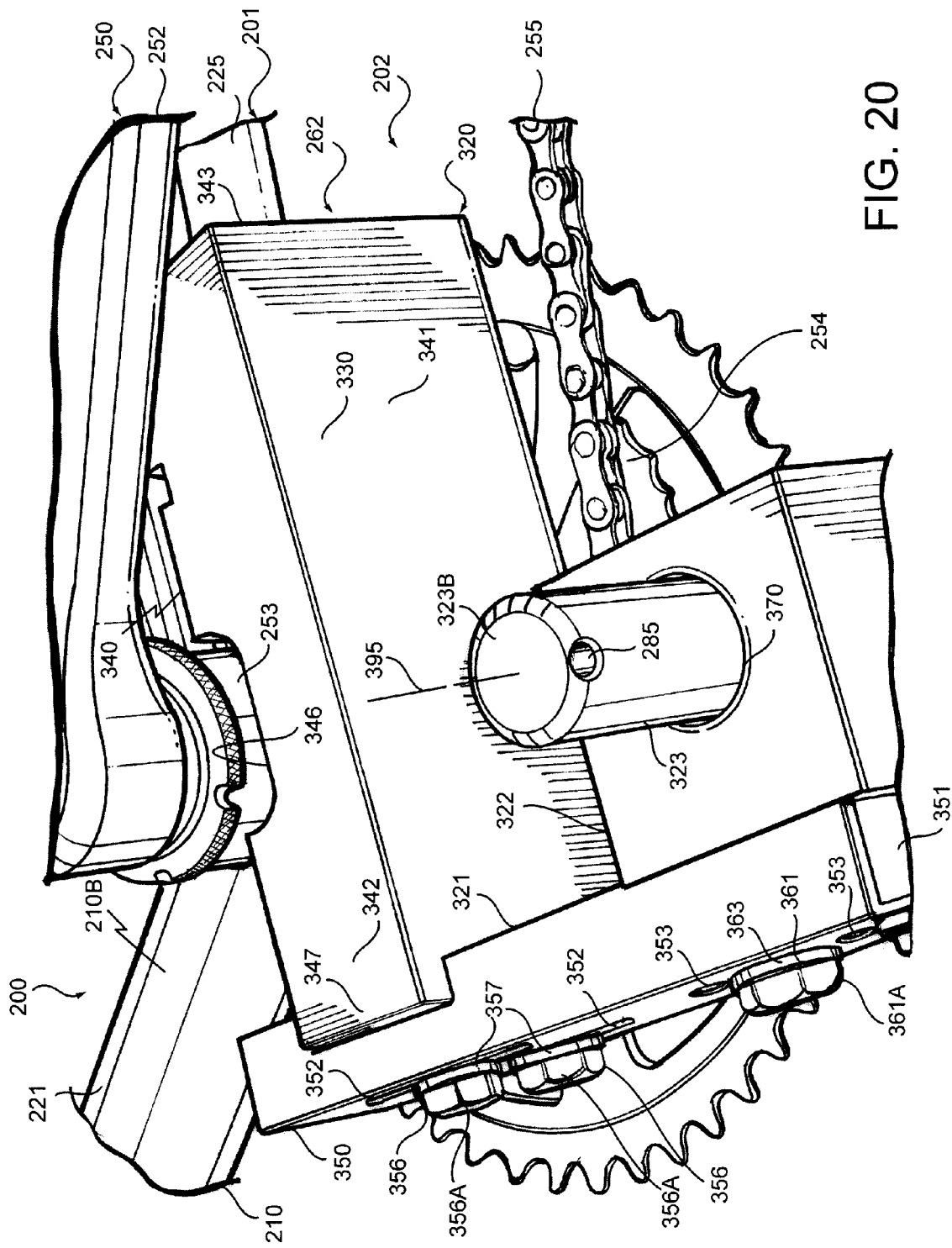
FIG. 20 is yet another enlarged, fragmented perspective view of the vehicle assembly of FIG. 15 illustrating a connector assembly of the stabilization apparatus.

Referencing FIGS. 16, 18, and 20, base 330 is applied to the underside of frame 210 of bicycle 201 at bottom bracket 253. Upper surface 340 of base 330 is applied to and against the underside of frame 210 locating bottom bracket 253 in recess 346 as seen in FIG. 20, in which front end 342 of base 330 extends forwardly with respect to bottom bracket 253 toward the front end of frame 210 of bicycle 201, and rear end 343 of base 330 extends rearwardly with respect to bottom bracket 253 toward the rear end of frame 210 of bicycle 201 along the underside of chain stays 225 referenced in FIGS. 16, 18, and 20. Plate 331 is applied against the top side of chain stays 225 opposing base 330 just rearwardly of seat tube 223 and bottom bracket 253 as seen in FIGS. 16 and 18, and is secured to base 330 with threaded fasteners 332, which extend through openings formed in plate 331 and into and through the gap between chain stays 225 and which are threadably received by threaded openings 345 (FIG. 17) formed in base 330 and which are then rotated and tightened thereby rigidly plate 331 to base 330 and rigidly securing chain stays 225 between plate 331 and base 330 and rigidly securing locating bottom bracket 253 in recess 346 formed in base 330.

Figure 19:
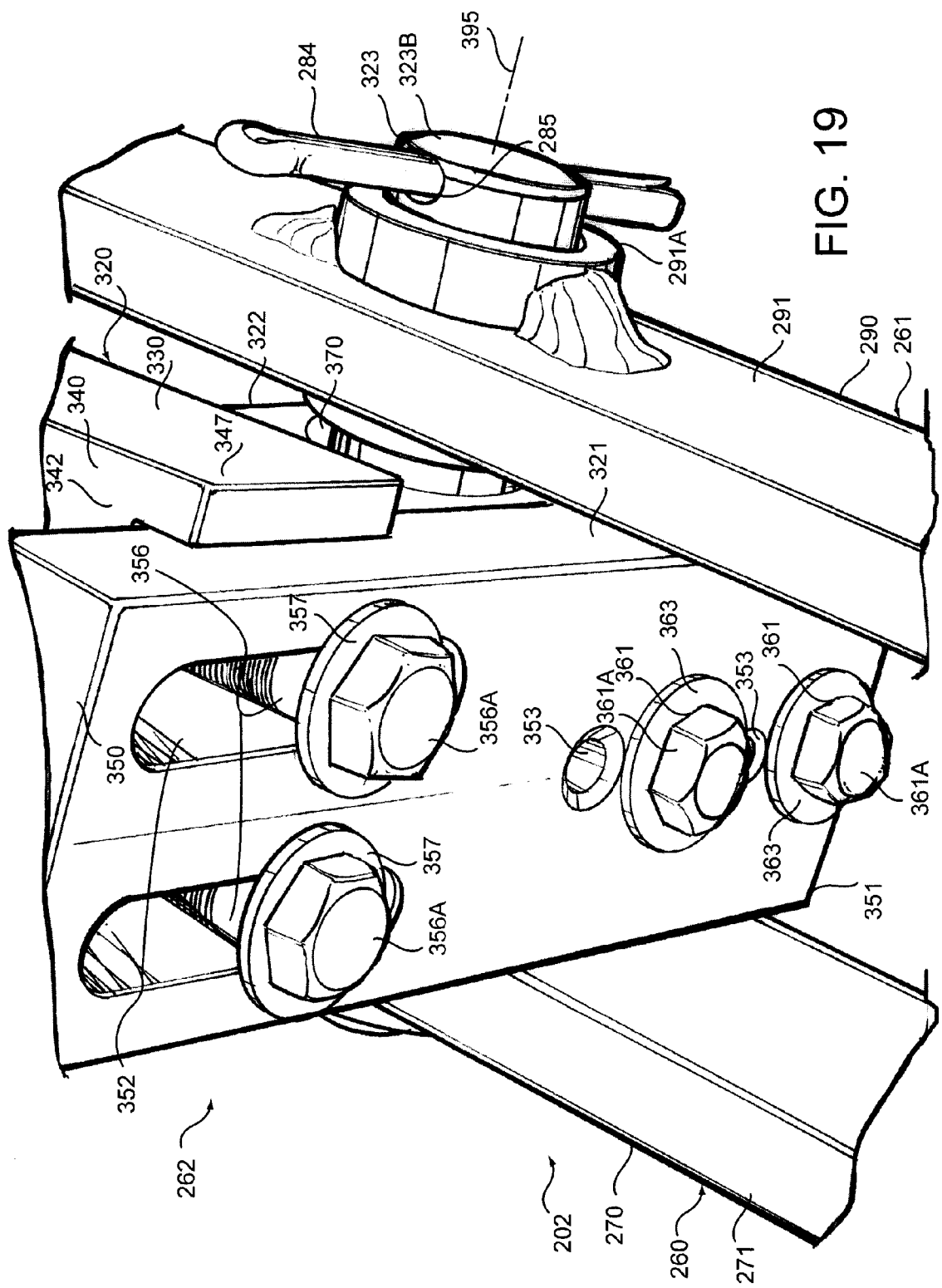
FIG. 19 is an enlarged, fragmented perspective view of a connector assembly of the stabilization apparatus of the vehicle assembly of FIG. 15.

Looking to FIGS. 17 and 19, support fixture 321 has opposed upper and lower ends 350 and 351, a pair of opposed, vertical, parallel, substantially coextensive slots 352 formed therethrough proximate to upper end 350, and, as best seen in FIG. 17, a row of openings 353 formed therethrough extending vertically between lower end 351 and slots 352. Upper end 350 of support fixture 231 is applied against front end 342 of base 330 between extensions 347 as best seen in FIG. 19 registering slots 352 with threaded openings 344 (FIG. 17) formed in front end 342 of base 330. Threaded fasteners 356, which in this example are threaded bolts, are applied into and through slots 352 and are threadably received by threaded openings 344 (FIG. 17) formed in front end 342 of base 330 and are then rotated and tightened thereby rigidly securing support fixture 321 to front end 342 of base 330. Support fixture 321 extends downwardly with respect to base 330 and frame 210 of bicycle 201 from upper end 350 to lower end 351, which is attached to block 322. As best seen in FIG. 19, washers 357 encircle threaded fasteners 356 and are positioned between heads 356A of fasteners 356 and support fixture 321.

Block 322 is formed with a pair of threaded openings 360 as illustrated in FIG. 17, and is positioned against the back side of support fixture 321 proximate to lower end 351 of support fixture 321 opposing lower face 341 of base 330 as best seen in FIG. 20 registering threaded openings 360 with a corresponding pair of the threaded openings 353 formed in support fixture 321. Threaded fasteners 361, which in this example are threaded bolts, are applied into and through the corresponding pair of openings 353 registered with threaded openings 360 formed in block 322, and are then rotated and tightened thereby rigidly securing support block 32 to support fixture 321 proximate to lower end 351 underneath and in opposition to base 330 thereby suspending block 322 below bottom bracket 253 and frame 210 of bicycle 201 below and underneath lower surface 341 of base 330. As best seen in FIG. 19, washers 363 encircle threaded fasteners 3361 and are positioned between heads 361A of fasteners 361 and support fixture 321. Connector assembly 262 may be readily detached from bicycle 201 by reversing the steps of installing bracket assembly 320 onto bicycle 201 as described above.

A bore or channel 370 is formed through block 322 as shown in FIG. 17, which extends transversely with respect to bicycle 201 from side 210A to side 210B. Axle or member 323 extends into and through channel 370 and is supported in and by channel 270 transversely with respect to bicycle 201 locating end portion 323A proximate to side 210A of bicycle 201 as shown in FIG. 15, and locating opposed end portion 323B proximate to side 210B of bicycle 201 as shown in FIGS. 16, 18, and 20.

As previously disclosed, stabilizer assembly 260 attaches to, and is supported by, end portion 323A of axle 323 along the side 210A of bicycle 201 and is supported underneath frame 210 of bicycle 201 as seen in FIG. 15, and stabilizer assembly 261 attaches to, and is supported by, end portion 323B of axle 323 along the side 210B of bicycle 201 and is supported underneath frame 210 of bicycle as seen in FIG. 16. Support member 271 is formed with an opening 271A formed therethrough illustrated in FIG. 17, which is positioned at an intermediate position between leading and trailing ends 272 and 273, and which is preferably substantially equidistant with respect to leading and trailing ends 272 and 273. End portion 323A is applied into and through opening 271A and is secured with a pin 280, as illustrated in FIG. 15, that captures support member 271 between end portion 323A and block 322 thereby securing stabilizer assembly 260 to connector assembly 262 secured to frame 210 of bicycle 201 and supporting stabilizer assembly 260 proximate to side 210A of bicycle 201. Pin 280 is received and secured by an opening 281 formed in end portion 323A illustrated in FIG. 17. Support member 291 is formed with an opening 291A formed therethrough as illustrated in FIGS. 17 and 18, which is positioned at an intermediate position between leading and trailing ends 292 and 293, and which is preferably substantially equidistant with respect to leading and trailing ends 292 and 293. End portion 323B is applied into and through opening 291A and is secured with a pin 284 as shown in FIGS. 16 and 19 that captures support member 291 between end portion 32BA and block 322 thereby securing stabilizer assembly 261 to connector assembly 262 secured to frame 210 of bicycle 201 and supporting stabilizer assembly 261 proximate to side 210B of bicycle 201. Pin 284 is received and secured by an opening 285 formed in end portion 323B illustrated in FIGS. 17-19.

Referencing FIGS. 15 and 16 in relevant part, wheeled stabilizer assemblies 260 and 261 are carried by the respective end portions 323A and 323B of axle or member 323 on either side 210A and 210B of frame 210 of bicycle 201 underneath frame 210 of bicycle 201 positioning support assemblies 270 and 290 so as to apply the wheeled ends of stabilizer assemblies 260 and 261 against the ground over which bicycle 201 is driven to permit the wheeled ends of stabilizer assemblies 260 and 261 to wheelingly interact with the ground over which bicycle 201 is driven to stabilize bicycle 201 as bicycle 201 is driven over the ground. As such, wheels 277 and 287 at wheeled ends 278 and 288 of stabilizer assembly 260, wheels 297 and 307 at wheeled ends 298 and 308 of stabilizer assembly 261, and front and rear wheels 235 and 227 of bicycle 201 concurrently roll over the ground over which bicycle 201 is driven such that front and rear wheels 235 and 227 of bicycle 201 operate in the normal manner while wheels 277 and 287 of stabilizer assembly 260 and wheels 297 and 307 of stabilizer assembly 261 are supported against the ground over which bicycle 201 is ridden such that stabilizer assemblies 260 and 261 interact with the ground to stabilize bicycle 201 as it is driven preventing bicycle 201 from tipping over, according to the principle of the invention.

With continuing reference in relevant part to FIGS. 15 and 16, with respect to stabilizer assembly 260, elongate support member 271 is disposed proximate to and extends along the side 210A of frame 210 of bicycle 201 from leading end 272 directed toward front wheel 235 of bicycle 201 and trailing end 273 directed toward rear wheel 227, whereby front arm 275 attached to leading end 272 of elongate support member 271 extends outwardly therefrom with respect to elongate support member 271 and side 210A of frame 210 of bicycle 201 to wheeled end 277, which is disposed or otherwise located proximate to and outboard of front wheel 235 of bicycle 201, and rear arm 285 attached to trailing end 273 of elongate support member 271 extends outwardly therefrom with respect to elongate support member 271 and side 210A of frame 210 of bicycle 201 to wheeled end 287, which is disposed proximate to and outboard of rear wheel 227 of bicycle 201. With respect to stabilizer assembly 261, elongate support member 291 is disposed proximate to and extends along the side 210B of frame 210 of bicycle 201 from leading end 292 directed toward front wheel 235 of bicycle 201 and trailing end 293 directed toward rear wheel 229, whereby front arm 295 attached to leading end 292 of elongate support member 291 extends outwardly therefrom with respect to elongate support member 291 and side 210B of frame 210 of bicycle 201 to wheeled end 297, which is disposed or otherwise located proximate to and outboard of front wheel 235 of bicycle 201, and rear arm 305 attached to trailing end 293 of elongate support member 291 extends outwardly therefrom with respect to elongate support member 291 and side 210B of frame 210 of bicycle 201 to wheeled end 307, which is disposed proximate to and outboard of rear wheel 229 of bicycle 201.

When mounted to bicycle 201 according to this disclosure, stabilizer assemblies 260 and 261 are the mirror image of one another, and elongate support members 271 and 291 of stabilizer assemblies 260 and 261, respectively, oppose each and are substantially parallel with respect to each other, and are located toward sides 210A and 210B, respectively, of frame 210 and underneath frame 210 so as not to interfere with the normal pedaling action of pedals 251 and crank arms 251, which takes place along the outer side of elongate support members 271 and 291 between the leading ends 272 and 292 of elongate support members 271 and 291, respectively, and trailing ends 273 and 293 of elongate support members 271 and 291, respectively. Moreover, the pedaling action of pedals 251 and crank arms 251 takes place along the outer side of elongate support members 271 and 291 between front arms 275 and 295 of elongate support members 271 and 291, respectively, and rear arms 285 and 305 of elongate support members 271 and 291, respectively. With reference to FIG. 15, front wheel 235 of bicycle 201 rotates about an axis of rotation denoted at 390, rear wheel 227 rotates about an axis of rotation denoted at 391, front or forward stabilizer wheels 278 and 298 of stabilizer assemblies 260 and 261, respectively, are positioned proximate to axis of rotation 390 of front wheel 235, and rear or rearward stabilizer wheels 288 and 308 of stabilizer assemblies 260 and 261, respectively, are positioned proximate to axis of rotation 391 of rear wheel 227.

Of course, in the use of bicycle 201 in its normal manner with apparatus 202 attached thereto as explained in detail and as shown in FIGS. 15 and 16, stabilizer assemblies 260 and 261 are positioned to ensure that support assemblies 270 and 290 are oriented and positioned to ensure that front and rear wheels 235 and 227 of bicycle 201 and the four wheeled ends of stabilizer assemblies 260 and 261 concurrently interact with the ground over which bicycle 201 is driven to permit stabilizer assemblies 260 and 261 of apparatus 202 work in accordance with their intended purpose which is to cooperate together to stabilize bicycle 201 as it is driven over the ground by preventing bicycle 201 from tipping over on one side or the other. And so apparatus 202 is constructed, arranged, and sized to fit onto bicycle 201 to function in this way. The four wheeled ends of stabilizer assemblies 260 and 261 concurrently interact with the ground over which bicycle 201 is driven to form a four-point wheeled footprint that engage against and wheelingly interact with the ground over which bicycle 201 is ridden stabilizing bicycle 201 during the normal use thereof to assist users that are uncoordinated or may suffer from a balance disorder in safely riding bicycle 201.

Apparatus 202 is designed to be removably attached to any bicycle, and bicycles come in different sizes and shapes and have different clearances between the frame and the ground over which the bicycle is ridden. As such, connector assembly 262 is configured to permit adjustment of stabilizer assemblies 260 and 261 between a raised position toward frame 210 as shown in FIG. 22, and a lowered position away from frame 210 as shown in FIG. 24, and this reciprocal movement of stabilizer assemblies 260 and 261 is denoted generally by the double arrowed line C in FIGS. 22 and 24.

Movement of stabilizer assemblies 260 and 261 attached to connector assembly 262 secured to bicycle 201 between raised and lowered positions can be carried out through the adjustment of support fixture 321, which is mounted to base 330 for movement between a raised position toward frame 210 and away from the ground over which bicycle 201 is driven and a lowered position away from frame 210 and toward the ground over which bicycle 201 is driven, the adjustment of block 322, which is mounted to support fixture 321 for movement between a raised position toward frame 210 and away from the ground over which bicycle 201 is driven and a lowered position away from frame 210 and toward the ground over which bicycle 201 is driven, or through the adjustment of both the support fixture 321 and block 322.

Looking to FIG. 21, slots 352 through support fixture 321 are elongate and substantially vertically with respect to the ground over which bicycle 201 is ridden. When threaded fasteners 356 are loosened, support fixture 321 may be moved relative to base 330 between a raised position as shown in FIGS. 21 and 22 locating stabilizer assemblies 260 and 261 secured to member 323 secured to block 322 fastened to support fixture 321 at a raised position, and a lowered position as shown in FIGS. 23 and 24 locating stabilizer assemblies 260 and 261 secured to member 323 secured to block 322 fastened to support fixture 321 at a lowered position. Slots 352 are substantially equal in length, and the amount of travel of support fixture 321 between its raised and lowered positions is limited by the length of slots 352, which limit the travel of threaded fasteners 356 through slots 352 when support fixture 321 is moved between its raised and lowered positions. After support fixture 321 is disposed at a desired location, threaded fasteners 356 are tightened to secure support fixture 321 in place relative to base 330. Of course, movement of support fixture 321 between its raised and lowered positions results in the corresponding movement of axle or member 323 attached to support fixture 321 via block 322 between a raised position of end portions 323A and 323B toward frame 210 of bicycle 201 away from the ground over which bicycle 201 is driven, and a lowered position of end portions 323A away from frame 210 of bicycle 201 toward the ground over which bicycle 201 is driven. With stabilizer assemblies 260 and 261 attached to end portions 323A and 323B, respectively, it is to be understood that this movement of end portions 323A and 323B between raised and lowered positions through the movement of member 323 between raised and lowered positions provides corresponding movement of stabilizer assemblies 260 and 261 between raised and lowered positions.

Looking back to FIG. 17, block 322 that carries member 323 is formed with the pair of threaded openings 360, which are aligned with a corresponding pair of the openings 353 formed into and through support fixture 321 and secured in place with threaded fasteners 361, and this permits movement of block 321 relative to support fixture 321 between a raised position as shown in FIGS. 23 and 24 locating stabilizer assemblies 260 and 261 secured to member 323 secured to block 322 fastened to support fixture 321 at corresponding raised position, and a lowered position as shown in FIGS. 21 and 22 locating stabilizer assemblies 260 and 261 secured to member 323 secured to block 322 fastened to support fixture 321 at a corresponding lowered position. In FIGS. 21 and 22, threaded fasteners 361 are threadably received by threaded openings 360 (FIG. 17) in block 322 securing block 322 to support fixture 321, and threaded fasteners 361 are received in a corresponding lower pair of openings 353 (FIG. 17) in support fixture 321 that corresponds to the lowered position of block 32. In FIGS. 23 and 24, threaded fasteners 361 are threadably received by threaded openings 360 (FIG. 17) in block 322 securing block 322 to support fixture 321, and threaded fasteners 361 are received in a corresponding upper pair of openings 353 (FIG. 17) in support fixture 321 that corresponds to the raised position of block 32. Of course, movement of block 322 between its raised and lowered positions results in the corresponding movement of axle or member 323 carried by block 322 between a raised position of end portions 323A and 323B toward frame 210 of bicycle 201 away from the ground over which bicycle 201 is driven, and a lowered position of end portions 323A away from frame 210 of bicycle 201 toward the ground over which bicycle 201 is driven. With stabilizer assemblies 260 and 261 attached to end portions 323A and 323B, respectively, it is to be understood that this movement of end portions 323A and 323B between raised and lowered positions through the movement of block 322 between raised and lowered positions provides corresponding movement of stabilizer assemblies 260 and 261 between raised and lowered positions.

Looking back in relevant part to FIGS. 15 and 16, axle or member 323 extends transversely with respect to frame 210 of bicycle 201 between front and rear wheels 235 and 227, and defines an axis 395 therethrough from end portion 323A to end portion 323B, which is substantially parallel with respect to axis 390 of rotation of front wheel 235, axis 391 of rotation of rear wheel 227, and axis 253A of rotation of bottom bracket 253 that is located above and that opposes axis 395 of axle or member 323. Axis 253A and axis 395 reside in a substantially vertical plane with respect to the length of bicycle 201 from its front end to its rear end. Support assembly 270 held by end portion 323A of axle or member 323 is free to pivot about axis 395 of axle or member 323 to permit stabilizer assembly 260 to freely pivotally displace as needed as bicycle 201 as driven over the ground. Support assembly 290 held by end portion 323B of axle or member 323 is, like support assembly 270, free to pivot about axis 395 of axle or member 323 to permit stabilizer assembly 261, like stabilizer assembly 260, to freely pivotally displace as needed as bicycle 201 is driven over the ground. Preferably, there is sufficient clearance between end portion 323A of axle or member 323 and opening 271A (FIG. 17) formed in support assembly 270 through which end portion 323A is received to permit the pivotal movement of stabilizer assembly 260 with respect to end portion 323A of axle or member 323. Likewise, there is preferably sufficient clearance between end portion 323B of axle or member 323 and opening 291A (FIG. 17) formed in support assembly 290 through which end portion 323B is received to permit the pivotal movement of stabilizer assembly 261 with respect to end portion 323B of axle or member 323.

Figure 25:
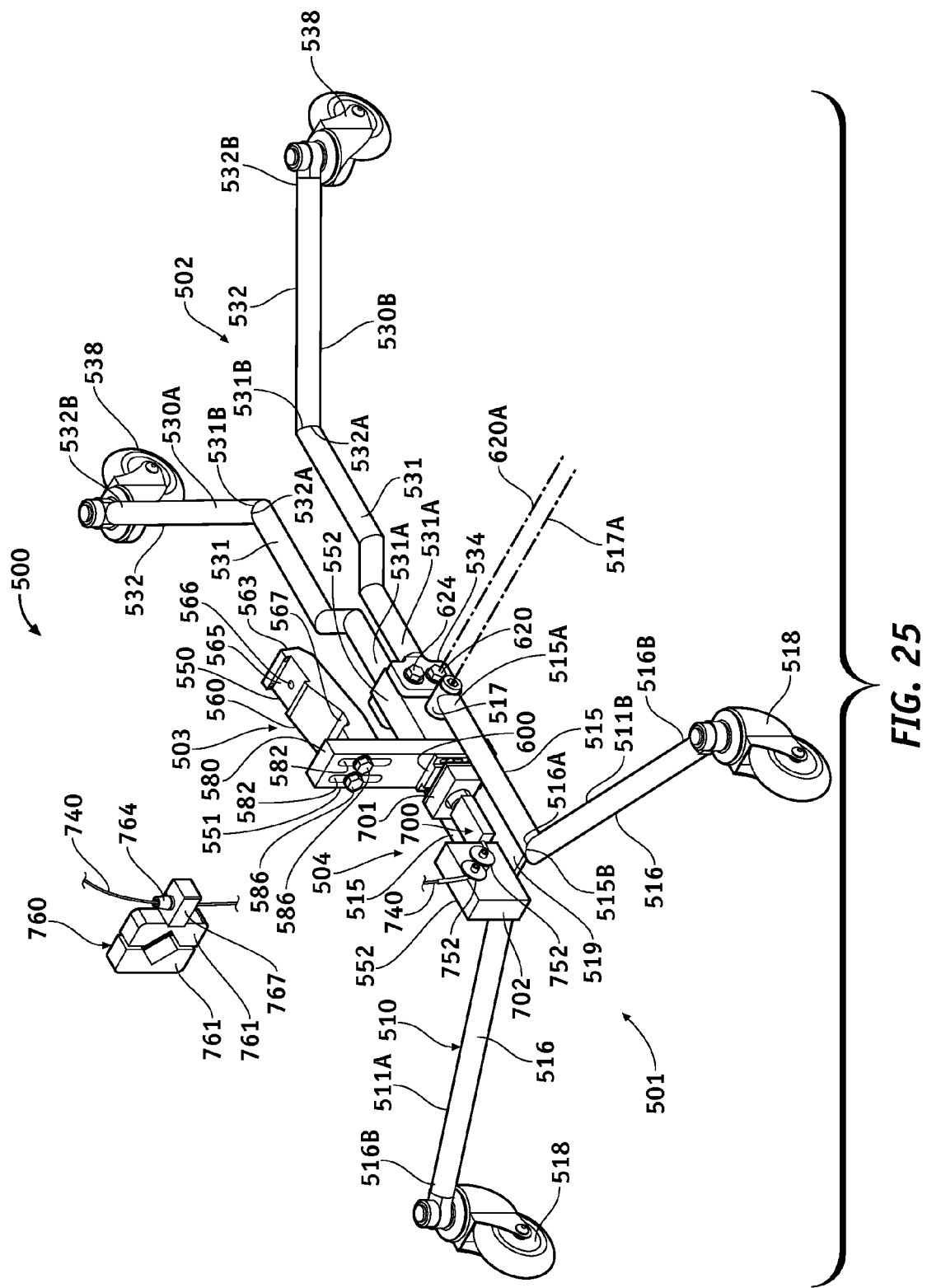
FIG. 25 is a perspective view of a stabilization apparatus constructed and arranged in accordance with the principle of the invention.
Figure 26:
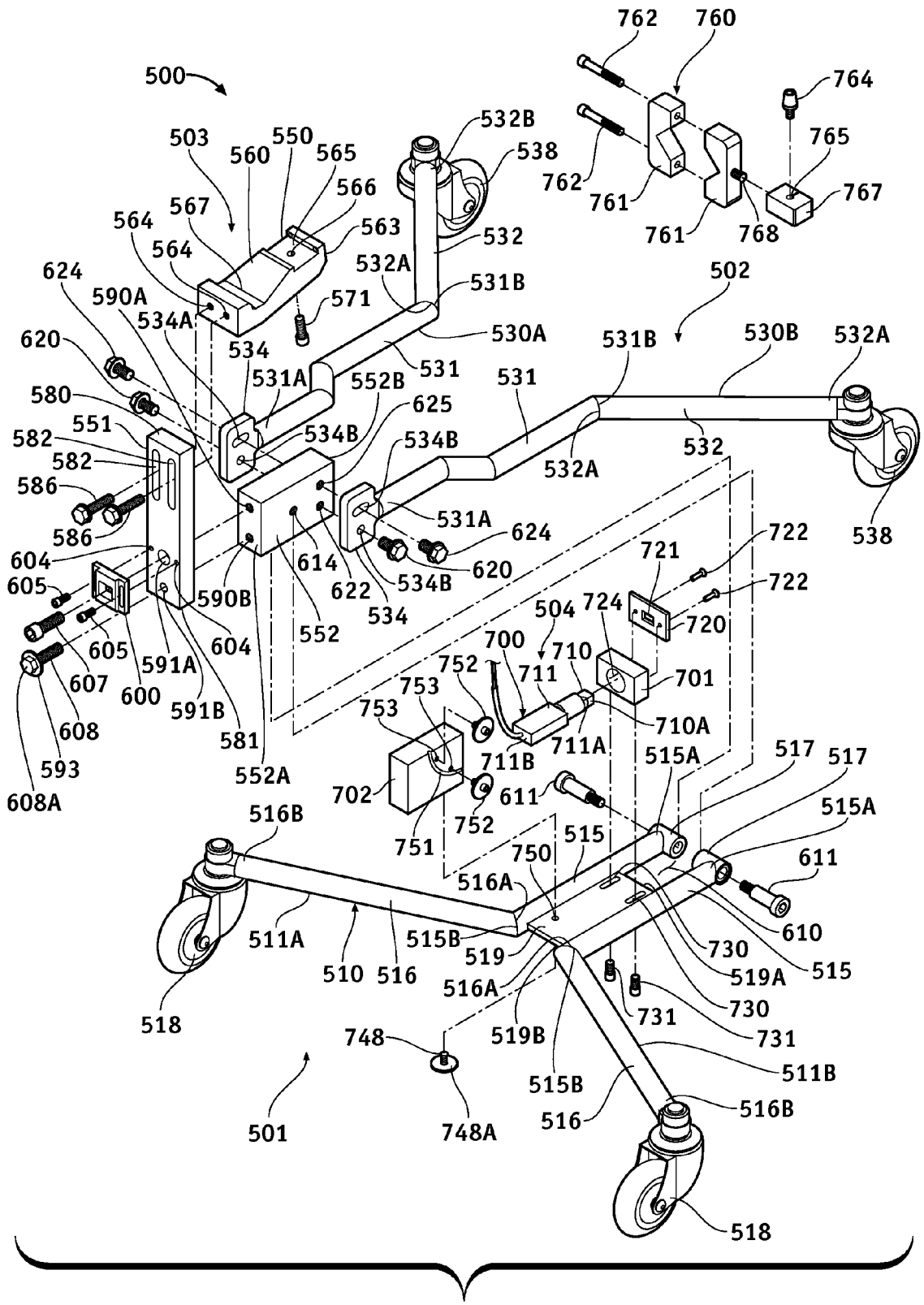
FIG. 26 is an exploded perspective view of the embodiment of FIG. 25.

Attention is now directed to FIG. 25, which is a perspective view of an alternate embodiment of a stabilization apparatus 500 constructed and arranged in accordance with the principle of the invention, and to FIG. 26, which is an exploded perspective view of stabilization apparatus 500 first illustrated in FIG. 25. Stabilization apparatus 500 is constructed of the same material or combination of materials described in connection with the previous stabilization apparatus embodiments, and, in general, includes a forward or front stabilizing assembly 501, an opposed rearward or rear stabilizing assembly 502, a connector assembly 503, and a lock assembly 504. Connector assembly 503 is used to connect forward and rearward stabilizing assemblies 501 and 502 to a vehicle to be stabilized so as to form a vehicle assembly which is shown and denoted generally at 540 in FIGS. 29-31 and 34-39. Forward stabilizing assembly 501 extends in a forward direction from connector assembly 503 to provide vehicle stabilization at a front end of a vehicle to be stabilized, and rearward stabilizing assembly 502 extends in the opposite rearward direction from connector assembly 503 to provide vehicle stabilization at a rear end of a vehicle to be stabilized.

Figure 29:
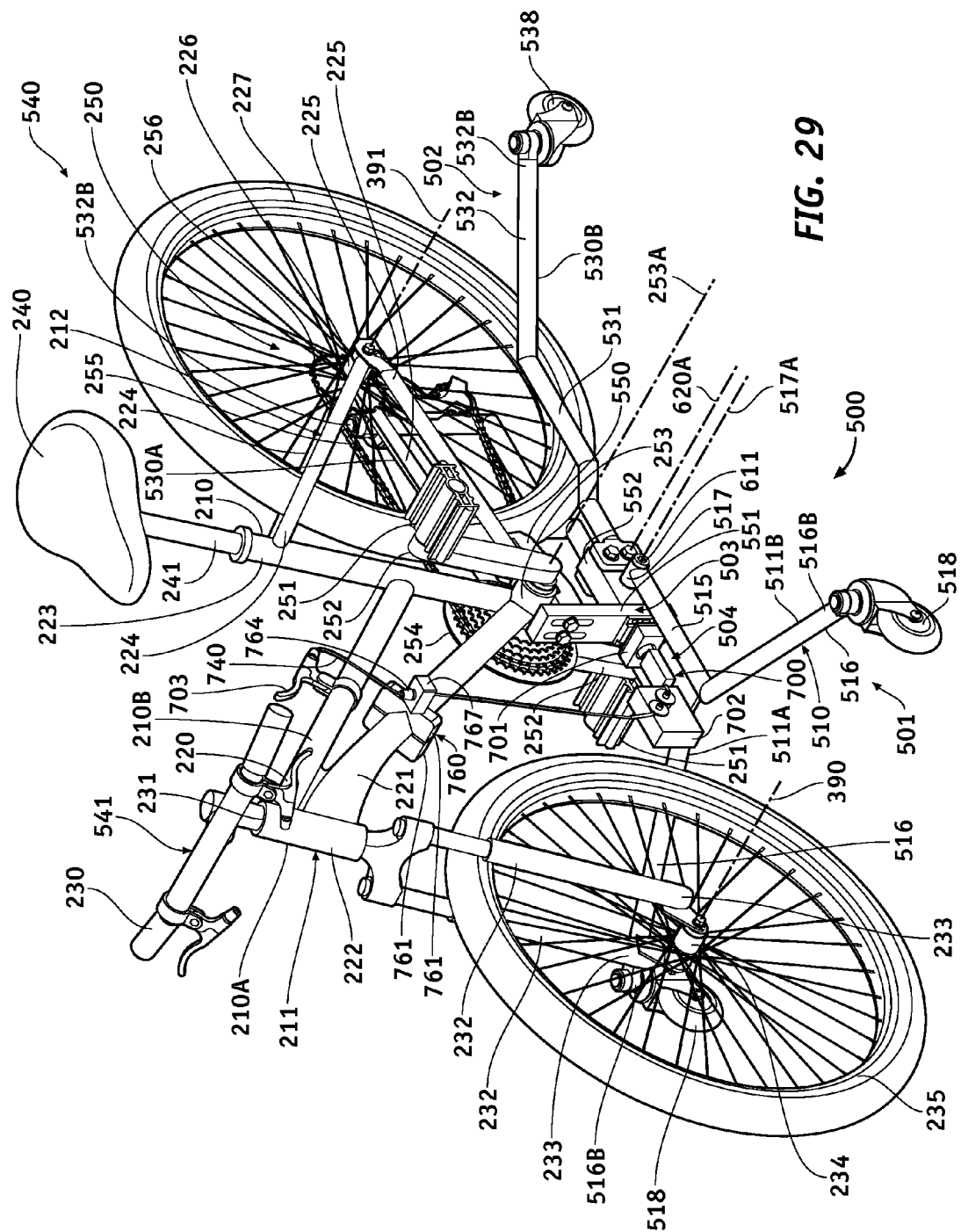
FIG. 29 is a perspective view of a vehicle assembly constructed and arranged in accordance with an alternate embodiment of the invention, the vehicle assembly including a vehicle in the form of a bicycle fitted with the stabilization apparatus of FIG. 25.
Figure 30:
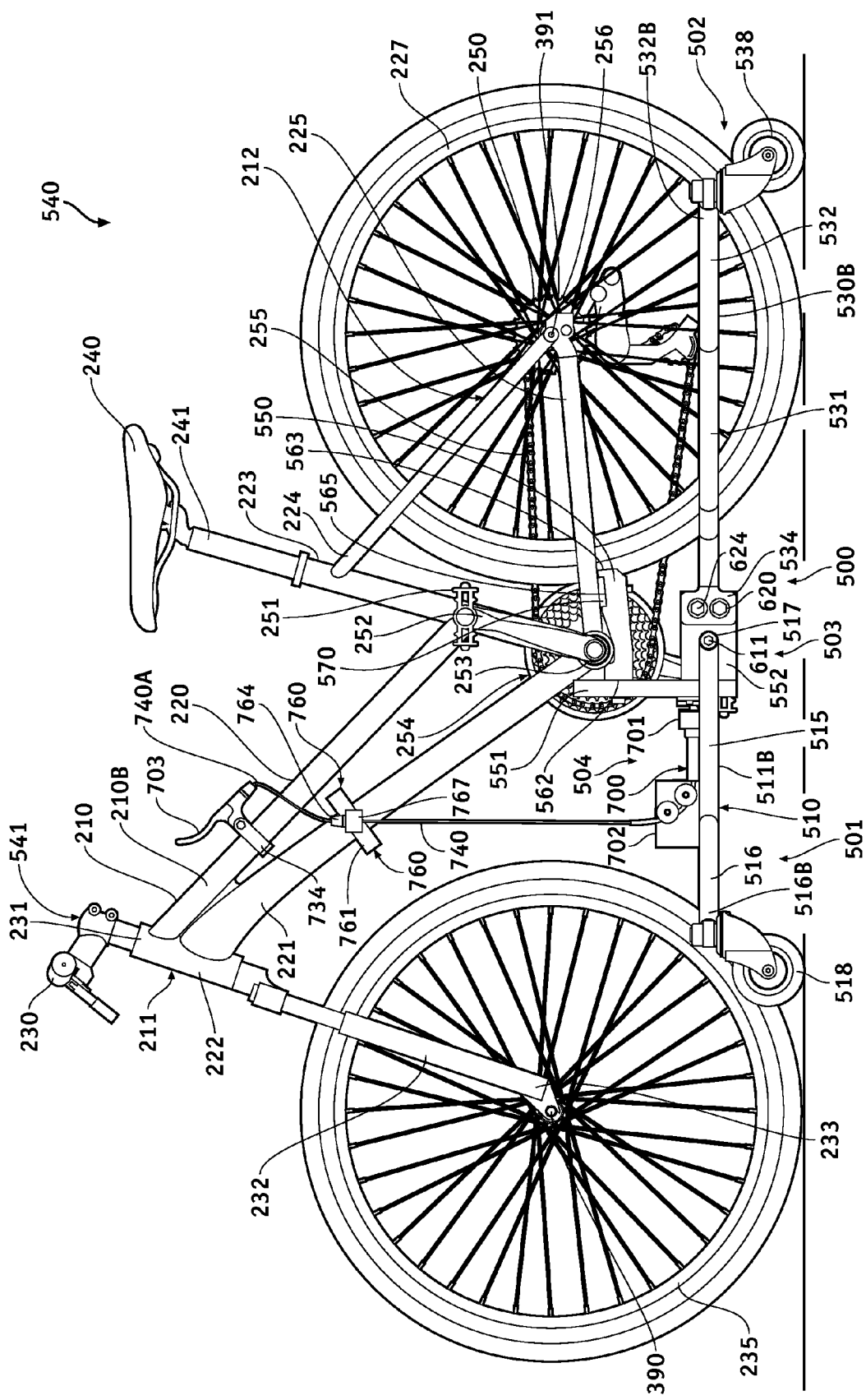
FIG. 30 is a side elevation view of the embodiment of FIG. 29.

Referring to FIGS. 29 and 30, the vehicle to be stabilized in conjunction with stabilization apparatus 500 is a bicycle denoted at 541, which is shown as it would appear fitted with stabilization apparatus 500 forming vehicle assembly 540 stabilized by stabilization apparatus 500 according to the principle of the invention. In common with bicycle 201 previously discussed, and referring to FIGS. 29 and 30 in relevant part, bicycle 541 shares the usual frame 210, front or forward end 211, rear or rearward end 212, opposed sides 210A and 210B, top tube 220, bottom or down tube 221, head tube 222, seat tube 223, seat stays 224, chain stays 225, rear hub 226 and rear wheel 227, handlebars 230, headset 231, front forks 232 having free ends 233 connected to front hub 234 of front wheel 235 that is positioned in front of rear wheel 227, which is substantially in-line with respect to front wheel 235 as is typical and well-known with a conventional bicycle. Like bicycle 201, bicycle 541 additionally shares the usual seat 240, seat post 241, a drive train 250 consisting of pedals 251, crank arms 252, bottom bracket 253, the usual front chainrings denoted at 254, endless chain 255, and rear cassette 256. In common with bicycle 201, in bicycle 541 pedals 251 and crank arms 252 rotate about axis 253A of bottom bracket 253. Front wheel 235 of bicycle 341 rotates about an axis of rotation denoted at 390, and rear wheel 227 rotates about an axis of rotation denoted at 391.

Bicycle 541 is a form of a vehicle. Moreover, bicycle 541 is exemplary of a non-motorized two-wheeled vehicle, is entirely conventional and is generally representative of any one of a variety of commercially available bicycles, which, in the present example, is a variety of bicycle commonly referred to as a mountain bike. Accordingly, further details of bicycle 541 not herein specifically disclosed will readily occur to those having ordinary skill and are not discussed in further detail.

Referring in relevant part to FIGS. 25, 26, 27 and 28, forward and rearward stabilizing assemblies 501 and 502 are wheeled or wheel assemblies in the present embodiment characterized in that they have wheeled ends that wheelingly interact with the ground over which a vehicle to be stabilized is driven, which, in this example, is bicycle 541 as referenced in FIGS. 29 and 30.

Forward stabilizing assembly 501 consists of a fixture 510 that includes diametrically opposed, elongate, coextensive and spaced-apart forward support members 511A and 511B, which are the mirror image of one another and are identical in every respect and bear common reference numerals. Forward support members 511A and 511B each include an elongate proximal arm 515 having opposed inner and outer ends 515A and 515B, and an elongate distal arm 516 having opposed inner and outer ends 516A and 516B. Inner end 515A is formed with a coupling in the form of a collar 517, and inner end 515A is considered a coupling end in the form of a collared end. Collars 517 of forward support members 511A and 511B are used to mount or attach fixture 510 to connector assembly 503. Inner end 516A of distal arm 516 is attached to outer end 515B of proximal arm 515, and extends angularly outwardly therefrom with respect to proximal arm 515 to outer end 516B that is formed with an attached stabilizer, which, in the present embodiment, is a wheel 518 that extends downwardly from outer end 516B. With outer end 516B formed with stabilizer wheel 518, outer end 516B is considered a stabilizer/stabilizing end in the form of a wheeled end and each of the forward support members 511A and 511B is, therefore, considered to be a wheeled forward support member. Stabilizer wheel 518 is conventional caster wheel, which swivels and rotates. Proximal arms 515 are diametrically opposed and are parallel and spaced-apart and extend concurrently in the same forward direction from collars 517 at inner ends 515A to outer ends 515B attached to inner ends 516A of distal arms 516, which are diametrically opposed and extend forwardly and diverge angularly outwardly away from one another in the same forwardly direction from inner ends 516A to the wheeled ends of forward stabilizing assembly 501, namely, outer ends 516B formed with attached and diametrically opposed wheels 518, respectively. A plate or brace 519 is positioned between, and is rigidly affixed via welding directly to proximal arms 515 between inner ends 515A and outer ends 515B of proximal arms 515, which rigidly affixes or otherwise rigidly attaches forward support member 511A to forward support member 511B.

Rearward stabilizing assembly 502 includes diametrically opposed, elongate, coextensive and spaced-apart rearward support members 530A and 530B, which are the mirror image of one another and are identical in every respect and bear common reference numerals. Rearward support members 530A and 530B each include an elongate proximal arm 531 having opposed inner and outer ends 531A and 531B, and an elongate distal arm 532 having opposed inner and outer ends 532A and 532B. Inner end 531A is a coupling end as it is formed with a coupling in the form of an enlargement or head 534 formed with opposed upper and lower through holes 534A and 534B. Upper through hole 534A is a guide hole and is elongated with respect to lower through hole 534B and is downwardly arcuate or curved in a vertical direction toward lower through hole 534B. Head 534 is a coupling, and each head 534 is used to pivotally connect, mount or attach a corresponding one of the rearward support member 530A and 530B to connector assembly 503. Inner end 532A of distal arm 532 is attached to outer end 531B of proximal arm 531, and extends angularly outwardly therefrom with respect to proximal arm 531 to outer end 532B that is formed with an attached stabilizer, which, in the present embodiment, is a wheel 528 that extends downwardly from outer end 532B. With outer end 532B formed with stabilizer wheel 538, outer end 532B is considered a stabilizer/stabilizing end in the form of a wheeled end and each of rearward support members 530A and 530B is, therefore, considered to be a wheeled rearward support member. Stabilizer wheel 528 is conventional caster wheel, which swivels and rotates. Proximal arms 531 are diametrically opposed and are parallel and spaced-apart and extend concurrently in the same rearward direction from heads 534 at inner ends 531A to outer ends 531B attached to inner ends 532A of distal arms 532, which are diametrically opposed and extend rearward and angle outwardly away from one another in the same rearward direction from inner ends 532A to outer ends 532B formed with attached and diametrically opposed wheels 528, respectively.

As stated above, bicycle 541 is formed with stabilization apparatus denoted generally at 500, and the combination of bicycle 541 and stabilization apparatus 500 forms a vehicle, a bicycle assembly, or a vehicle assembly 540 according to the principle of the invention. Connector assembly 503 is used to connect stabilization apparatus 500 to bicycle 541, and connector assembly 503 will now be discussed in detail with reference in relevant part to FIGS. 25, 26, 27, and 28.

Connector assembly 503 includes a bracket 550, a support fixture 551, and a block 552, each of which is formed of aluminum, steel, or other like or similar substantially rigid material or combination of materials. Bracket 550 attaches to frame 210 of bicycle 541 between front and rear wheels 235 and 227 of bicycle 541, support fixture 551 attaches to bracket 550, block 552 attaches to support fixture 551, and forward and rearward stabilizing assemblies 501 and 502 attach to block 552, in accordance with the principle of the invention.

Figure 27:
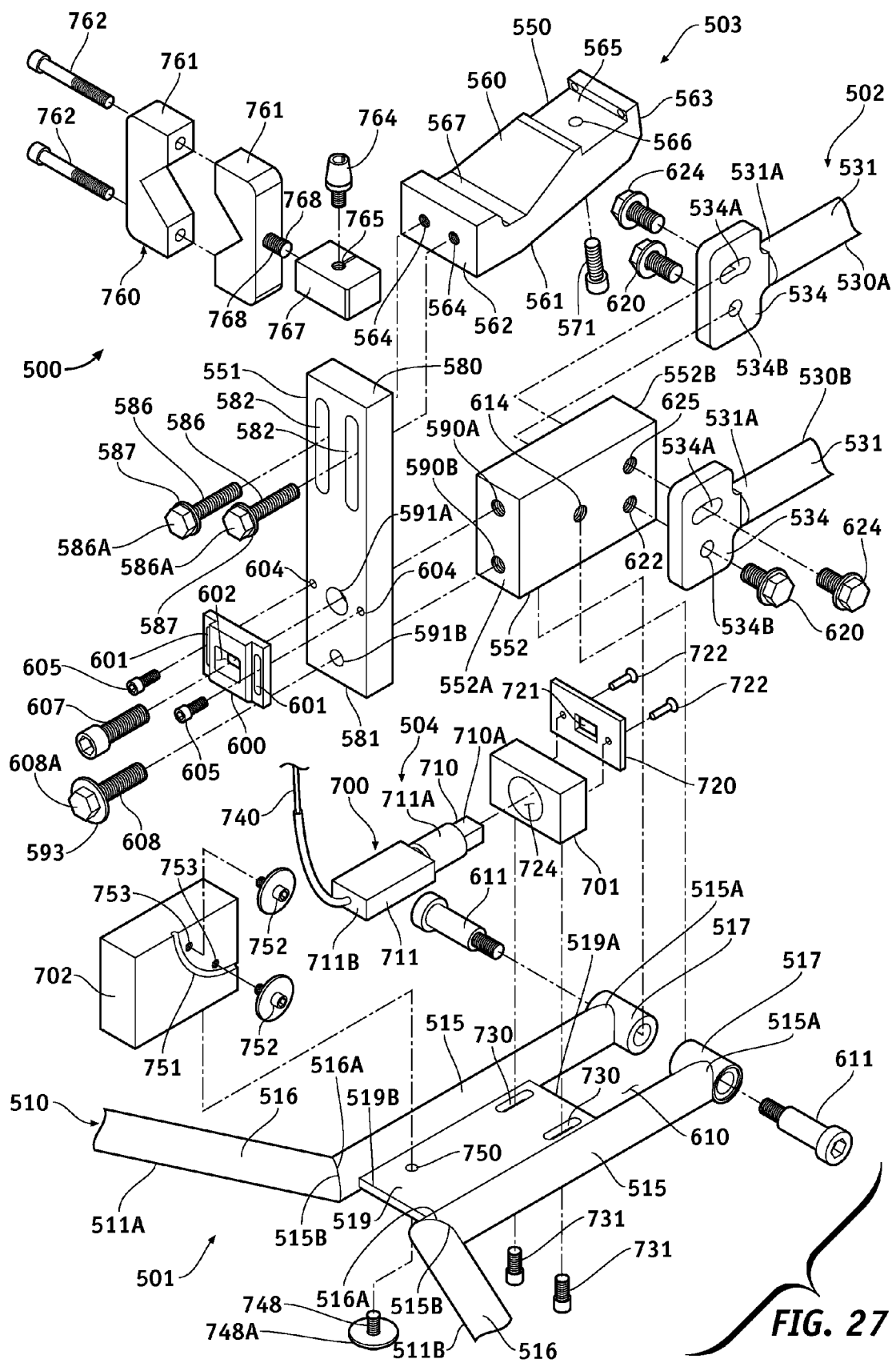
FIG. 27 is an enlarged exploded perspective view of a connector assembly and a lock assembly of the embodiment of FIG. 25.
Figure 28:
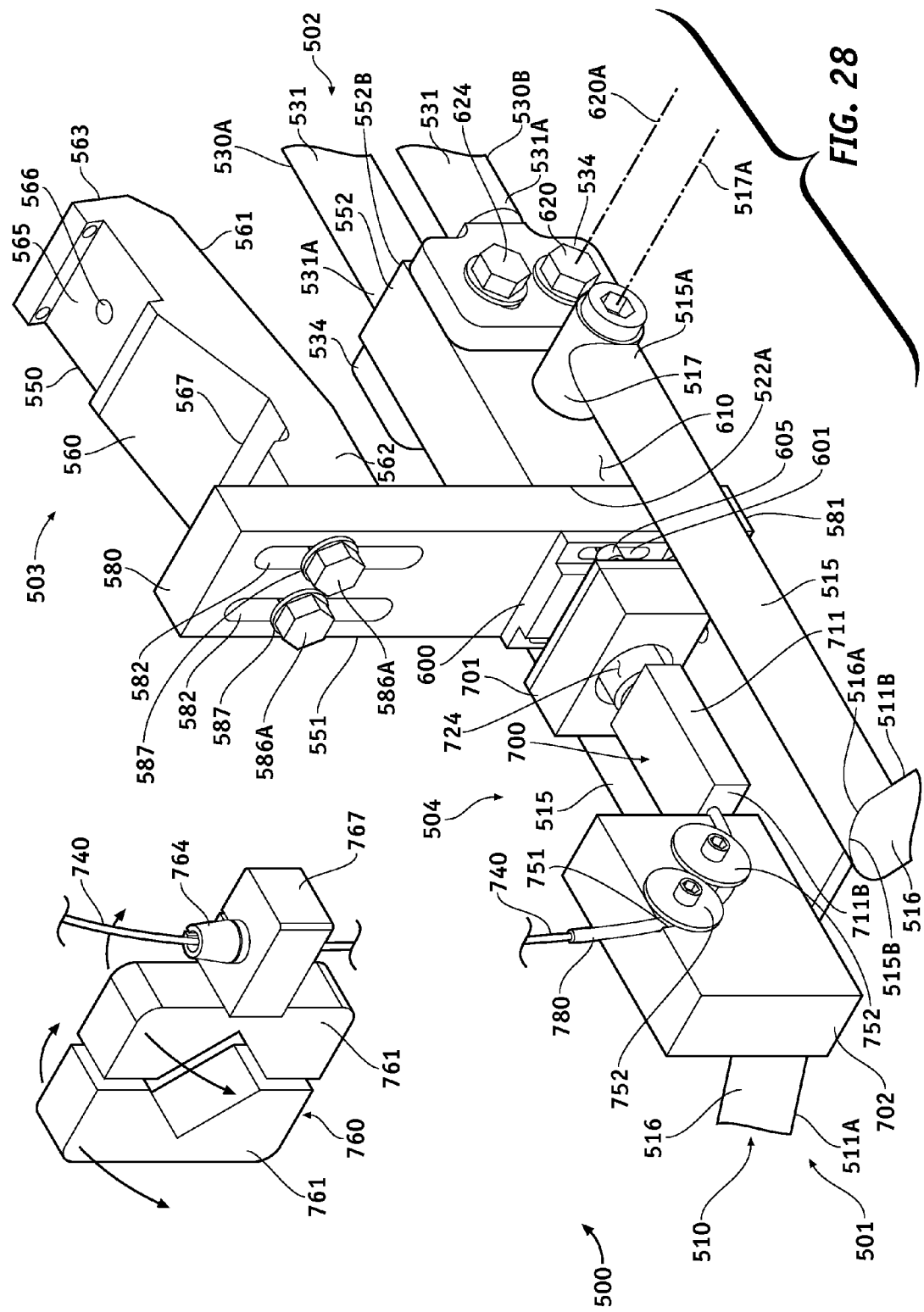
FIG. 28 is a perspective view of the embodiment of FIG. 27 shown assembled.

Referring to FIGS. 27-28 in relevant part, bracket 550 has opposed upper and lower surfaces 560 and 561, opposed front and rear ends 562 and 563, threaded openings 564 formed in front end 562 used to accept threaded fasteners to secure support fixture 551, a transverse seat 565 formed in upper surface 560 toward rear end 563 of bracket 550 and that extends between the opposed sides of bracket 550 and which is used to receive therein a portion of the frame a bicycle, an opening 566 near rear end 563 that extends through bracket 55 from lower surface 561 to seat 565 at upper surface 560 to receive a threaded fastener used to secure bracket 550 to the frame of a bicycle, and a transverse receiving area or recess 567 formed in upper surface 560 toward front end 562 of bracket 550 and that extends between the opposed sides of bracket 550 and which accepts the bottom bracket of a bicycle in the installation of bracket 550 to a bicycle.

Bracket 550 of connector assembly 503 is secured to bicycle 541 in the installation of stabilization apparatus 500 to bicycle 541. With respect to the installation of bracket 550 to bicycle 541 with reference to FIG. 31, bracket 550 is applied to the underside of frame 210 of bicycle 541 at bottom bracket 253. Upper surface 560 of bracket 550 is applied to and against the underside of frame 210 locating bottom bracket 253 in recess 567 and locating a lug 570 affixed to the underside frame 210 at chainstays 225 in seat 565. Front end 562 of bracket 550 extends forwardly with respect to bottom bracket 253 toward the front end of frame 210 of bicycle 541 as shown in FIG. 30, and rear end 563 of bracket 550 extends rearwardly with respect to bottom bracket 253 toward the rear end of frame 210 of bicycle 541 along the underside of chain stays 225 as shown in FIG. 30. Referring back to FIG. 31, lug 570 is affixed to frame 210, such as by welding or by forming frame 210 integrally with lug 570. Lug 570 is considered part of or otherwise an extension of frame 210 and seat 565 relates to lug 570 so as to permit lug 570 to be received by or otherwise to fit within seat 565. Bracket 550 is affixed to lug 570 of frame 210 with a threaded fastener denoted at 571 in FIGS. 26, 27, and 31, which is applied through opening 560 of bracket 550 and is threaded into a corresponding threaded opening formed in lug 570 and which is tightened through rotation to rigidly affix bracket 550 to frame 210 of bicycle 542 and thus to rigidly secure and locate bottom bracket 253 in recess 567 formed in base bracket 550. Bracket 550 can be rigidly affixed to lug 570 in other ways, such as with two or more threaded fasteners, one or more rivets, welding, a clamp, etc.

Looking to FIGS. 25-31, support fixture 551 is secured between bracket 550 and block 552. Referencing FIGS. 25-28 and 31 in relevant part, support fixture 551 has opposed upper and lower ends 580 and 581, and a pair of opposed, elongate, vertical, parallel, substantially coextensive slots 582 formed therethrough proximate to upper end 580. Upper end 580 of support fixture 231 is applied against front end 562 of bracket 550 registering slots 582 with threaded openings 564 formed in front end 562 of bracket 550. Threaded fasteners 586 in the form of threaded bolts are applied into and through slots 582 and are threaded into threaded openings 564 formed in front end 562 of bracket 550 and are then rotated and tightened to rigidly secure support fixture 551 to front end 562 of bracket 550. Support fixture 551 extends downwardly with respect to bracket 550 and frame 210 of bicycle 541 from upper end 580 to lower end 581, which is attached to block 552. Washers 587 encircle threaded fasteners 586 and are positioned between heads 586A of fasteners 586 and support fixture 551.

Block 552 has opposed front and rear ends 552A and 552B and is formed with a pair of forward upper and lower threaded openings 590A and 590B extending into front end 552A. Front end 552A is positioned directly against the back side of support fixture 551 proximate to lower end 581 of support fixture 551 opposite to lower surface 561 of bracket 550 registering upper and lower threaded openings 590A and 590B with a corresponding pair of upper and lower openings 591A and 591B formed through support fixture 551 near lower end 581. There is a lock plate 600 that has opposed, elongate, vertical slots 601 formed on either side of a central bolt-receiving opening 602. Lock plate 600 is applied directly against the front side of support fixture 551 registering bolt-receiving opening 602 with upper opening 591A and registering slots 601 with a corresponding pair of opposed threaded openings 604 formed in support fixture 551 on either side of upper opening 591A. Threaded fasteners 605 are applied into and through slots 601 of lock plate 600 and are threaded into threaded openings 604 and are then tightened via rotation to rigidly securing lock plate 600 to the front side of support fixture 551 near lower end 581. Slots 601 are vertically elongate and permit a user to adjust lock plate 600 up-and-down as needed in order to register or otherwise align bolt-receiving opening 602 with upper opening 591A before tightening down lock plate 600 with threaded fasteners 605.

Figure 32:
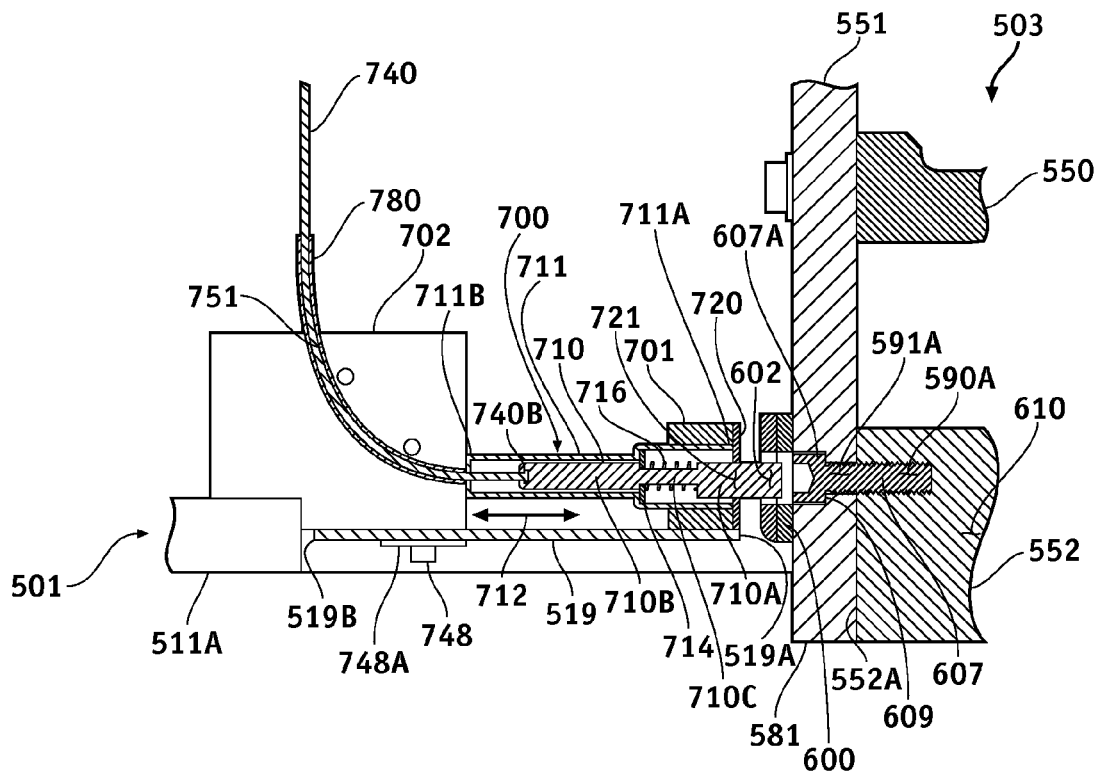
FIG. 32 is a section view taken along line 32-32 of FIG. 28 illustrating the lock assembly as it would appear in a locked position.

Support fixture 551 is secured to block 552 with upper and lower threaded fasteners 607 and 608. Upper fastener 607 is applied into and completely through bolt-receiving opening 602 of lock plate 600 and is applied to upper opening 591A and is threaded into upper threaded opening 590A of block 552. Lower fastener 608 is applied to lower opening 591B and is threaded into lower threaded opening 590B. Upper and lower fasteners 607 and 608 are then tightened through rotation to rigidly secure support fixture 551 to block 552. As seen in FIG. 32, upper opening 591A is formed with a counterbore 609 into which is received head 607A of upper threaded fastener 607. Head 607A of upper fastener 607 is tightened against counterbore 609 to rigidly secure block 552.

Figure 31:
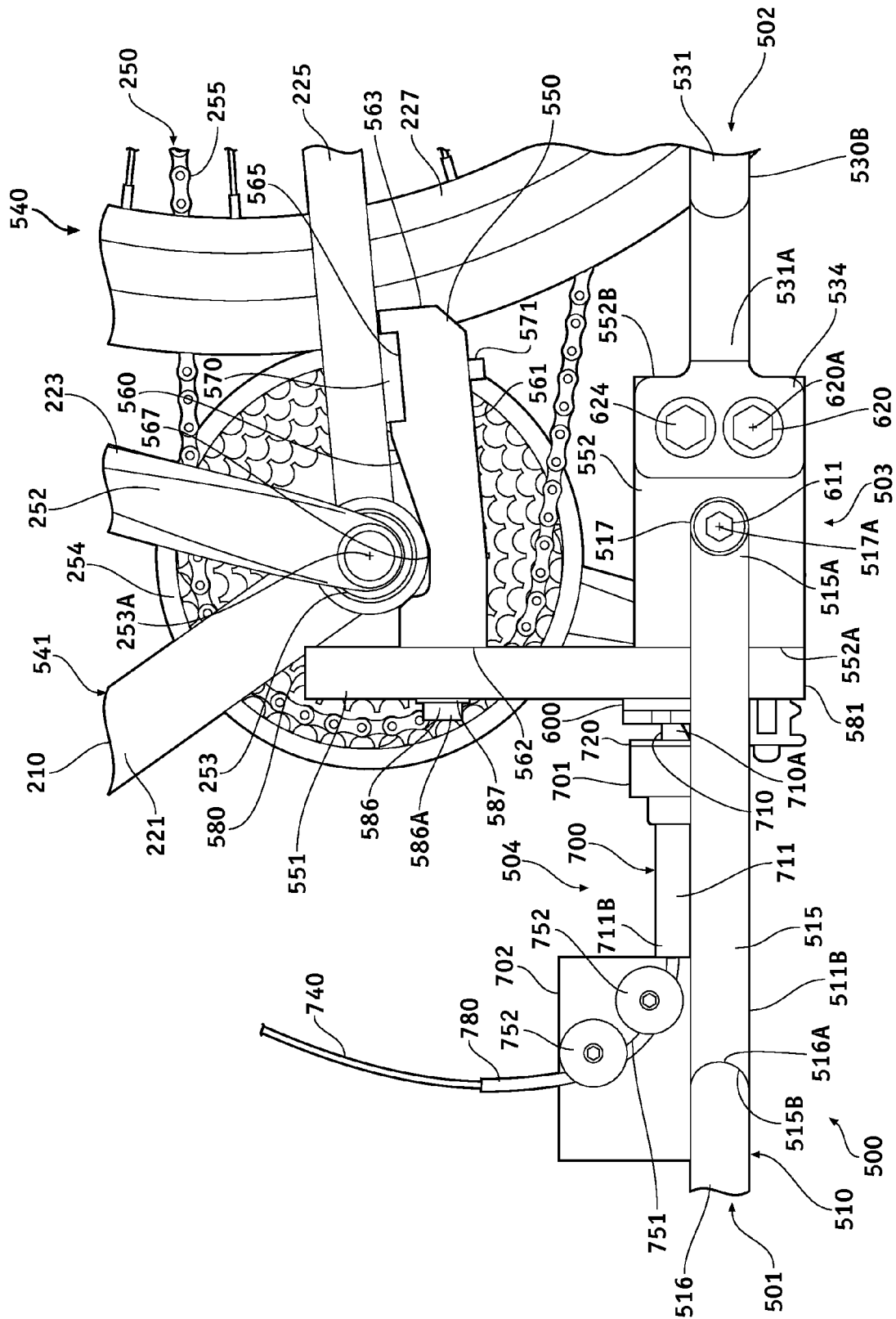
FIG. 31 is an enlarged, fragmented side elevation view of the embodiment of FIG. 30 illustrating the stabilization apparatus coupled to the vehicle.

Block 552 is rigidly secured to support fixture 551 proximate to lower end 581 of support fixture 551 underneath and in opposition to bracket 550 as shown in FIG. 31 thereby suspending block 552 below bottom bracket 253 and frame 210 of bicycle 541 below and underneath lower surface 561 of bracket 550. A washer 593 encircles lower threaded fastener 608 and is positioned between head 608A of lower threaded fastener 608 and support fixture 551. Connector assembly 503 may be readily detached from bicycle 541 by reversing the steps of installing connector assembly 503 onto bicycle 341 as described above.

Figure 39:
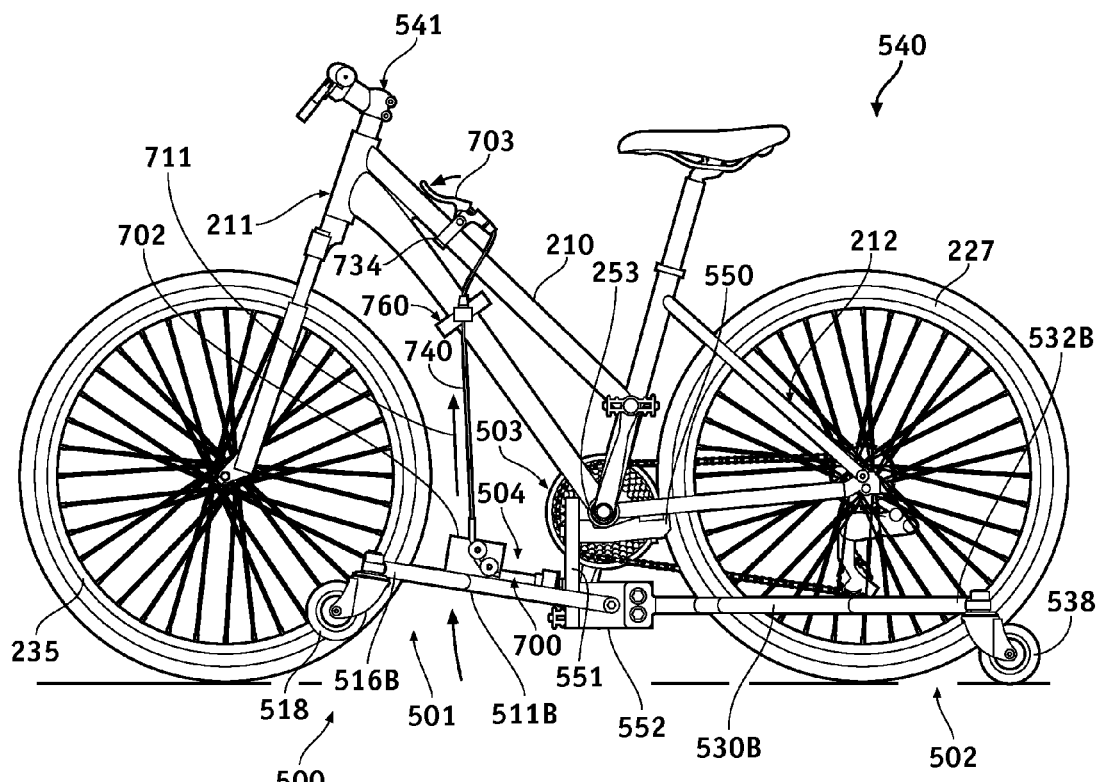
FIG. 39 is a view similar to that of FIG. 30 illustrating a front stabilizer assembly of the stabilization apparatus as it would appear in a raised position.

Forward stabilizing assembly 501 attaches to block 552. The attachment between forward stabilizing assembly 501 and block 552 is a pivotal attachment or coupling to permit forward stabilizing assembly 501 to pivot or pivotally move or adjust at block 552 between a raised position with respect to bicycle 541 to disengage forward stabilizing assembly 501 from the ground over which bicycle 541 is driven to secure forward stabilizing assembly 501 from vehicle stabilization by forward stabilizing assembly 501, as shown in FIG. 39, when vehicle stabilization by forward stabilizing assembly 501 not required or needed, and a lowered position with respect to bicycle 541 to engage forward stabilizing assembly 501 with the ground over which bicycle 541 is driven to engage forward stabilizing assembly 501 for vehicle stabilization by forward stabilizing assembly 501, as shown in FIGS. 29, 30, 34, 36, and 37, when vehicle stabilization by forward stabilizing assembly 501 is required or needed.

Brace 519 has opposed inner and outer extremities 519A and 519B. Inner extremity 519A is directed toward collars 517, and outer extremity 519B is directed toward distal arms 516. A receiving area or gap 610 is defined between proximal arms 515 of forward support members 511A and 511B of fixture 510, and this receiving area or gap 610 extends and is defined between inner extremity 519A of brace 519 and collars 517 formed in inner ends 515A. Forward stabilizing assembly 501 is located under frame 210 of bicycle 541 and lower end 581 of support fixture 551 and front end 552A of block 552 are positioned in gap 610 locating the portions of proximal arms 515 extending from brace 519 to collars 517 on either side of support fixture 551 and block 552 under bottom bracket 253 of bicycle 541 as shown in FIG. 31. To form the pivotal coupling between forward stabilizing assembly 501 and block 552 of connector assembly 503, opposed threaded pivot bolts 611 are applied to collars 517 about which collars 517 can pivot between the raised and lowered positions of forward stabilizing assembly 501 and threaded pivot bolts 611 are threaded into corresponding, diametrically opposed threaded openings 614 (only one shown) formed in either side of block 552 between front and rear ends 552A and 552B of block 552, and threaded pivot bolts 613 are tightened via rotation securing collars 517 of fixture 510 to block 552 on either side of block 552 thereby securing fixture 510, and, in turn, forward stabilizing assembly 501, to block 552 of connector assembly 503.

Forward support members 511 of fixture 510 of forward stabilizing assembly 501 extend forwardly toward front wheel 235 and front end 211 of bicycle 541 from collars 517 to stabilizer wheels 518 carried by distal arms 516. Forward stabilizing assembly 501 is pivotally coupled to block 552 and is thus supported by block 552 at the pivotal coupling between fixture 210 of forward stabilizing assembly 501 and block 552. One forward support member 511A of forward stabilizing assembly 501 is positioned along the side 210A of bicycle 541 underneath frame 210 of bicycle 541, and the other forward support member 511B of forward stabilizing assembly 501 is positioned along the side 210B of bicycle 541 underneath frame 210 of bicycle 541. Forward support member 511A of fixture 210 of forward stabilizing assembly 501 supports one stabilizer wheel 518 of forward stabilizing assembly 501 along the side 210A of frame 210 proximate to, and outboard of, front wheel 235 of bicycle 541, forward support member 511B of fixture 210 of forward stabilizing assembly 501 supports the other stabilizer wheel 518 of forward stabilizing assembly 501 along the side 210B of frame 210 proximate to, and outboard of, front wheel 235 of bicycle 541, and stabilizer wheel 518 of forward support member 511A opposes stabilizer wheel 518 of forward support member 511B.

Figure 34:
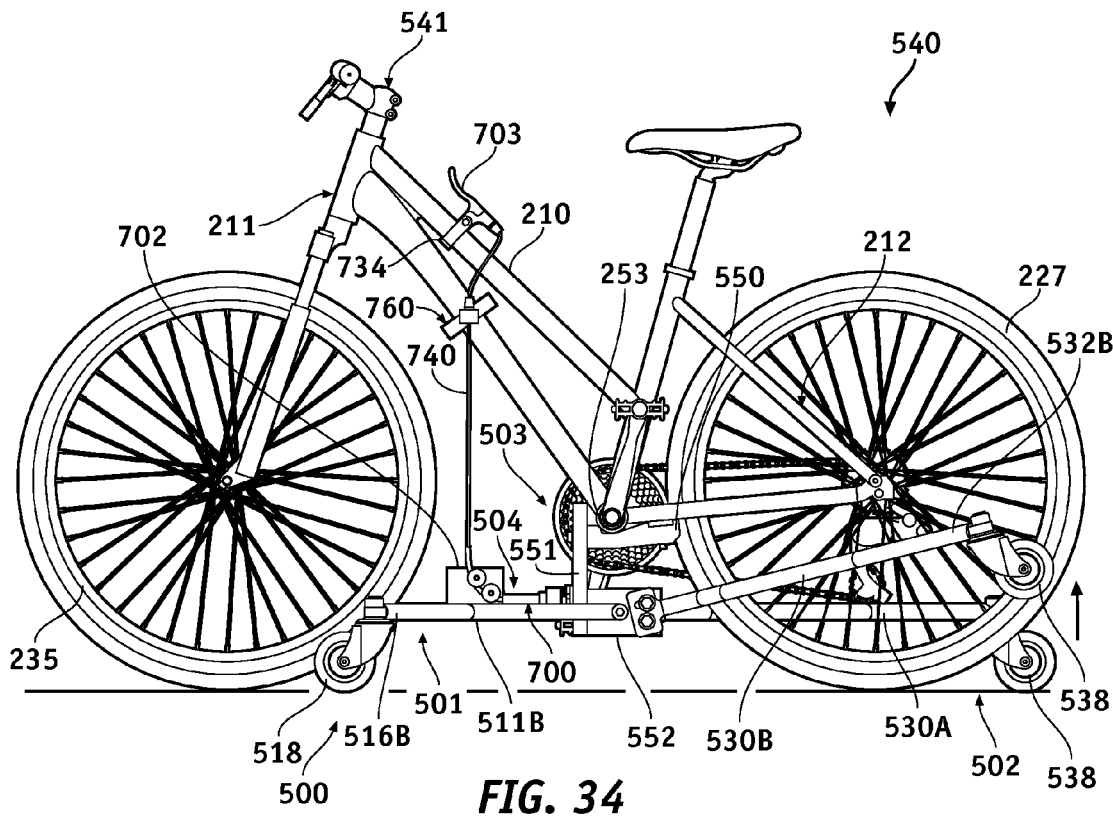
FIG. 34 is a view similar to that of FIG. 30 illustrating a first rear stabilizer assembly of the stabilization apparatus as it would appear in a raised position and a second rear stabilizer assembly of the stabilization apparatus as it would appear in a lowered position.
Figure 35:
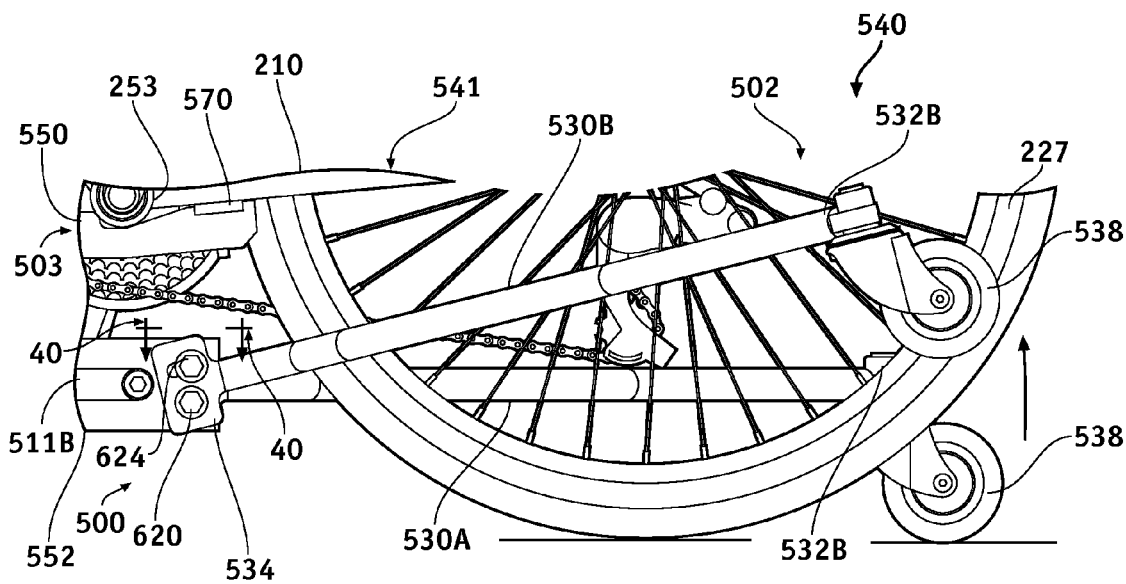
FIG. 35 is an enlarged, fragmented side elevation view of the embodiment of FIG. 34 illustrating the first rear stabilizer assembly of the stabilization apparatus as it would appear in the raised position and the second rear stabilizer assembly of the stabilization apparatus as it would appear in the lowered position.
Figure 36:
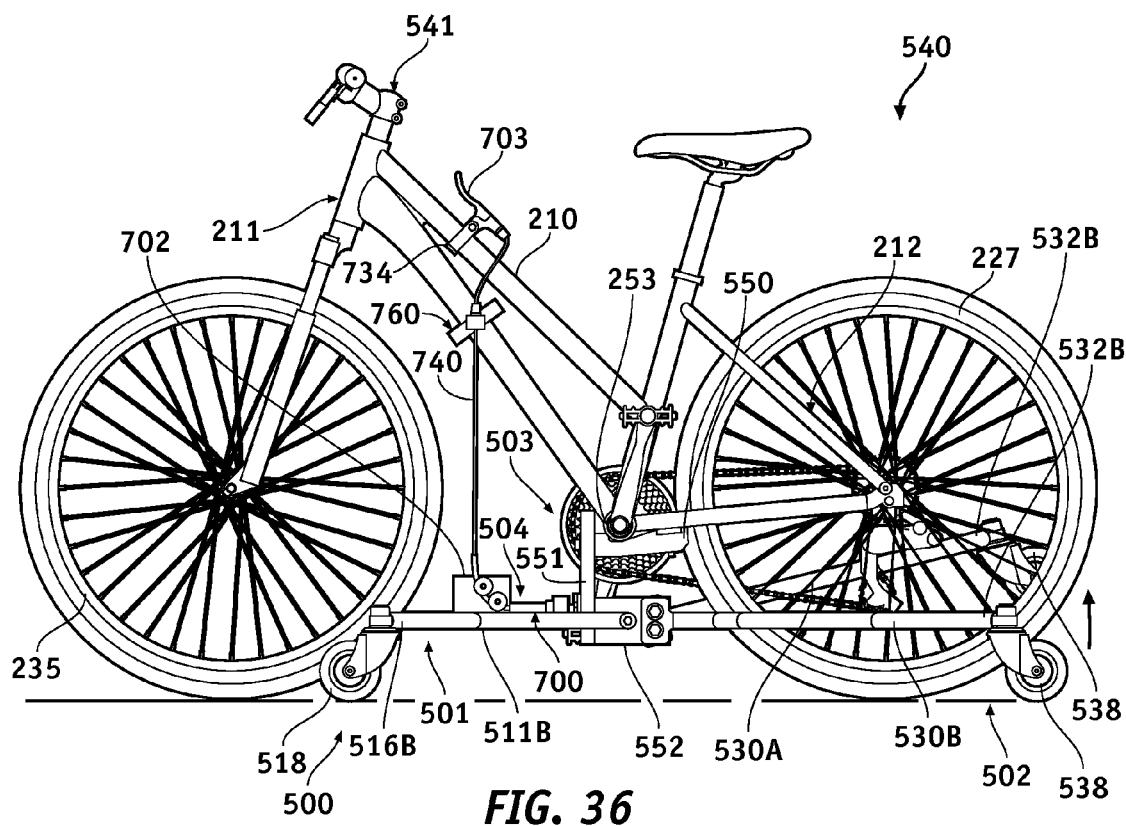
FIG. 36 is a view similar to that of FIG. 34 illustrating the first rear stabilizer assembly of the stabilization apparatus as it would appear in a lowered position and the second rear stabilizer assembly of the stabilization apparatus as it would appear in a raised position.
Figure 37:
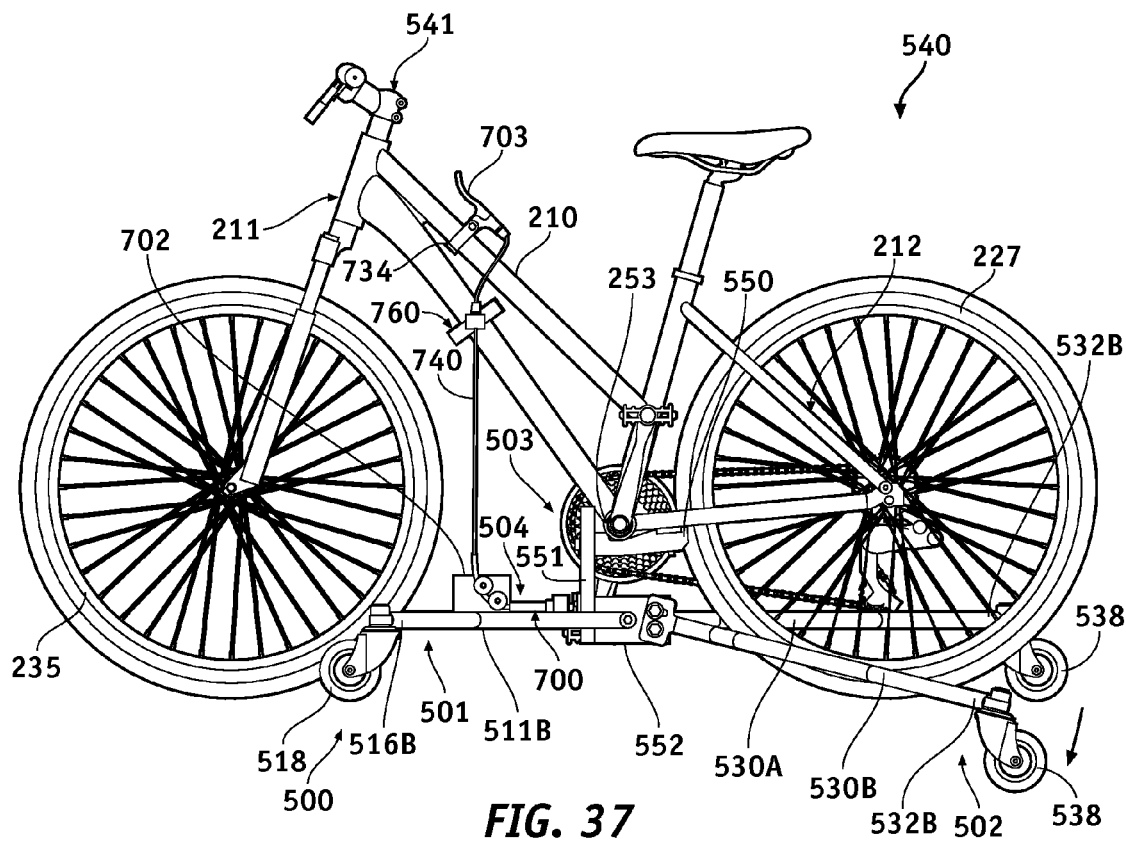
FIG. 37 is a view similar to that of FIG. 34 illustrating the first rear stabilizer assembly of the stabilization apparatus as it would appear in a lowermost position and the second rear stabilizer assembly of the stabilization apparatus as it would appear in the lowered position.
Figure 38:
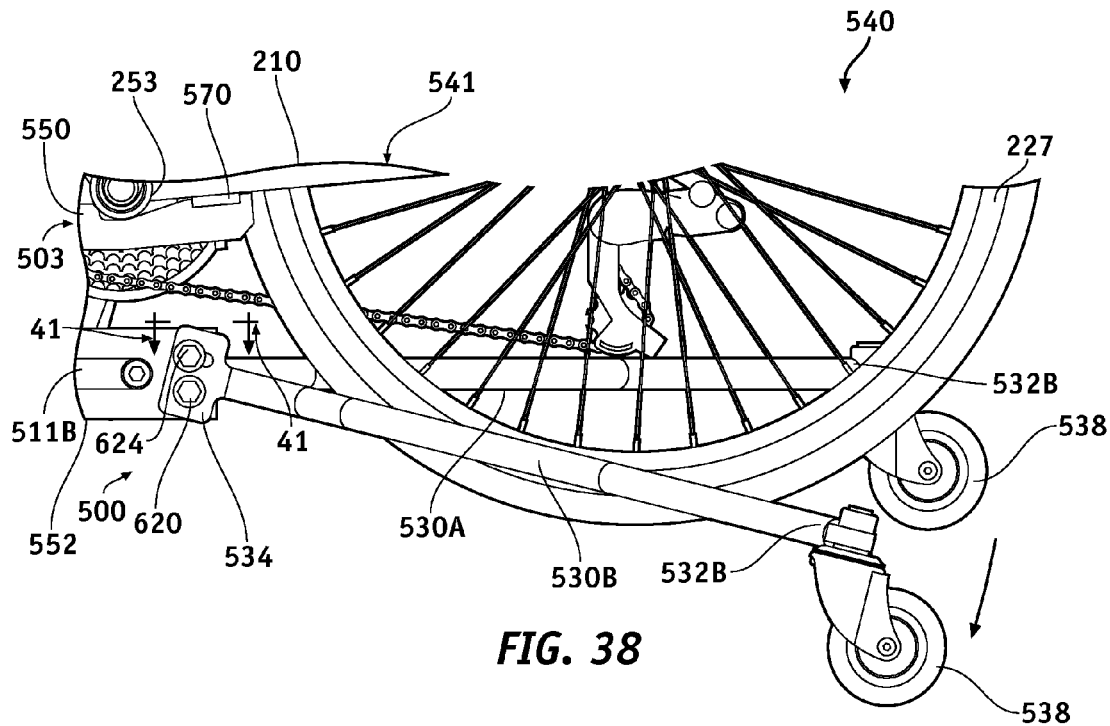
FIG. 38 is an enlarged, fragmented side elevation view of the embodiment of FIG. 37 illustrating the first rear stabilizer assembly of the stabilization apparatus as it would appear in a lowermost position and the second rear stabilizer assembly of the stabilization apparatus as it would appear in the lowered position.

Like forward stabilizing assembly 501, rearward support members 530 of rearward stabilizing assembly 502 attach to block 552. The attachment between each of the rearward support members 530 of rearward stabilizing assembly 502 and block 552 is a pivotal attachment or coupling to permit rearward support members 530 to pivot or pivotally move or adjust at block 552 between raised and lowered positions with respect to bicycle 541. As a matter of illustration and reference, FIGS. 29 and 30 show rearward support members 530A and 530B as they would appear pivoted into a lower position, and it is to be understood that in FIG. 30 rear support member 530A is not shown as it is hidden behind rear support member 530B. FIGS. 34 and 35 show rearward support member 530B as it would appear pivoted into a raised position relative to bicycle 541, while rearward support member 530A is shown as it would appear pivoted into a lowered position relative to bicycle 541. FIG. 36 shows rearward support member 530A as it would appear pivoted into a raised position relative to bicycle 541, while rearward support member 530B is shown as it would appear pivoted into a raised position relative to bicycle 541. FIGS. 37 and 38 show rearward support member 530A as it would appear pivoted into a lowered position relative to bicycle 541, while rearward support member 530B is shown as it would appear pivoted into a lowermost position relative to bicycle 541. Rearward support members 530A and 530B are pivotally coupled independently to block 552 to permit independent pivotal movement of rearward support members 530A and 530B between their respective raised and lowered positions and also the lowermost positions such as demonstrated by rearward support member 530B in FIGS. 37 and 38.

Looking to FIGS. 26, 27, and 28 in relevant part, rearward stabilizing assembly 502 is located under frame 210 of bicycle 541. To pivotally couple rearward support members 530 to block 552 of connector assembly 503, heads 534 are located on either side of block 552 near rear end 552A of block 552 and opposed lower threaded bolts 620 are applied to lower through holes 534B about which heads 534 can pivot between the raised and lowered positions of rearward support members 530 and lower threaded bolts 620 are threaded into corresponding, diametrically opposed lower threaded openings 622 (only one shown) formed in either side of block 552 between threaded opening 614 and rear end 552B of block 552, and lower threaded bolts 620 and then tightened through rotation securing heads 534 to block 552 on either side of block 552 near rear end 552A of block 552 thereby securing rearward stabilizing assembly 502 to block 552 of connector assembly 503. Upper threaded bolts 624 are applied to upper through holes 534A and upper threaded bolts 624 are threaded into corresponding, diametrically opposed upper threaded openings 625 (only one shown) formed in either side of block 552 over lower threaded openings 622 and between threaded opening 614 and rear end 552B of block 552, and upper threaded bolts 625 are tightened via rotation securing upper threaded bolts 624 in place to block 522 while permitting upper threaded bolts 624 to run back-and-forth through upper through holes 534A in response to the pivoting of rearward support members 530A and 530B between their raised and lowered positions.

Looking to FIGS. 29 and 30, forward support members 511A and 511B of fixture 510 of forward stabilizing assembly 501 extend forwardly under frame 210 of bicycle 541 toward front wheel 235 and front end 211 of bicycle 541 from collars 517 to stabilizer wheels 518 carried by distal arms 516. One forward support member 511A of forward stabilizing assembly 501 is positioned along the side 210A of bicycle 541 underneath frame 210 of bicycle 541, and the other forward support member 511B of forward stabilizing assembly 501 is positioned along the side 210B of bicycle 541 underneath frame 210 of bicycle 541. Forward support members 511A and 511B of forward stabilizing assembly 501 are located on either side 210A and 210B of frame 210 of bicycle 541 underneath frame 210 of bicycle 541 positioning forward support members 511A and 511B so as to apply the wheels 518 of the wheeled ends of forward support members 511A and 511B against the ground over which bicycle 541 is driven on either side of front wheel 235 to permit the wheeled ends of forward stabilizing assembly 501 to wheelingly interact with the ground over which bicycle 541 is driven to stabilize bicycle 541 as bicycle 541 is driven over the ground. As such, that stabilizers in the form of wheels 518 of the wheeled ends 516B of forward stabilizing assembly 501 oppose one another on either of sides 210A and 210B of frame 210 of bicycle 541 and are located to concurrently roll over the ground over which bicycle 541 is driven such that front wheel 235 of bicycle 541 operates in the normal manner while wheels 518 of forward stabilizing assembly 501 are positioned against the ground over which bicycle 541 is ridden on either side of bicycle 541 in the lowered position of forward stabilizing assembly 501 such that forward stabilizing assembly 501 interacts with the ground on either side of bicycle 541 to stabilize bicycle 541 along front end 211 of bicycle 541 as it is driven to prevent bicycle 541 from tipping over, according to the principle of the invention.

Rearward support members 530A and 530B of rearward stabilizing assembly 502 extend rearwardly under frame 210 of bicycle 541 toward rear wheel 227 and rear end 212 of bicycle 541 from heads 534 to stabilizer wheels 538 carried by distal arms 516. One rearward support member 530A of rearward stabilizing assembly 502 is positioned along the side 210A of bicycle 541 underneath frame 210 of bicycle 541, and the other rearward support member 530B of rearward stabilizing assembly 502 is positioned along the side 210B of bicycle 541 underneath frame 210 of bicycle 541. Rearward support member 530A of rearward stabilizing assembly 502 supports one stabilizer wheel 538 of rearward stabilizing assembly 502 along the side 210A of frame 210 proximate to, and outboard of, rear wheel 227 of bicycle 541, rearward support member 530B of rearward stabilizing assembly 502 supports the other stabilizer wheel 538 of rearward stabilizing assembly 502 along the side 210B of frame 210 proximate to, and outboard of, rear wheel 227 of bicycle 541, and stabilizer wheel 538 of rearward support member 530B opposes stabilizer wheel 538 of rearward support member 530B. Rearward support members 530A and 530B of rearward stabilizing assembly 502 are located on either side 210A and 210B of frame 210 of bicycle 541 underneath frame 210 of bicycle 541 positioning rearward support members 530A and 530B so as to apply the wheeled ends of rearward support members 530A and 530B against the ground over which bicycle 541 is driven on either side of rear wheel 227 to permit the wheeled ends of rearward stabilizing assembly 502 to wheelingly interact with the ground over which bicycle 541 is driven to stabilize bicycle 541 as bicycle 541 is driven over the ground. As such, wheels 538 at the wheeled ends 532B of rearward support members 530A and 530B of rearward stabilizing assembly 502 are located to roll over the ground over which bicycle 541 is driven on either side of bicycle 541 such that rear wheel 227 of bicycle 541 operates in the normal manner while wheels 538 of rearward stabilizing assembly 502 are positioned against the ground over which bicycle 541 is ridden on either side of bicycle 541 in the lowered positions of rearward support members 530A and 530B of rearward stabilizing assembly 502 such that rearward stabilizing assembly 502 interacts with the ground on either side of bicycle 541 to stabilize bicycle 541 along rear end 212 of bicycle 541 as it is driven to prevent bicycle 541 from tipping over, according to the principle of the invention.

Forward support member 511A and rearward support member 530A are disposed proximate to and extend along the side 210A of frame 210 of bicycle 341 from wheeled end 516B of forward support member 511A alongside front wheel 235 of bicycle 541 to wheeled end 532B of rearward support member 530A alongside rear wheel 227 of bicycle 541 and together form an elongate framework assembly, whereby distal arm 516 of forward support member 511A extends outwardly from proximal arm 515 of forward support member 511A and side 210A of frame 210 of bicycle 541 to wheeled end 516B, which is disposed or otherwise located proximate to and outboard of front wheel 235 of bicycle 341, and whereby distal arm 532 of rearward support member 530A extends outwardly from proximal arm 531 of rearward support member 530A and side 210A of frame 210 of bicycle 541 to wheeled end 532B, which is disposed or otherwise located proximate to and outboard of rear wheel 227 of bicycle 541. With this arrangement, wheel 518 of wheeled end 516B of forward support member 511A is in-line with respect to wheel 538 of wheeled end 532B of rearward support member 530A. Forward support member 511A of forward stabilizing assembly 501 along the side 210A of bicycle 541 and rearward support member 530A of rearward stabilizing assembly 502 along the side 210A of bicycle 541 cooperate as a right-side stabilizer/stabilizing assembly along the side 210A of bicycle 541, which is the right side of bicycle 541.

Forward support member 511B and rearward support member 530B are disposed proximate to and extend along the side 210B of frame 210 of bicycle 341 from wheeled end 516B of forward support member 511B alongside front wheel 235 of bicycle 541 to wheeled end 532B of rearward support member 530B alongside rear wheel 227 of bicycle 541 and together form an elongate framework assembly, whereby distal arm 516 of forward support member 511B extends outwardly from proximal arm 515 of forward support member 511B and side 210B of frame 210 of bicycle 541 to wheeled end 516B, which is disposed or otherwise located proximate to and outboard of front wheel 235 of bicycle 341, and whereby distal arm 532 of rearward support member 530B extends outwardly from proximal arm 531 of rearward support member 530B and side 210B of frame 210 of bicycle 541 to wheeled end 532B, which is disposed or otherwise located proximate to and outboard of rear wheel 227 of bicycle 541. With this arrangement, wheel 518 of wheeled end 516B of forward support member 511B is in-line with respect to wheel 538 of wheeled end 532B of rearward support member 530B. Forward support member 511B of forward stabilizing assembly 501 along the side 210B of bicycle 541 and rearward support member 530B of rearward stabilizing assembly 502 along the side 210B of bicycle 541 cooperate as a left-side stabilizer/stabilizing assembly along the side 210B of bicycle 541, which is the left side of bicycle 541.

When mounted to bicycle 341 according to this disclosure, the described left- and right-side stabilizer assemblies oppose and are the mirror image of one another, and are located on the opposite sides 210A and 210B, respectively, of frame 210 and underneath frame 210 so as not to interfere with the normal pedaling action of pedals 251 and crank arms 251, which takes place along the outer side of the described left- and right-side stabilizer assemblies. With reference to FIG. 29, front wheel 235 of bicycle 341 rotates about axis of rotation denoted at 390, rear wheel 227 rotates about axis of rotation denoted at 391, front or forward stabilizer wheels 518 of forward stabilizing assembly are positioned proximate to axis of rotation 390 of front wheel 235, and rear or rearward stabilizer wheels 538 of rearward stabilizing assembly 502 are positioned proximate to axis of rotation 391 of rear wheel 227.

Of course, in the use of bicycle 541 in its normal manner with stabilization apparatus 500 attached thereto as explained above, front and rear wheels 235 and 227 of bicycle 541, the two wheeled ends of forward stabilizing assembly 501 and the two wheeled ends of rearward stabilizing assembly 502 concurrently interact with the ground over which bicycle 341 is driven to permit forward and rearward stabilizing assemblies 501 and 502 to work in accordance with their intended purpose which is to cooperate together to stabilize bicycle 541 as it is driven over the ground by preventing bicycle 541 from tipping over on one side or the other. And so stabilization apparatus 500 is constructed, arranged, and sized to fit onto bicycle 541 to function in this way. The four wheeled ends of stabilization apparatus 500 concurrently interact with the ground over which bicycle 541 is driven to form a four-point wheeled footprint that engage against and wheelingly interact with the ground over which bicycle 541 is ridden stabilizing bicycle 541 during the normal use thereof to assist users that are uncoordinated or may suffer from a balance disorder in safely riding bicycle 541.

Stabilization apparatus 500 is designed to be removably attached to any bicycle, and bicycles come in different sizes and shapes and have different clearances between the frame and the ground over which the bicycle is ridden. As such, connector assembly 262 is configured to permit adjustment of the pivotal connecting points of forward and rearward stabilizing assemblies 501 and 502 at block 552 between a raised position toward frame 210 and a lowered position away from frame 210 as shown in FIG. 22, and a lowered position away from frame 210. This adjustment is provided by slots 582 formed in support fixture 551. Slots 582 of support fixture 551 function identically to that of slots 352 of support fixture 321 of apparatus 202, and the reciprocal adjustment of support fixture 551 with slots 582 is carried out in the exact same manner as the adjustment of support fixture 321 with slots 352 of support fixture 321 discussed in detail in connection with apparatus 202.

Referring to FIGS. 28 and 29, fixture 510 of forward stabilizing assembly 501 pivots between its raised and lowered positions at collars 517 about a pivot axis 517A defined by collars 517, which pivot axis 517A extends transversely with respect to frame 210 of bicycle 541 between front and rear wheels 235 and 227 and is substantially parallel with respect to axis 390 of rotation of front wheel 235, axis 391 of rotation of rear wheel 227, and axis 253A of rotation of bottom bracket 253 that is located above and that opposes pivot axis 571A of forward stabilizing assembly 501. Rearward support members 530A and 530B of rearward stabilizing assembly 502 pivot between their raised and lowered positions at lower threaded bolts 620 about a common pivot axis 620A defined by lower threaded bolts 620, which pivot axis 620A extends transversely with respect to frame 210 of bicycle 541 between front and rear wheels 235 and 227 and is located just rearward of pivot axis 517A and is substantially parallel with respect to pivot axis 517A, axis 390 of rotation of front wheel 235, axis 391 of rotation of rear wheel 227, and axis 253A of rotation of bottom bracket 253 that is located above and that opposes pivot axis 620A of rearward support members 530A and 530B of rearward stabilizing assembly 502.

Figure 40:
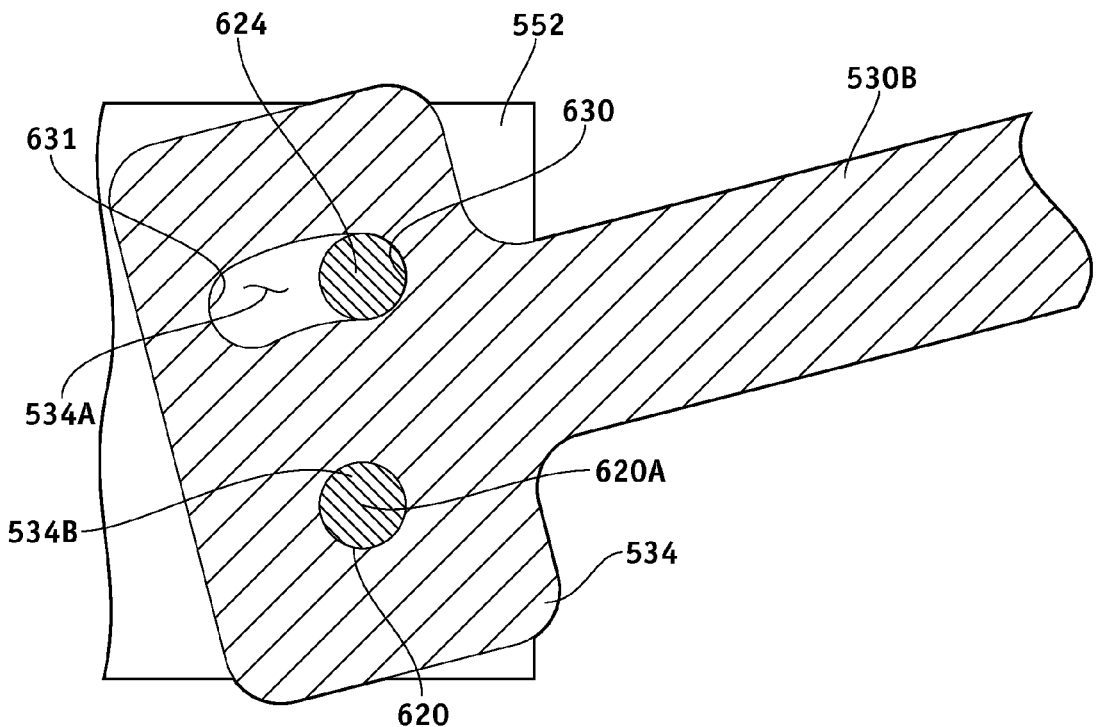
FIG. 40 is a section view taken along line 40-40 of FIG. 35.
Figure 41:
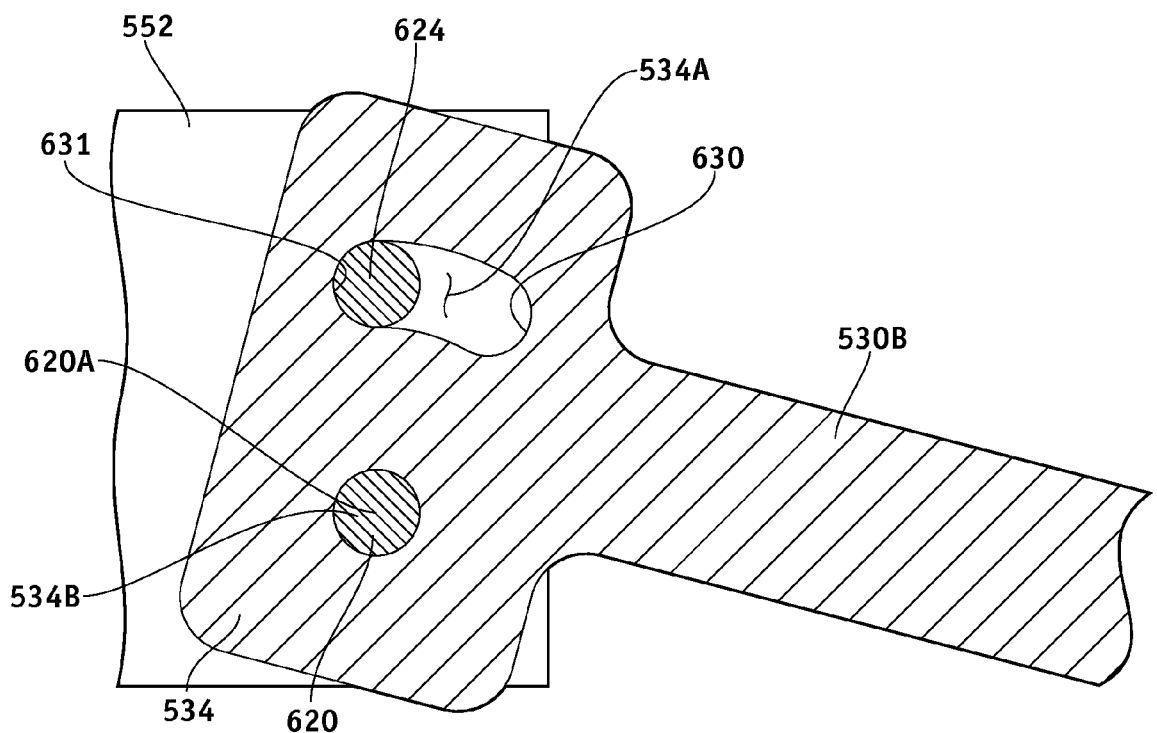
FIG. 41 is a section view taken along line 41-41 of FIG. 38.

Rearward support members 530A and 530B are each mounted for independent pivotal movement to block 552 for independent pivotal movement between their raised and lowered positions and also the lowermost position as demonstrated by rearward support member 530B in FIGS. 37 and 38. This permits rearward support members 530A and 530B to pivotally displace about pivot axis 620A as bicycle 541 is driven over the ground to absorb bumps and divots or depressions in the ground over which bicycle 541 is driven. As rearward support members 530A and 530A pivot about pivot axis 620A, upper threaded bolts 624 translate back-and-forth through the corresponding elongated through holes 534A, which interact with upper threaded bolts 624 to limit the uppermost and lowermost positions of rearward support members 530A and 530B. As a matter of example, in FIG. 35 rearward support member 530B is shown as it would appear in its raised position, which is the uppermost raised position of rearward support member 530B, and FIG. 40 is a section view taken along line 40-40 of FIG. 35 which illustrates upper threaded bolt 624 as it would appear functioning as an abutment interacting with a rear closed end 630 of through hole 534A by abutting directly against rear closed end 630 of through hole 534A limiting the rearward support member 530B from pivoting upwardly beyond its raised position, which, in this example, is the uppermost raised position of rearward support member 530B. The lowered position of rearward support member 530B, as with rearward support member 530A, is between the raised/uppermost position of rearward support member 530B and the lowermost position of rearward support member 530B. In FIG. 38 rearward support member 530B is shown as it would appear in its lowermost position, and FIG. 40 is a section view taken along line 40-40 of FIG. 35 which illustrates upper threaded bolt 624 as it would appear functioning as an abutment interacting with a front closed end 631 of through hole 534A by abutting directly against front closed end 631 of through hole 534A that is opposite to rear closed end 630 of through hole 534A limiting the rearward support member 530B from pivoting downwardly beyond its lowermost position. The arrange of, and the interaction between, through hole 534 and upper threaded bolt 624 forms an abutment assembly coupled between block 552 of connector assembly 503 and rearward support member 530B which limits movement of rearward support member 530B between its raised and lowermost positions. This discussion of rearward support member 530B applies in every respect to rearward support member 530A as they are identical.

As explained above, fixture 210 of forward stabilizing assembly 501 is mounted to block 552 of connector assembly 503 for pivotal movement at block 552 between a raised position with respect to bicycle 541 to disengage the wheels 518 of the wheeled ends of forward stabilizing assembly 501 from the ground over which bicycle 541 is driven to secure forward stabilizing assembly 501 from vehicle stabilization, as shown in FIG. 39, when vehicle stabilization by forward stabilizing assembly 501 is not needed or required by a rider of bicycle 541, and a lowered position with respect to bicycle 541 to engage the wheels 518 of the wheeled ends of forward stabilizing assembly 501 with the ground over which bicycle 541 is driven to engage forward stabilizing assembly 501 for vehicle stabilization, as shown in FIGS. 29, 30, 34, 36, and 37, when vehicle stabilization by forward stabilizing assembly 501 is needed or required by a rider of bicycle 541. And so fixture 210 movable between a raised position toward 210 frame of bicycle 541 away from the ground over which bicycle 541 is driven when vehicle stabilization by forward stabilizing assembly 501 is not required, such as by a rider riding bicycle 541, and a lowered position away from frame 210 of bicycle 541 and toward the ground over which bicycle 541 is driven when vehicle stabilization by forward stabilizing assembly 501 is required, such as by a rider riding bicycle 541. According to the principle of the invention, lock assembly 504 is coupled between frame 210 and fixture 210 of forward stabilizing assembly 501, and in the lowered position of fixture 210 of forward stabilizing assembly 501 the lock assembly 504 is adjustable between an unlocked position as shown in FIG. 33 releasing fixture in the lowered position thereof allowing fixture 541 to pivot/move from its lowered position to its raised position, and a locked position shown in FIG. 32 locking fixture in the lowered position thereof to engage the wheels 518 of the wheeled ends of forward stabilizing assembly 501 with the ground over which bicycle 541 is driven to engage forward stabilizing assembly 501 for vehicle stabilization, as shown in FIGS. 29, 30, 34, 36, and 37, and preventing fixture 210 from moving from the lowered position thereof to the raised position thereof.

Referring in relevant part to FIGS. 25-33, lock assembly 504 and its operation will now be discussed in detail. Lock assembly 504 consists of a bolt assembly 700, a support 701 for bolt assembly 700, a guide block 702, and a lever 703 operatively coupled to bolt assembly 700 for operating bolt assembly 700, namely, adjusting bolt assembly 700 between its locked and unlocked positions and for raising and lowering fixture 210 between its raised and lowered positions. Bolt assembly 700, support, and guide block 702 are carried by fixture 210, and lever 703 is carried by frame 210 of bicycle 541.

Figure 33:
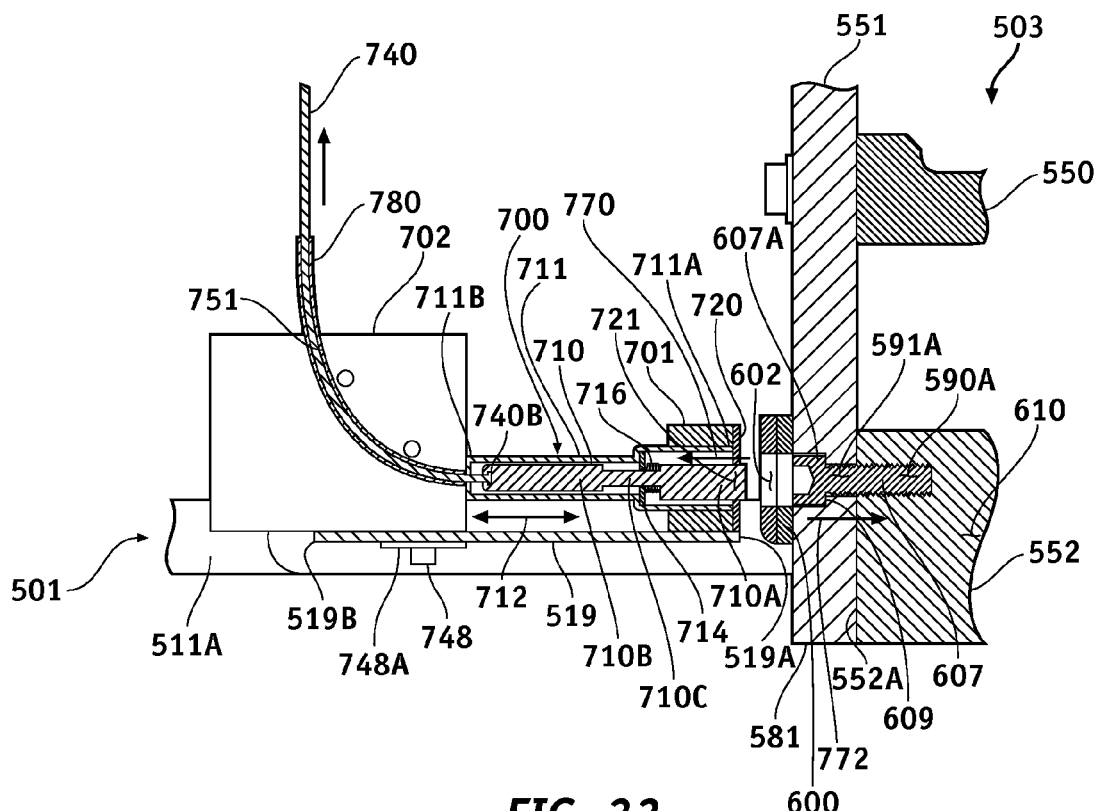
FIG. 33 is a view similar to that of FIG. 32 illustrating the lock assembly as it would appear in an unlocked position.

With specific reference to FIGS. 32 and 33, bolt assembly 700 consists of a bolt 710 having a head part 710A and an opposite tail part 710B, and a bolt housing 711. Bolt housing 711 has opposed front and rear ends 711A and 711B, and bolt 710 is mounted partially within bolt housing 711 through front end 711A for reciprocal movement in the direction indicated by double arrowed line 712 between an extended locked or locking position shown in FIG. 32 and a retracted unlocked or unlocking position shown in FIG. 33. Bolt 710 has opposed head and tail parts 710A and 710B, and an intermediate part 710C therebetween. Intermediate part 710C extends through an intermediate wall 714 formed inside bolt housing 711, and head part 710A of bolt 710 is located along one side of intermediate wall 714 toward front end 711A of bolt housing 711, and tail part 710B of bolt 710 is located on the other side of intermediate wall 714 toward rear end 711B of bolt housing 711. A conventional compression spring 716 within bolt housing 711 encircles intermediate portion 710C of bolt 710 between intermediate wall 714 and head part 710A of bolt 710 and acts between intermediate wall 714 and head part 710A biasing bolt 710 away from its unlocked/retracted position and toward its locked/extended position.

A face plate 720 has a central bolt-receiving opening 721 and is affixed to a back side of support 701 with opposed pins 722, and support 701 is formed with a cylindrical central opening 724 that registers or otherwise aligns with bolt-receiving opening 721 of face plate 720. Front end 711A of bolt housing 711 is a cylindrical collar, which is press fit into opening 724 formed through support 701 in a direction from a front side of support 701, and head part 710A extends partially outward from front end 711A of bolt housing 711 and extends through bolt-receiving opening 721 of face plate 720. There is a clearance shown between front end 711A of bolt housing 711 and opening 724 of support 701 for illustrative purposes with the understanding that there is a rigid, press fit between front end 711A of bolt housing 711 and opening 724 of support 701.

A pair of opposed, elongate, parallel slots 730 are formed through brace 519 near inner end 519A. Slots 730 are positioned between and are parallel with respect to proximal arms 515 of fixture 210. The underside of support 701 is applied against the top side of brace 519 over slots 730 near inner end 519A between proximal arms 515 locating bolt assembly 700 between proximal arms 515 such that bolt assembly 700 located above the top side of brace 519 and is parallel with respect to proximal arms 515 of fixture 210 and extends rearwardly in a direction from front end 711A of bolt housing 711 at support 701 located near inner end 519A of brace 519 to rear end 711B of bolt housing 711 directed toward outer end 519B of brace 519. Support 701 is rigidly secured in place to brace 519 with threaded fasteners 731 directed through slots 730 from the underside of brace 519 and which are threaded into corresponding threaded openings (not shown)

formed in the underside of support 701 and threaded fasteners 731 are tightened via rotation tightening down threaded fasteners 731 thereby rigidly securing support 701 to the top side of brace 519 near inner end 519A and, in turn, rigidly securing bolt assembly 700 in place over the top side of brace 519.

In the lowered position of forward stabilizing assembly 501, head part 710A of bolt 710 opposes and registers with or is otherwise aligned with bolt-receiving opening 602 formed in lock plate 600 rigidly affixed to support fixture 551 as shown in FIGS. 32 and 33. In the extended/locking position of bolt 710 in the lowered position of forward stabilizing assembly 501 as shown in FIG. 32, head part 710A is extended into and is received by bolt-receiving opening 602 locking lock plate 600 to head part 710A of bolt 710 securing/engaging lock assembly 504 between forward stabilizing assembly 501 and connector assembly 503 securing forward stabilizing assembly 501 in its lowered vehicle-stabilizing position to permit forward stabilizing assembly 501 to engage the wheels 518 of the wheeled ends of forward stabilizing assembly 501 with the ground over which bicycle 541 is driven to engage forward stabilizing assembly 501 for vehicle stabilization while concurrently preventing forward stabilizing assembly from moving out of its lowered position and into its raised position. In the retracted/unlocking position of bolt 710 in the lowered position of forward stabilizing assembly 501 as shown in FIG. 33, head part 710A is retracted out of bolt-receiving opening 602 of lock plate 602 releasing bolt 710 from lock plate 602 releasing/dis-engaging lock assembly 504 from connector assembly 503 to permit forward stabilizing assembly 501 to pivot/move from its lowered vehicle-stabilizing position to its raised position to disengage the wheels 518 of the wheeled ends of forward stabilizing assembly 501 from the ground over which bicycle 541 is driven to secure forward stabilizing assembly 501 from vehicle stabilization. Lever 703 is operatively coupled to bolt assembly 700 for operating bolt assembly 700, namely, adjusting bolt assembly 700 between the extended/locked position of bolt 710 and the retracted/unlocked position of bolt 710, and also for raising and lowering fixture 210 between its raised and lowered positions, as will now be discussed.

Lever 703 is an operator interface and is used by the rider of bicycle 541 for operating bolt assembly 700 in the manner discussed above. Looking to FIG. 30, lever 703 is a conventional hand-operated lever secured to frame 210 with a conventional bracket 734. In this embodiment, lever 703 is secured to top tube 220 of frame 210 near head tube 222 to provide convenient access to lever 703 from a rider riding bicycle 541. Lever 703 is operatively coupled to bolt assembly 700 with a cable 740 coupled between lever 703 and tail part 710B of bolt 710 as seen in FIGS. 32 and 33. Cable 703 extends between lever 703 and tail part 710B of bolt 710 and has an upper end 740A attached to lever 703 via conventional welding or crimping techniques and an opposed lower end 740B as shown in FIGS. 32 and 33 that extends into and through rear end 711B of bolt housing 711 and is affixed to tail part 710B via conventional welding or crimping techniques.

An opening 750 is formed through brace 519 near inner end 519A. The underside of guide block 702 is applied against the top side of brace 519 over opening 750 at outer end 519A and guide block 702 is received directly against rear end 711B of bolt housing 711. Guide block 702 is rigidly secured in place to brace 519 with a threaded fastener 748 provided with an applied washer 748A and which is directed through opening 750 from the underside of brace 519 and which is threaded into corresponding threaded openings (not shown) formed in the underside of guide block 702 and threaded fastener 748 is tightened via rotation tightening down threaded fastener 748 thereby rigidly securing guide block 702 to the top side of brace 519 at outer end 519B.

A cable guide 751 and a pair of cable stays 752 are formed in a side of guide block 702. Cable stays 752 are conventional and are threadably secured into a pair of corresponding threaded openings formed on the inner side of cable guide 751 between rear end 711B of bolt housing 711 and cable guide 751. Cable 740 is applied to cable guide 751, and is retained in cable guide 751 with cable stays 752.

Cable 740 runs through a cable bracket assembly 760 secured to frame 210 of bicycle 541 between lever 703 and guide block 702. Cable bracket assembly 760 is secured to down tube 221 under lever 703 and over guide block 702 in the present embodiment as seen in FIG. 30, and cable 740 extends vertically between cable bracket assembly 760 and guide block 702. Cable bracket assembly 760 consists of opposed, identical clamp parts 761 that are received over either side of down tube 222 and are secured together with threaded fasteners 762 in the form of threaded bolts, which are tightened via rotation clamping down tube 221 by and between clamp parts 761. A conventional cable nipple 764 is threaded into a threaded opening 765 formed in a supporting lug 767 that is, in turn, threaded onto a threaded post 768 formed in one of the clamp parts 761. Cable 740 extends concurrently through threaded opening 765 and nipple 764 between lever 703 and guide block 702 and holds the length of cable 740 between cable bracket assembly 760 and guide block 702 vertically upright.

In the lowered position of forward stabilizing assembly 501 in the extended/locked position of bolt 710 as shown in FIG. 32, lever 703 may be moved along a lever stroke path from an open position thereof as shown in FIGS. 29, 30, 34, 36, and 37 to a closed position thereof as shown in FIG. 39, which shortens the length of cable 740 between cable bracket assembly 760 and guide block 702 causing cable 740 to act on bolt 710 in the direction indicated by arrowed line 770 in FIG. 33 overcoming the bias applied by spring 716 displacing bolt 710 from its extended/locked position of FIG. 32 to its retracted/unlocked position of FIG. 33 releasing forward stabilizing assembly 501 from its locked position to allow stabilizing assembly 501 to be pivoted from its lowered position to its raised position as may be required or desired a rider riding bicycle 541. As lever 703 is moved along its lever stroke path from its open position toward its closed position as shown in FIG. 39, at an intermediate position of lever 703 between its open position and its closed position spring 716 becomes fully overcome and compressed between head part 710A of bolt and intermediate wall 714 of bolt housing 711 and the length of cable 740 running from tail part 710B of bolt 710 and through cable guide 751 of guide block 702 and from guide block 702 to cable bracket assembly 760 and from cable bracket assembly 760 to lever 703 is pulled tight or otherwise rigidified between bolt 710 and lever 703 rigidly coupling lever 703 to forward support assembly 501 at bolt 710, whereby continued movement of lever 703 toward and into its closed position as shown in FIG. 39 acts on and picks up or otherwise pulls forward stabilizing assembly 501, namely, fixture 210 and its attached components, upwardly in the direction indicated by arrowed line 771 in FIG. 39 pivoting forward stabilizing assembly 501 at its pivotal attachment to block 552 from the lowered position of forward stabilizing assembly 501 to the raised position of forward stabilizing assembly 501 as shown in FIG. 39.

To move forward stabilizing assembly back to its lowered position and to relock lock assembly 504 between forward stabilizing assembly 501 and connector assembly 503 to secure forward stabilizing assembly 501 back into its lowered position to secure forward stabilizing assembly 501 for vehicle stabilization, the foregoing operation for unlocking forward stabilizing assembly 501 from its lowered position and raising forward stabilizing assembly 501 from its lowered position to its raised position need only be reversed. Specifically, lever 703 need only be released or otherwise moved along its lever stroke path from its closed position as shown in FIG. 39 to its open position as shown in FIGS. 29, 30, 34, 36, and 37, causing the length of length of cable 740 running from tail part 710B of bolt 710 and through cable guide 751 of guide block 702 and from guide block 702 to cable bracket assembly 760 to lengthen resulting in the pivoting of forward stabilizing assembly 501 at the pivotal connection of forward stabilizing assembly 501 to block 552 from its raised position to its lowered position away from frame 210 of bicycle 541 and toward and against the ground over which bicycle 541 is ridden registering head part 710A of bolt 710 with respect to bolt-receiving opening 602 of lock plate 602 as shown in FIG. 33. The continued releasing of lever 703 along its stroke path from the closed position of lever 703 to the open position of lever 703 in the lowered position of forward stabilizing assembly 501 releases spring 716 causing spring 716 to act between head part 710A of bolt 710 and intermediate wall 714 of bolt housing 711 displacing bolt 710 in the direction indicated by arrowed line 772 moving bolt 710 from its retracted/unlocking position as shown in FIG. 33 to its extended/locking position as shown in FIG. 32 causing forward stabilizing assembly 501 to be once again locked into is lowered vehicle-stabilizing position, in accordance with the principle of the invention. Cable 740 reciprocates back and forth in response to movement of lever 703 along its lever stroke path between its open and closed positions. To reduce cable friction along guide block 702 that could damage cable 740, a protective sheath 780 set into cable guide 751 is applied around cable 740 as best seen in FIGS. 31-33.

According to yet another exemplary embodiment of the invention, provided is a two-wheeled vehicle that includes a front wheel mounted for rotation to a front end of a frame and an opposed rear wheel mounted for rotation to a rear end of the frame. A framework assembly is carried by the frame of the vehicle between the front and rear wheels and has end portions disposed adjacent to respective sides of the frame. A stabilizer is carried by each of the end portions of the framework assembly to interact with the ground over which the vehicle is driven along the sides of the frame proximate to the front and rear wheels of the vehicle. A frangible area is formed in the framework assembly providing a point at which the framework assembly will break so as to break away one of the stabilizers from the framework assembly. More specifically, the vehicle assembly includes a two-wheeled vehicle including a frame having opposed first and second sides, opposed front and rear ends, the front wheel mounted for rotation to the frame proximate to the front end of the frame positioned in front of the opposed rear wheel mounted for rotation to the frame proximate to the rear end of the frame and that is substantially in-line with respect to the front wheel. First and second stabilizer assemblies are positioned along the first and second sides, respectively, of the frame to interact with the ground over which the vehicle is driven, the first and second stabilizer assemblies extending along the first and second sides of the frame proximate to the front and rear wheels of the vehicle, to stabilize the vehicle as the vehicle is driven over the ground, wherein the first and second stabilizer assemblies each include an elongate framework assembly mounted to the frame, and having an attached forward stabilizer disposed proximate to, and outboard of, the front wheel of the vehicle and an attached rearward stabilizer disposed proximate to, and outboard of, the rear wheel of the vehicle. There is a frangible coupling formed in the elongate framework assembly between the vehicle and one of the forward and rearward stabilizers, which break-away couples the one of the forward and rearward stabilizers to the elongate framework assembly. The coupling includes a first end of a first part of the elongate framework assembly to the vehicle, a second end of a second part of the elongate framework assembly to the one of the forward and rearward stabilizers, and a fastener coupled between the first end of the first part and the second end of the second part releasably connecting the first end of the first part to the second end of the second part. According to the principle of the invention, a frangible area is formed in the fastener along an intersection between the first and second ends of the first and second parts of the elongate framework assembly that provides a point at which the fastener will break so as to break away the second end of the second part from first end of the first part. A sacrificial skid is attached to the first part of the elongate framework assembly to interact with the ground over which the vehicle is driven in response to the one of the forward and rearward stabilizers being broken away from the elongate framework assembly at the frangible area of the fastener so as to prevent the first part of the elongate framework from interacting with the ground over which the vehicle is driven. In a preferred embodiment, the skid is formed of hard rubber and is further releasably attached to the first part. There is an axis about which the fastener is symmetrical, and the second part is restrained from rotation relative to the first part about the axis of the fastener.

Figure 42:
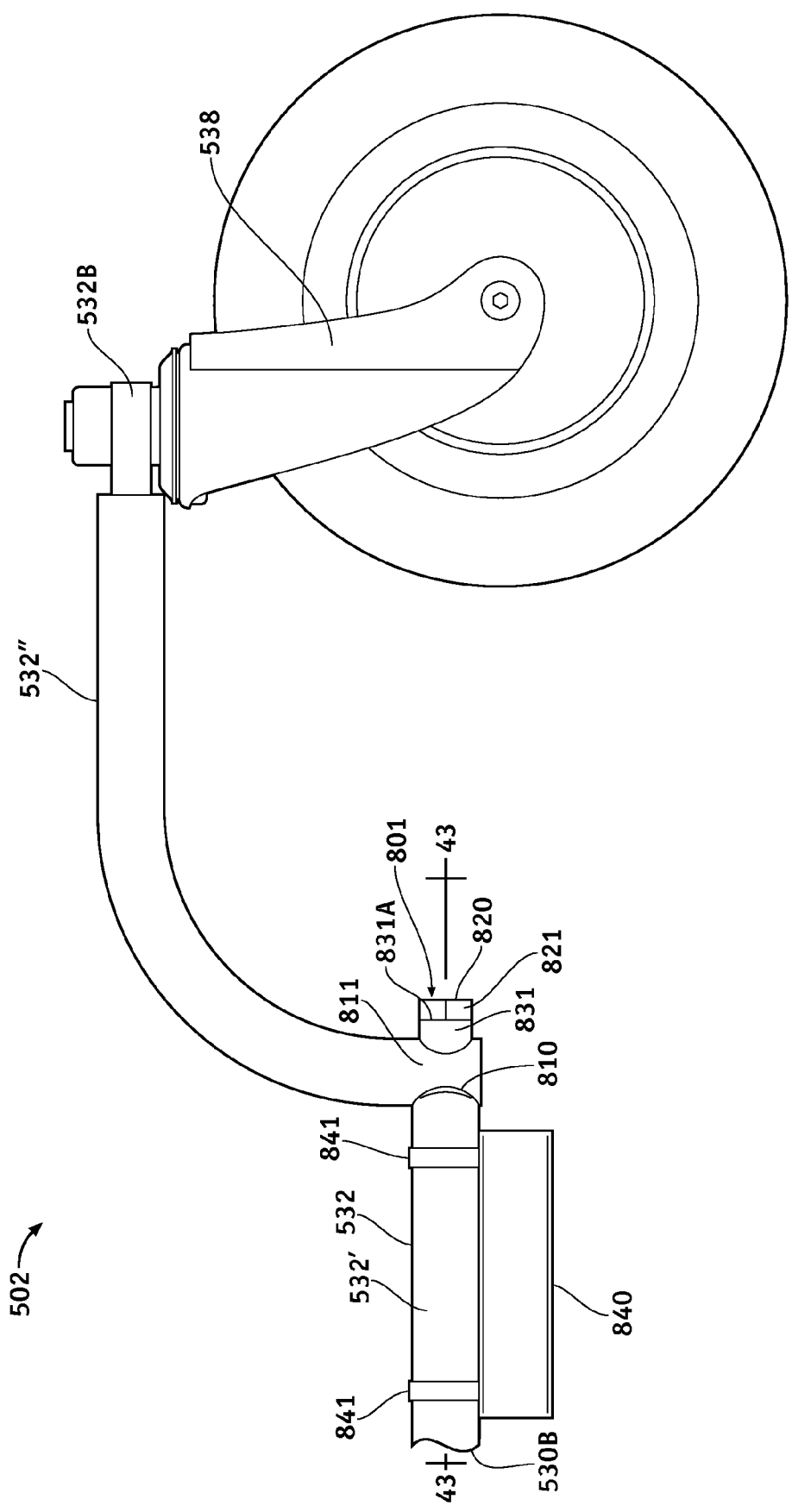
FIG. 42 is a fragmented, side elevation view of a break-away stabilizer assembly constructed and arranged in accordance with the principle of the invention, and which is for use with a stabilization apparatus constructed and arranged in accordance with the principle of the invention.

To illustrate this embodiment, attention is directed to FIG. 42, which is a fragmented, side elevation view of a break-away stabilizer assembly 800 constructed and arranged in accordance with the principle of the invention, and which is for use in conjunction with the stabilizer/stabilizing end in any stabilizer assembly of any stabilization apparatus constructed and arranged in accordance with the principle of the invention disclosed herein. In this embodiment, break-away stabilizer assembly 800 is formed in elongate support member 530B of rearward stabilizer assembly 502 of the elongate framework assembly of the left-side stabilizer/stabilizing assembly that is positioned along the side 210B of bicycle 541 set forth above, and break-away stabilizer assembly 800 is considered to be a part of the elongate framework assembly into which it is incorporated. This application of break-away stabilizer assembly 800 in conjunction with elongate support member 530B is set forth as a matter of example, and it is to be understood that break-away stabilizer assembly 800 may be formed in connection with the stabilizer/stabilizing end of one or more or each of the front and rear stabilizers of any elongate framework assembly of any stabilizer assembly of any stabilization apparatus disclosed throughout this disclosure so as to provide the break-away stabilizer function as set for with particularity below. As a matter of example, break-away stabilizer assembly 800 may be formed in connection with the stabilizer/stabilizing end of forward support member 511A of forward stabilizing assembly 501, forward support member 511B of forward stabilizing assembly 501, rearward support member 530A of rearward stabilizing assembly 502, and or rearward support member 530B of rearward stabilizing assembly 501 as will now be discussed.

In reference to FIG. 42, break-away stabilizer assembly 800 is formed in elongate distal arm 532 of elongate support member 530B, and elongate distal arm 532 has outer end 532B formed with attached stabilizer 538 as shown that characterizes a stabilizing/stabilizer end of the corresponding elongate framework assembly of this embodiment. Break-away stabilizer assembly 800 includes a frangible coupling formed in elongate distal arm 532 of elongate support member 530B of rearward stabilizer assembly 502 of the elongate framework assembly of the left-side stabilizer/stabilizing assembly. Frangible coupling 801 is formed in elongate distal arm 532 between the vehicle, namely, bicycle 541 shown and described as above, and stabilizer 538, and which "break-away couples" stabilizer 538 to elongate distal arm 532 of elongate support member 530B the corresponding elongate framework assembly so as to permit stabilizer 538 to detach and break away in response to an applied load sufficient to cause break-away coupling 801 to break or otherwise give way.

In this embodiment, elongate distal arm 532 is severed so as to form opposed ends 810 and 811 in elongate distal arm 532, an inner part 532' of elongate distal arm 532 from end 810 to the vehicle, namely, bicycle 541, and an opposed outer part 532" of elongate distal arm 532 from end 811 to stabilizer 538. In this embodiment, outer part 532" includes a vertical part and a horizontal part to stabilizer 538 and an intermediate bend therebetween the vertical and horizontal parts. The vertical part extends vertically upward or otherwise in a vertical direction from end 811 to the intermediate bend, and the horizontal part extends horizontally outward or otherwise in a horizontal direction from the intermediate bend to stabilizer 538. As such, the vertical part of outer part 532" is orthogonal with respect to the horizontal part of outer part 532" and is also orthogonal with respect to inner part 532'. Frangible coupling 801 includes end 810 of inner part 532' of elongate distal arm 532 to the vehicle, end 811 of outer part 532" of elongate distal arm 532 to stabilizer 538, and a fastener 820, which is coupled between ends 810 and 811 so as to releasably connect end 810 of inner part 532' to end 811 of outer part 532".

Figure 43:
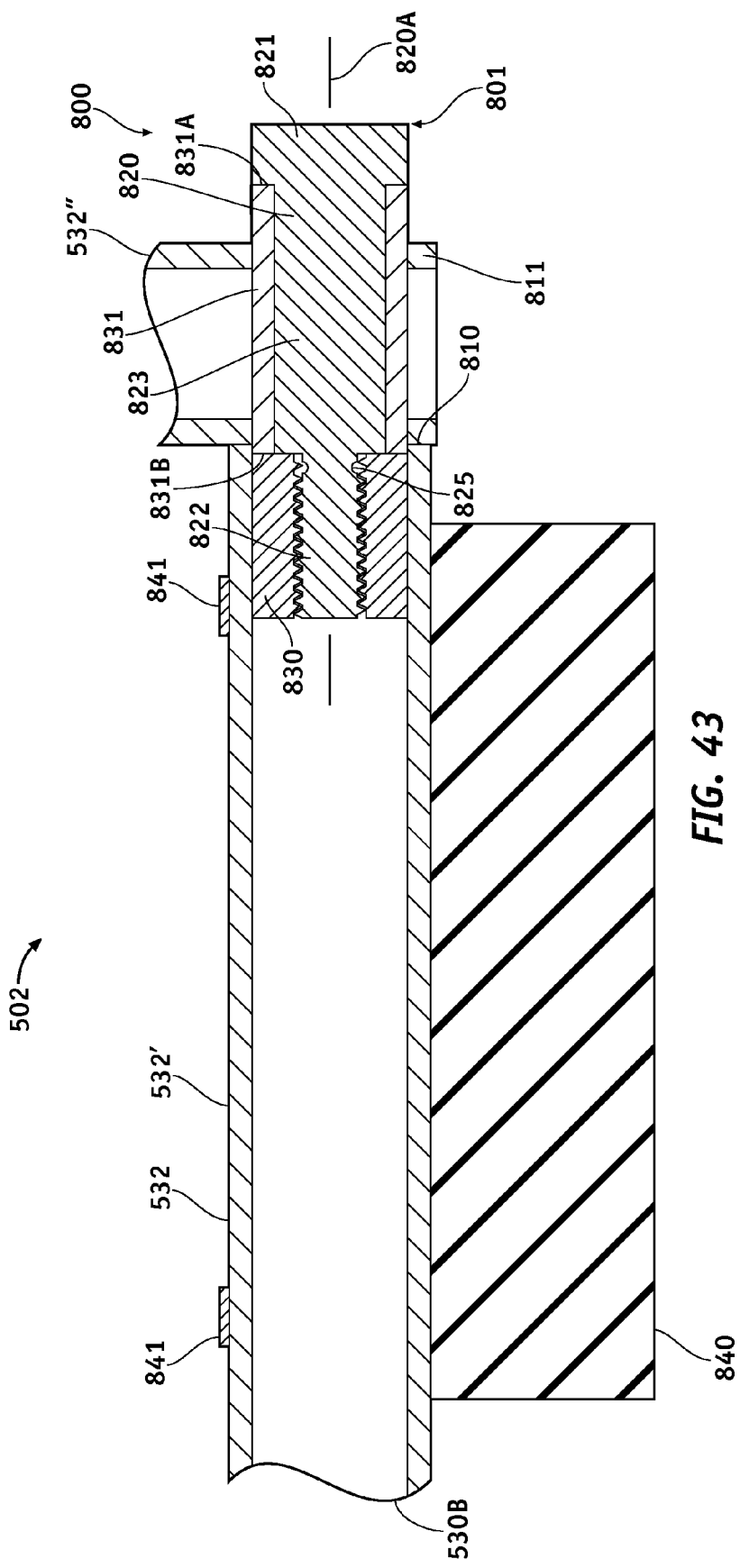
FIG. 43 is a vertical section view taken along line 43-43 of FIG. 42.
Figure 44:
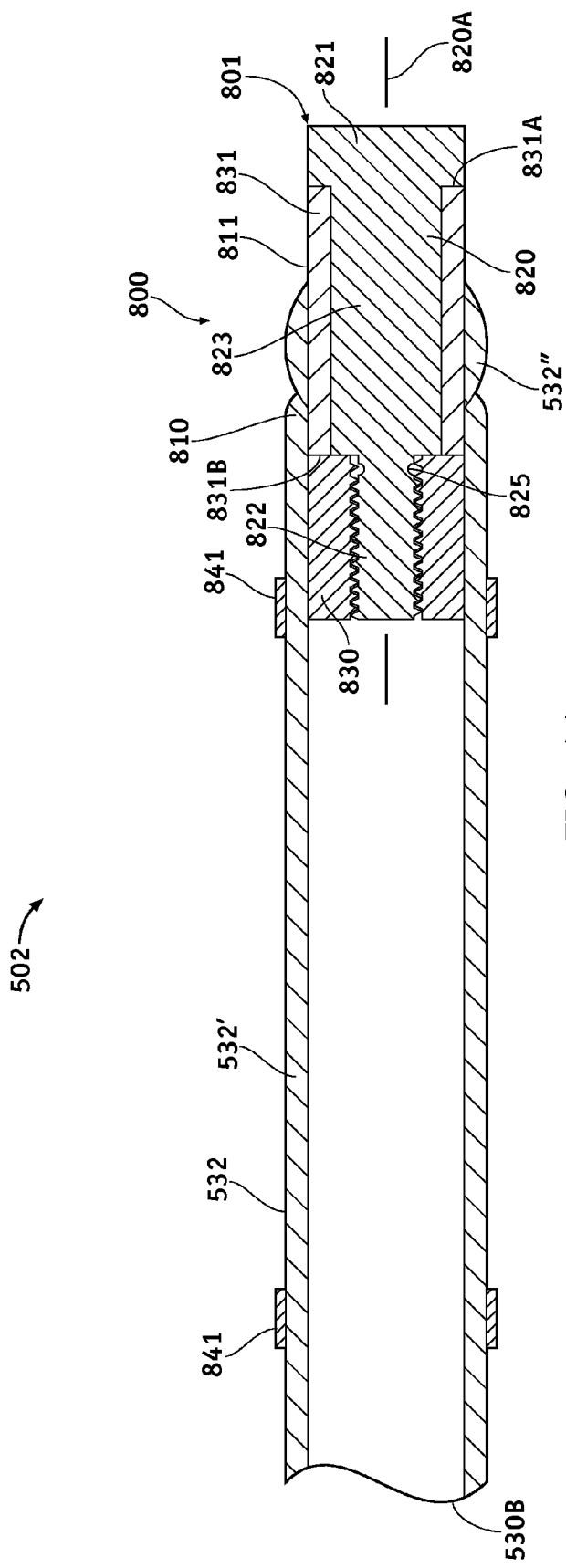
FIG. 44 is a horizontal section view taken along line 43-43 of FIG. 42.
Figure 45:
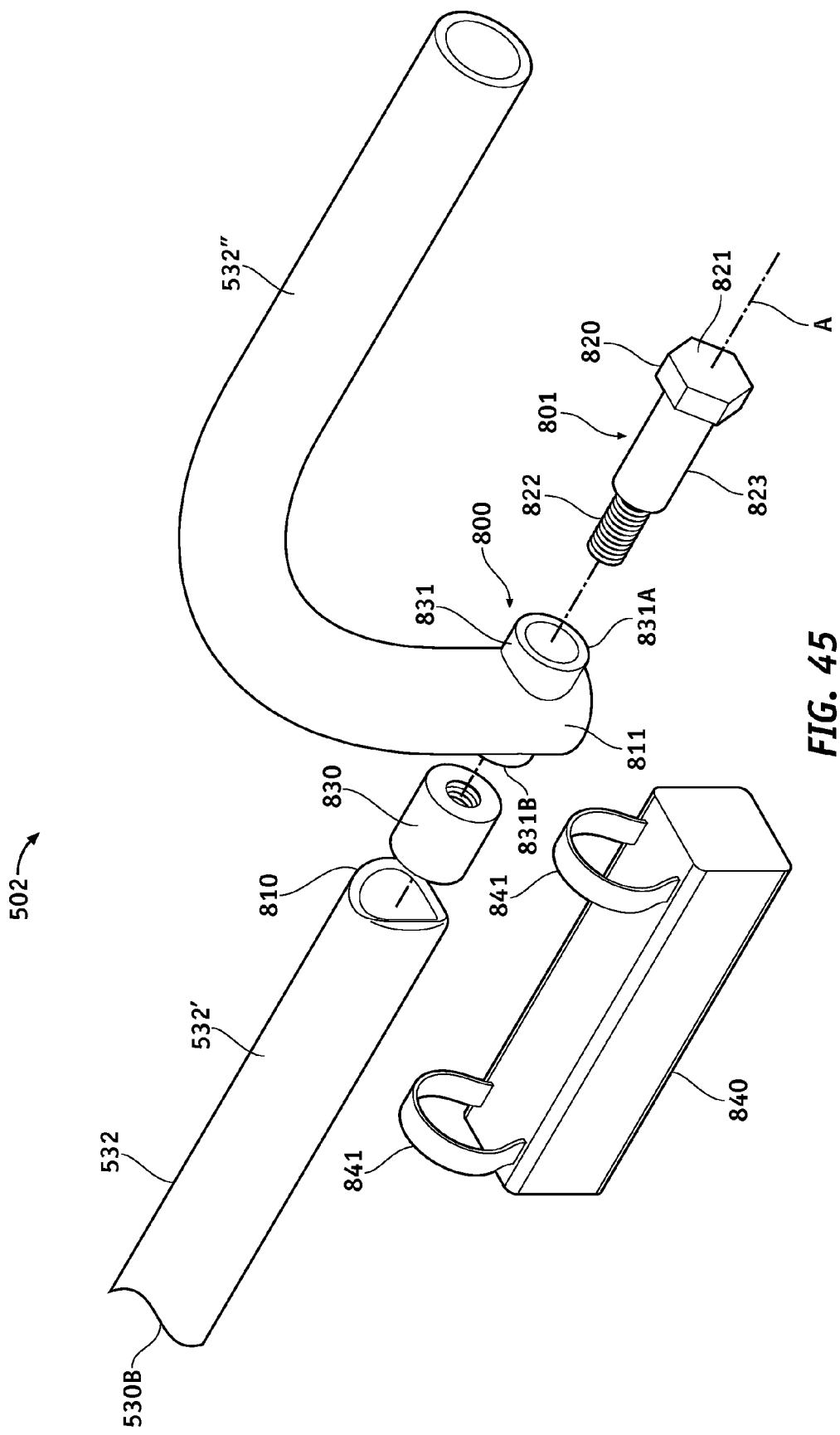
FIG. 45 is an exploded perspective view of a coupling assembly of the break-away stabilizer assembly of FIG. 42.

Referencing FIGS. 43-45, fastener 820 is large hex bolt consisting of head 821, an opposed threaded shank 822 having an outer diameter, and an intermediate shank 823 between head 821 and threaded shank 822. Intermediate shank 823 has an outer diameter that is enlarged with respect to, or otherwise greater than, the outer diameter of threaded shank 822. Fastener 820 defines a central axis 820A in FIG. 45 about which fastener 820 is symmetrical. Looking to FIGS. 43 and 44, a frangible area 825 is formed in fastener 820. Frangible area 825 is formed in threaded shank 822 near where threaded shank 822 and intermediate shank 823 are joined together, e.g., near where they meet. Frangible area 825 is an annular groove. This annular groove is a thinned annular area of threaded shank 822 of fastener 820. Frangible area 825 is, accordingly, a weakened area of fastener 825, and fastener 825 is thus designed to break when fastener 825 is exposed to an applied load sufficient to cause frangible area 825 to give way, e.g., to break.

End 810 is formed with an attached internally-threaded lug 830, end 811 of outer part 532" is formed with a collar 831 having opposed outer and inner extremities 831A and 831B. Lug 830 is press-fit into end 810 so as to be rigidly affixed to end 810 and lug 830 can be welded in place or otherwise integrally formed with end 810 so as to be rigidly affixed in place in alternate embodiments. To releasably connect ends 810 and 811, end 810 is applied to end 811 in the direction of inner extremity 831B of collar 831 and end 810 is received over inner extremity 831B of collar 831 and is so sized to permit this and end 810 is received into direct contact against the outer surface of end 811 and this registers lug 830 with collar 831 in preparation for threadably receiving threaded shank 822 of fastener 820 in the use of fastener 820 to secure ends 810 and 811 together. Threaded fastener 820 is applied threaded shank 822 first into collar 831 through outer extremity 831A and threaded shank 822 is threaded into inwardly threaded lug 830 and is tightened via rotation so as to concurrently tighten head 821 against outer extremity 831A of collar 831, and end 810 against end 811, and this securely and releasably connects ends 810 and 811 together so as to locate frangible 825 of fastener 820 at the intersection between ends 810 and 811 of the elongate framework assembly and which defines a point at which fastener 820 will break so as to break away end 811 of outer part 523" to stabilizer 538 from end 810 of inner part 523' to the vehicle being stabilized. So installed, intermediate shank 823 of fastener 820 is applied to, and extends through, collar 831 from outer extremity 831A and head 821 to inner extremity 831B and threaded shank 822. Axis 820A of fastener 820 is coaxial with respect to collar 831 and inwardly-threaded lug 830 and defines the central axis of collar 831 from outer extremity 831A to inner extremity 831B and inwardly-threaded lug 830, as in FIGS. 43-45. As break-away stabilizer assembly 800 is considered to be a part of the elongate framework assembly into which it is incorporated, frangible area 825 is likewise considered to be a part of the elongate framework assembly into which it is incorporated so as to provide a point at which the elongate framework assembly will break so as to break away the stabilizer, in this case stabilizer 538, from the elongate framework assembly. An elongate framework assembly of a stabilizer assembly of a stabilization apparatus incorporating break-away stabilizer assembly 800 may be used in the normal manner for providing vehicle stabilization, such as discussed above in connection with elongate support member 530B.

In the present embodiment, ends 810 and 811 have mating or complementing shapes that interlock, and such that when tightened together with fastener 820 so as to be in direct contact with one another interlock and cause outer part 532" to stabilizer 538 to be restrained from rotation relative to the inner part 532' about axis 820A of fastener 820, which ensures stabilizer 538 remains positioned to interact with the ground over which the vehicle is driven for stabilization purposes. Here, end 810 is inwardly curved and end 811 is outwardly curved so as to form an interlocking relationship therebetween for producing the resulting function of restraining outer part 532" from rotating with respect to inner part 532' about axis 820A, and this arrangement can be reversed and other complementing interlocking shapes can be used to restrain rotation of outer part 532" to stabilizer 538 with respect to inner part 532'. Detents and other interlocking components can be as well for restraining rotation of outer part 532" to stabilizer 538 relative to inner part 532' to the vehicle.

Figure 46:
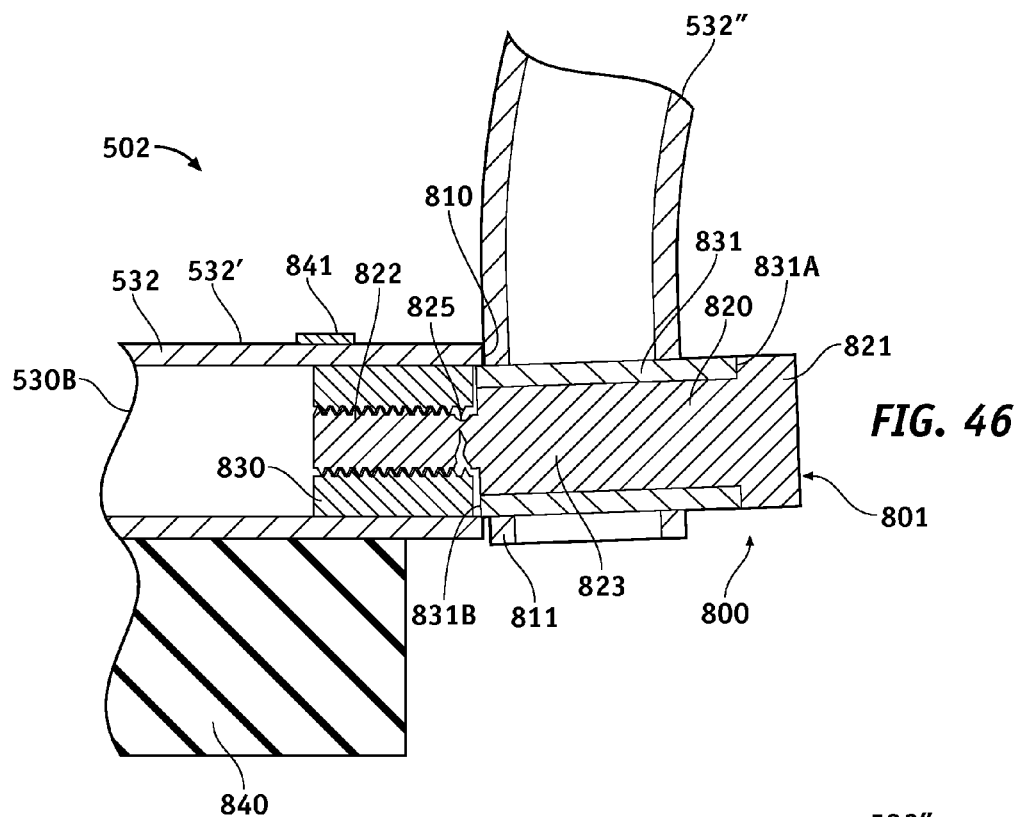
FIGS. 46 and 47 are vertical section views similar to that of FIG. 42 illustrating a sequence of steps of a break-away function of the break-away stabilizer assembly.
Figure 47:
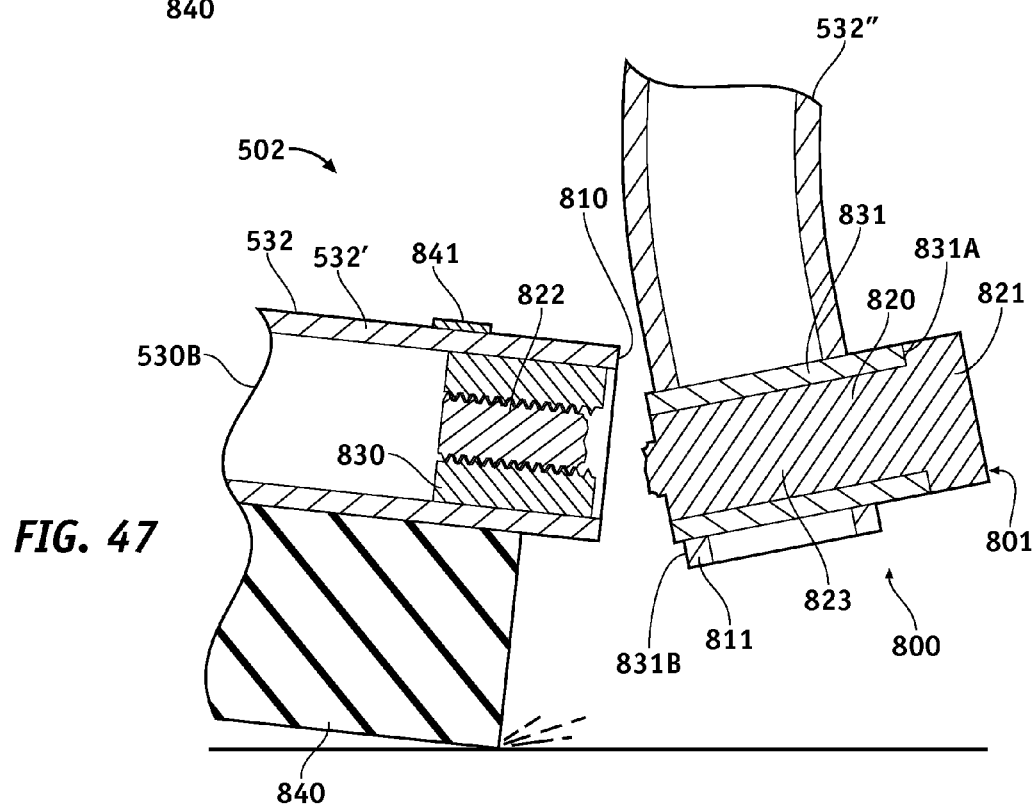

Frangible area 825 is a weakened area of fastener 820, and fastener 825 is designed to break at frangible area 825 as shown in FIGS. 46 and 47 when it experiences a force that is sufficient to cause frangible area 825 to give way. Examples of instances in which fastener 820 can be broken at frangible area 825 are if stabilizer 538 strikes a curb or other obstruction, or if excess weight is applied against stabilizer 538. When fastener 820 is broken at frangible area 825, as shown in FIGS. 46 and 47, outer part 532" to and incorporating stabilizer 538 can fall away from inner part 532' to the vehicle. When outer part 532" to stabilizer 538 is broken away from inner part 532' to the vehicle at frangible area 825, inner part 532' is left remaining attached to the vehicle. To reinstall a stabilizer, either a new stabilizer are the broken away stabilizer, one need only remove threaded shank 822 from lug 830, and re-attach the outer part of the new or the broken away stabilizer with a new fastener 820 as discussed above.

In reference in relevant part to FIGS. 42-47, a sacrificial skid 840 is attached to the underside of inner part 532' of elongate distal arm 532 of elongate support member 530B of the elongate framework assembly to interact with the ground over which the vehicle is driven as in FIG. 47 in response to outer part 532" to stabilizer 538 being broken away from the elongate framework assembly at frangible area 825 of fastener 820 so as to prevent inner part 532 from interacting with the ground over which the vehicle is driven and becoming damaged. Skid 840 is fashioned of hard rubber in this preferred embodiment, and is coupled to inner part 532' with attachment couplings in the form of conventional attachment bands or collars 841 coupled between skid 840 and inner part 532'. In this embodiment there are two bands 841, and less or more can be used. Moreover, skid 840 can be attached to the underside of inner part 532' in other ways, such as with adhesive, nut-and-bolt fasteners, straps, etc.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A vehicle assembly, comprising:
   a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel;
   first and second stabilizer assemblies positioned along the first and second sides, respectively, of the frame to interact with the ground over which the vehicle is driven, the first and second stabilizer assemblies extending along the first and second sides of the frame proximate to the front and rear wheels of the vehicle, to stabilize the vehicle as the vehicle is driven over the ground, wherein the first and second stabilizer assemblies each include an elongate framework assembly mounted to the frame, and having an attached forward stabilizer disposed proximate to, and outboard of, the front wheel of the vehicle and an attached rearward stabilizer disposed proximate to, and outboard of, the rear wheel of the vehicle; and
   a frangible area formed in the elongate framework assembly providing a point at which the elongate framework assembly will break so as to break away one of the forward and rearward stabilizers from the elongate framework assembly.

2. The vehicle assembly according to claim 1, further comprising a sacrificial skid attached to the elongate framework assembly between the vehicle and the frangible area to interact with the ground over which the vehicle is driven so as to prevent a remainder of the elongate framework assembly from interacting with the ground over which the vehicle is driven in response to the one of the forward and rearward stabilizers being broken away from the elongate framework assembly at the frangible area.

3. The vehicle assembly according to claim 2, wherein the skid is formed of hard rubber.

4. A vehicle assembly, comprising:
   a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel;
   first and second stabilizer assemblies positioned along the first and second sides, respectively, of the frame to interact with the ground over which the vehicle is driven, the first and second stabilizer assemblies extending along the first and second sides of the frame proximate to the front and rear wheels of the vehicle, to stabilize the vehicle as the vehicle is driven over the ground, wherein the first and second stabilizer assemblies each include an elongate framework assembly mounted to the frame, and having an attached forward stabilizer disposed proximate to, and outboard of, the front wheel of the vehicle and an attached rearward stabilizer disposed proximate to, and outboard of, the rear wheel of the vehicle;
   a frangible coupling formed in the elongate framework assembly between the vehicle and one of the forward and rearward stabilizers break-away coupling the one of the forward and rearward stabilizers to the elongate framework assembly, the coupling comprising:
   a first end of a first part of the elongate framework assembly to the vehicle;
   a second end of a second part of the elongate framework assembly to the one of the forward and rearward stabilizers;
   a fastener coupled between the first end of the first part and the second end of the second part releasably connecting the first end of the first part to the second end of the second part; and
   a frangible area formed in the fastener along an intersection between the first and second ends of the first and second parts of the elongate framework assembly providing a point at which the fastener will break so as to break away the second end of the second part from the first end of the first part.

5. The vehicle assembly according to claim 4, further comprising a sacrificial skid attached to the first part of the elongate framework assembly to interact with the ground over which the vehicle is driven in response to the one of the forward and rearward stabilizers being broken away from the elongate framework assembly at the frangible area of the fastener so as to prevent the first part of the elongate framework from interacting with the ground over which the vehicle is driven.

6. The vehicle assembly according to claim 4, wherein the skid is formed of hard rubber.

7. The vehicle assembly according to claim 4, further comprising an axis about which the fastener is symmetrical, and the second part is restrained from rotation relative to the first part about the axis of the fastener.

* * * * *